(12) United States Patent
Kastner et al.

(10) Patent No.: US 11,961,254 B2
(45) Date of Patent: Apr. 16, 2024

(54) SYSTEMS AND METHODS FOR LOCATION TRIANGULATION BASED ON TIME BASED PANORAMIC FRAMES

(71) Applicant: Pano AI, Inc., San Francisco, CA (US)

(72) Inventors: Sonia Kastner, San Francisco, CA (US); Seva Safris, Bangkok (TH); Kira Greco, San Francisco, CA (US)

(73) Assignee: Pano AI, Inc., San Francisco, CA (US)

( * ) Notice: Subject to any disclaimer, the term of this patent is extended or adjusted under 35 U.S.C. 154(b) by 0 days.

(21) Appl. No.: 18/144,139

(22) Filed: May 5, 2023

(65) Prior Publication Data

US 2023/0362335 A1    Nov. 9, 2023

Related U.S. Application Data

(60) Provisional application No. 63/339,434, filed on May 7, 2022.

(51) Int. Cl.
| | |
|---|---|
| *G06T 7/70* | (2017.01) |
| *G06V 10/25* | (2022.01) |
| *G06V 20/52* | (2022.01) |
| *H04N 5/265* | (2006.01) |
| *H04N 7/18* | (2006.01) |
| *H04W 4/021* | (2018.01) |

(52) U.S. Cl.
CPC .............. *G06T 7/70* (2017.01); *G06V 10/25* (2022.01); *G06V 20/52* (2022.01); *H04N 5/265* (2013.01); *H04N 7/181* (2013.01); *G06T 2207/30181* (2013.01); *G06T 2207/30244* (2013.01); *H04W 4/021* (2013.01)

(58) Field of Classification Search
None
See application file for complete search history.

(56) References Cited

U.S. PATENT DOCUMENTS

| | | |
|---|---|---|
| 8,934,008 B2 | 1/2015 | Rudin et al. |
| 2011/0275408 A1 | 11/2011 | Kulik |
| 2012/0188381 A1 | 7/2012 | Vanuytven |

(Continued)

OTHER PUBLICATIONS

International Search Report issued in International Application No. PCT/US2023/021258 dated Sep. 21, 2023.

(Continued)

*Primary Examiner* — James M Anderson, II
(74) *Attorney, Agent, or Firm* — Foley & Lardner LLP

(57) ABSTRACT

A method includes identifying an image captured by an image capture device set at a first angle about an axis, the image corresponding to a time at which the image was captured, identifying within the image, a region of interest including an object to be used for calibration, determining, an image coordinate at which the object is displayed within the image, determining a camera angle corresponding to a position of the image capture system relative to the axis when the image was captured, identifying a bearing of the object relative to the reference direction, the bearing of the object determined using a geolocation of the image capture system and the time at which the image was captured, and determining, using the image coordinate, the camera angle, and the bearing of the object, an angular offset between the first angle and the reference direction to determine a second angle.

18 Claims, 34 Drawing Sheets

(56) References Cited

U.S. PATENT DOCUMENTS

| | | | |
|---|---|---|---|
| 2012/0233000 A1* | 9/2012 | Fisher | G06F 16/58 705/14.71 |
| 2014/0022539 A1 | 1/2014 | France | |
| 2015/0042793 A1 | 2/2015 | Belenkii et al. | |
| 2017/0243069 A1 | 8/2017 | Shen | |
| 2019/0238800 A1 | 8/2019 | Chuang et al. | |
| 2023/0095500 A1 | 3/2023 | Cheng et al. | |

OTHER PUBLICATIONS

Notice of Allowance issued in U.S. Appl. No. 18/144,138 dated Jul. 11, 2023.

* cited by examiner

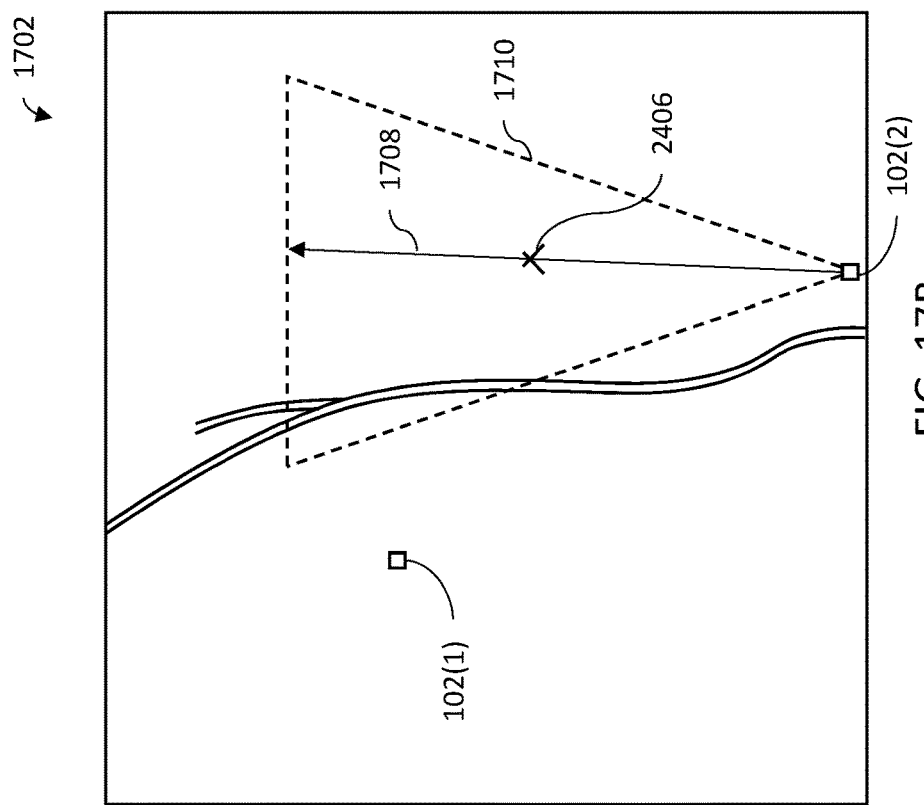
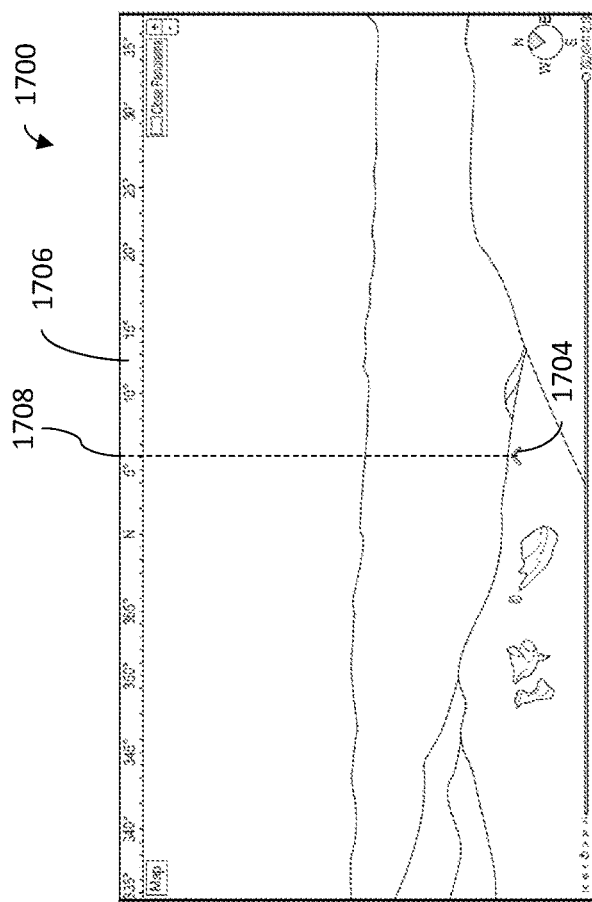
FIG. 17B
FIG. 17A

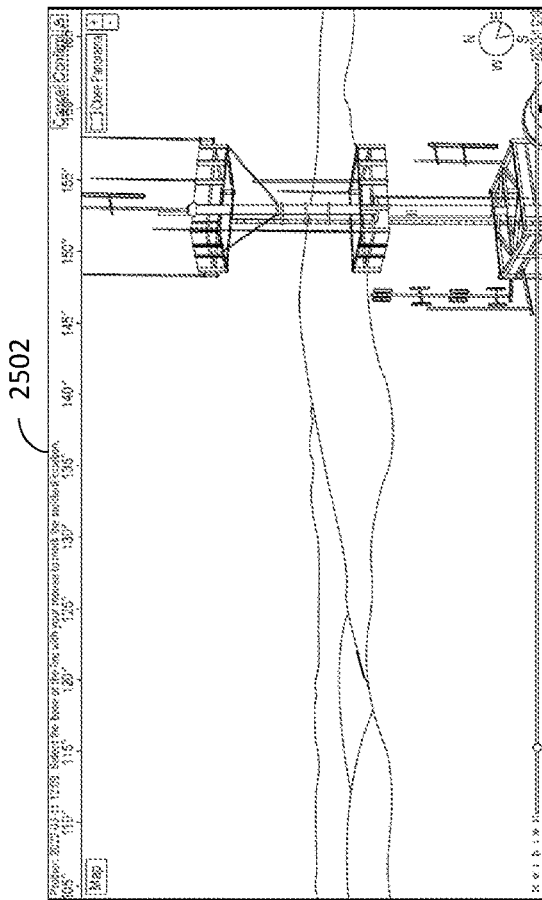
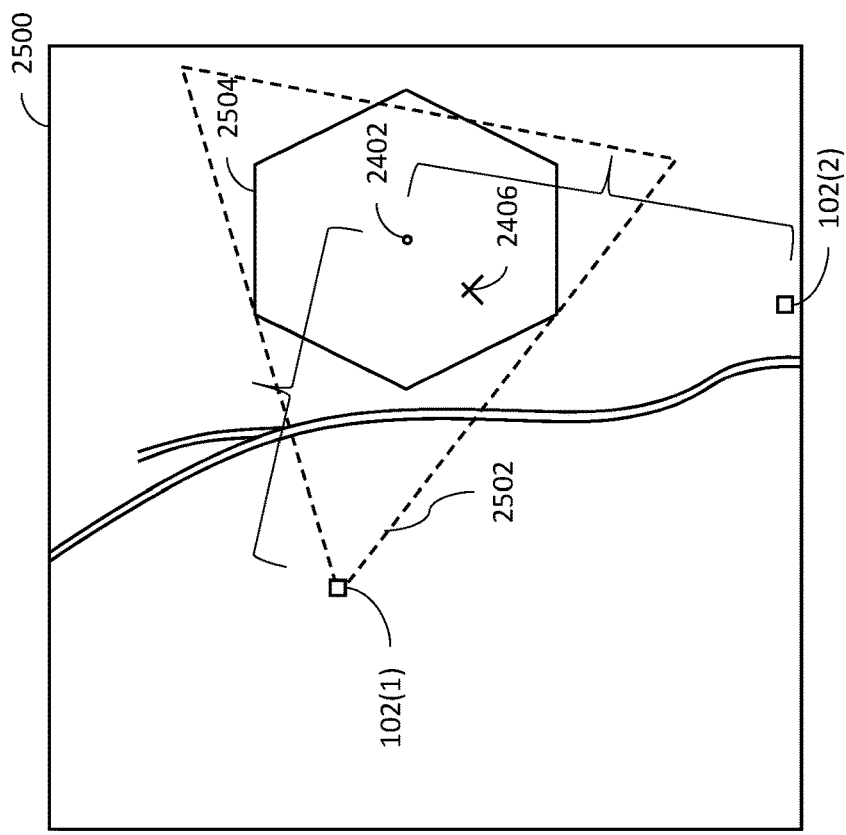
FIG. 25B
FIG. 25A

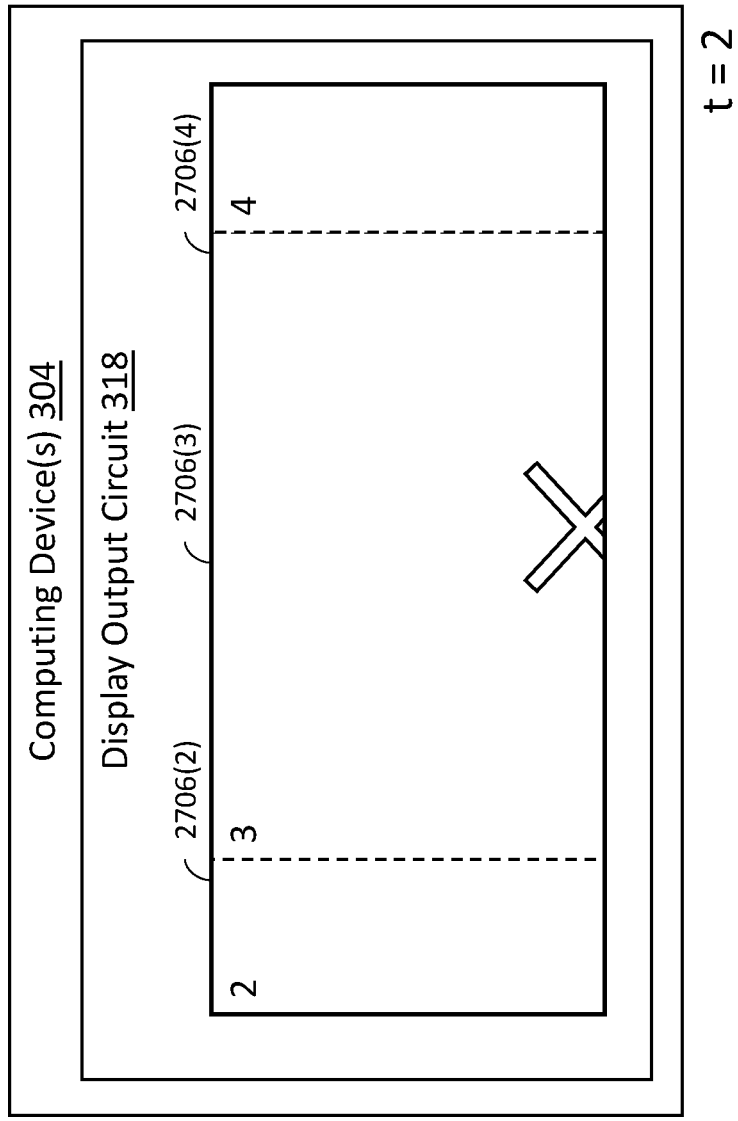

SYSTEMS AND METHODS FOR LOCATION TRIANGULATION BASED ON TIME BASED PANORAMIC FRAMES

RELATED APPLICATION

The present application claims priority to and the benefit of U.S. Provisional Application No. 63/339,434, titled "IMAGE BASED INCIDENT DETECTION SYSTEM," and filed on May 7, 2022, which is incorporated herein by reference in its entirety for all purposes.

BACKGROUND

Image capture systems can be used for a variety of applications, including monitoring and identification of events or incidents. Applications can extend to observation of incidents occurring over broad regions or areas. Collecting and processing captured images can be implemented using remote systems and functions, depending on the applications and design.

SUMMARY

The present disclosure generally relates to systems and methods of detecting incidents via images captured by image capture systems. According to various embodiments, a method includes identifying, by one or more processors, an image captured by an image capture device rotating about an axis. The image can be captured while the image capture device is set at a first angle about the axis having a field of view including a reference direction. The image corresponds to a time at which the image was captured. The method further includes identifying, by the one or more processors, within the image, a region of interest including an object to be used for calibration The method further includes determining, by the one or more processors, an image coordinate at which the object is displayed within the image. The method further includes determining, by the one or more processors, a camera angle corresponding to a position of the image capture system relative to the axis when the image was captured. The method further includes identifying, by the one or more processors, a bearing of the object relative to the reference direction. The bearing of the object can be determined using a geolocation of the image capture system and the time at which the image was captured. The method further includes determining, by the one or more processors, using the image coordinate, the camera angle, and the bearing of the object, an angular offset between the first angle and the reference direction to determine a second angle about the axis such that a center of a second image captured while the image capture system is set at the second angle corresponds to the reference direction.

According to various embodiments, the method further includes providing the second angle to a remote server for storage such that the remote server is configured to determine the reference direction in a subsequent image captured by the image capture device using the based on the second angle. According to various embodiments, the object comprises one of a sun, a moon, a physical landmark, or a star. According to various embodiments, the object comprises a moon and the image is taken during a full moon phase of the moon, a waxing gibbous phase of the moon, or a first quarter phase of the moon or the object comprises a sun and the image is taken within ninety minutes of sunrise or within ninety minutes of sunset. According to various embodiments, the reference direction is at least one of north, east, south, or west. According to various embodiments, the image coordinate includes a first pixel value identifying a first position along a horizontal axis of the image and a second pixel value identifying a second position along a vertical axis of the image. According to various embodiments, the image coordinate is determined based a total number pixels extending across the image in a horizontal direction and a number of pixels in the horizontal direction between the object and an edge of the image.

According to various embodiments, the method further includes coupling a leveling device to the image capture device, the leveling device configured to output an indication of an image capture device angle relative to the ground and adjusting the image capture device angle until the leveling device indicates the image capture device angle is less than or equal to 0.1 degrees.

According to various embodiments, the image capture device is a part of an incident detection system including a plurality of image capture devices orientated towards the reference direction, the incident detection system associating a respective second angle with each of the image capture devices.

According to various embodiments, the image capture device is a first image capture device of an image capture system installed at a geographic location. The axis about which the first image capture device rotates is a first axis and the image capture system can include a second image capture device that rotates about a second axis. The first image capture device is configured to capture a first plurality of images from zero to 360 degrees about the reference direction and the second image capture device is configured to capture a second plurality of images from zero to 360 degrees about the reference direction. A first subset of images of the first plurality of images can correspond to a first set of angles and a second subset of images of the second plurality of images can correspond to a second set of angles are used to generate a composite image.

According to various embodiments, a system includes an image capture device configured to rotate about an axis and capture an image while set at a first angle about the axis. The image capture device can have a field of view including a reference direction. The image can correspond to a time at which the image was captured. The system further includes a computing device including one or more processors configured to identify an image captured by an image capture device rotating about an axis. The image can be captured while the image capture device is set at a first angle about the axis having a field of view including a reference direction. The image corresponds to a time at which the image was captured. The one or more processors are configured to identify within the image, a region of interest including an object to be used for calibration. The one or more processors are configured to determine an image coordinate at which the object is displayed within the image. The one or more processors are configured to determine a camera angle corresponding to a position of the image capture system relative to the axis when the image was captured. The one or more processors are configured to identify a bearing of the object relative to the reference direction. The bearing of the object can be determined using a geolocation of the image capture system and the time at which the image was captured. The one or more processors are configured to determine, using the image coordinate, the camera angle, and the bearing of the object, an angular offset between the first angle and the reference direction to determine a second angle about the axis such that a center of a second image captured while the image capture system is set at the second angle corresponds to the reference direction.

According to various embodiments, the one or more processors are further configured to provide the second angle to a remote server. According to various embodiments, the object comprises one of a sun, a moon, a landmark, or a star. According to various embodiments, the object comprises a moon and the image is taken during a full moon phase of the moon, a waxing gibbous phase of the moon, or a first quarter phase of the moon or the object comprises a sun and the image is taken within ninety minutes of sunrise or within ninety minutes of sunset. According to various embodiments, the reference direction is one of north, east, south, or west. According to various embodiments, the image coordinate includes a first pixel value identifying a first position along a horizontal axis of the image and a second pixel value identifying a second position along a vertical axis of the image.

According to various embodiments, the image coordinate is determined based on a total number pixels extending across the image in a horizontal direction and a number of pixels in the horizontal direction between the object and an edge of the image.

According to various embodiments, the image capture device is configured to be coupled to a leveling device configured to output and indication of an image capture device angle relative to the ground, and wherein the image capture device includes a leveling adjustment mechanism configured to adjust the image capture device angle.

According to various embodiments, the image capture device is a part of an incident detection system including a plurality of image capture devices orientated towards the reference direction. The incident detection system can associate a respective second angle with each of the image capture devices.

According to various embodiments, the image capture device is a first image capture device of an image capture system installed at a geographic location. The axis about which the first image capture device rotates is a first axis and the image capture system can include a second image capture device that rotates about a second axis. The first image capture device is configured to capture a first plurality of images from zero to 360 degrees about the reference direction and the second image capture device is configured to capture a second plurality of images from zero to 360 degrees about the reference direction. A first subset of images of the first plurality of images can correspond to a first set of angles and a second subset of images of the second plurality of images can correspond to a second set of angles are used to generate a composite image.

According to various embodiments, a system includes a plurality of stations, each station includes a first image capture device configured to rotate about a first axis to capture a first plurality of images including a first constituent image and a second image capture device configured to rotate about a second axis to capture a second plurality of images including a second constituent image and a station computing device configured to transmit at least one of the first constituent image or the second constituent image. The system also includes a server including one or more processors configured to receive the at least one of the first constituent image or the second constituent image from the station, generate one or more composite images based at least partially on the at least one of the first constituent image or the second constituent image, store the one or more composite images as a plurality of partial images, and transmit the plurality of partial images. The system also includes a user computing device configured to receive the plurality of images from the server and execute a player configured to receive the plurality of partial images and generate a composite image based on the plurality of partial images.

According to various embodiments, the station includes a support comprising a cell tower, a telephone pole, a tree, or a lookout tower, wherein the image capture device is coupled to the support. According to various embodiments, the station computing device includes two or more SIM cards and is configured to switch between the two or more SIM cards.

As climate change creates warmer and drier conditions in various parts of the world, wild fires are expected to increase in both occurrence and severity. Yet, even without factoring the climate change, wild fires have posed threat to the safety of people and their property for years, causing numerous casualties and damage. Identifying and locating the wild fire occurrences as early as possible has proven to be of great importance to successfully containing them and minimizing the damage they cause. Unfortunately, many wild fires are not identified for hours, or even longer, allowing them to burn many forests and spread to the populated areas. The present solution provides systems and methods for early detection and location of the wild fires, thus allowing for shorter response times to the fires and their containment and elimination.

It should be appreciated that although the present solution discusses the use of the present disclosure to detect incidents such as wild fires, the present disclosure is not limited to detecting wild fires but extends to detecting various incidents that may occur in a physical environment and that can be detected via images captured by one or more image capture systems. Examples of such incidents can include natural disasters, such as floods, mudslides, wild fires, tornados, among others. In addition, other examples of incidents that can be detected may be manmade events or events that are caused by humans, for example, vehicular accidents, security incidents, among others.

The present solution relies on one or more image capture systems mounted on various high-visibility locations, such as mountaintops or hills, to continuously capture images of broad areas around such locations. The images captured can cover up to 360 degrees around the axis of the image capture system and can be used by remote systems, including remote servers or cloud services, as constituent images to form wide-view, panoramic, composite single images covering 360 degrees around the axis of the image capture system. The composite images can also include a bearing that can include indication of angles with respect to a particular direction about the axis for each portion of the composite image. Using this approach, composite images corresponding to different time intervals can be generated, thereby allowing for a view of the entire imaged area in accordance with identified bearing angle for each imaged location. To improve the transmission of constituent images over a network, the constituent images can be partitioned into parts, which can then be sent over a network to be displayed on different computing devices. Users can utilize computing devices to reconstruct the partitioned composite images and play a sequence of the reconstructed composite images in accordance with the respective time intervals for each composite image, thereby viewing potential wild fire incidents using reconstructed composite images, chronologically.

At least one aspect of the present disclosure is directed to a system. The system can include one or more processors of one or more servers coupled to memory. The one or more processors can be configured to identify a first plurality of constituent images captured by an image capture system rotating about an axis over a first time period. Each constituent image of the first plurality of constituent images can correspond to a respective angle about the axis and a respective time within the first time period. The one or more processors can generate a first composite image based on the first plurality of constituent images arranged according to the respective angles of each of the first plurality of constituent images. The one or more processors can partition the first composite image into a first plurality of partial images. Each partial image of the first plurality of partial images can be associated with a respective angle relative to a reference direction. The one or more processors can identify a second plurality of constituent images captured by the image capture system rotating about the axis over a second time period. Each image of the second plurality of constituent images can correspond to a respective angle about the axis and a respective time within the second time period. The one or more processors can generate a second composite image based on the second plurality of constituent images arranged according to the respective angles of the second plurality of constituent images. The one or more processors can partition the second composite image into a second plurality of partial images. Each partial image of the second plurality of partial images can be associated with a respective angle relative to the reference direction. The one or more processors can transmit, to a client device, for presentation via a player, each of the first plurality of partial images and the second plurality of partial images and the corresponding respective angle relative to the reference direction. The player can be configured to reconstruct the first composite image from the first plurality of partial images and the second composite image from the second plurality of partial images and sequentially present the first composite image and the second composite image in accordance with the first time period and the second time period.

The one or more processors of the system can be configured to select, from the first plurality of constituent images, a first group of constituent images. Each constituent image of the first group can be selected based on the respective angle about the axis corresponding to the constituent image. The one or more processors can select, from the second plurality of constituent images, a second group of constituent images. Each image of the second group can be selected based on the respective angle about the axis corresponding to the constituent image.

The first group of constituent images of the system can include a subset of the first plurality of constituent images. Each respective constituent image of the subset of the first plurality can include a first portion overlapping with a second portion of at least one of a preceding or a subsequent respective constituent image of the subset of the first plurality. The second group of constituent images can include a subset of the second plurality of constituent images. Each respective constituent image of the subset of the second plurality can include a third portion overlapping with a fourth portion of at least one of a preceding or a subsequent respective constituent image of the subset of the second plurality.

The image capture system can include a first image capture device capturing a first group of the first plurality of constituent images over at least a first 180 degrees about the axis and a first group of the second plurality of constituent images over at least the first 180 degrees about the axis. The image capture system can include a second image capture device capturing a second group of the first plurality of constituent images over at least a second 180 degrees about the axis and a second group of the second plurality of constituent images over at least the second 180 degrees about the axis.

The player can be configured to include a zoom function, in which a zoom level of the player adjusted during the presentation of the first composite image can remain unchanged during the presentation of the second composite image. The first plurality of constituent images can be captured by the image capture system at a different point in time within the first time period, and each of the second plurality of constituent images can be captured by the image capture system at a different point in time within the second time period.

The one or more processors of the system can be configured to identify each constituent image of the first plurality of constituent images based on the respective angle of the constituent image, wherein the respective angle can be determined based on a reference direction. The one or more processors can be configured to generate the first composite image by connecting a second end of a central portion of a first constituent image of the first plurality of constituent images with a first end of a central portion of a second constituent image of the second plurality of constituent images, wherein a part of the first constituent image overlaps with a part of the second constituent image.

The one or more processors of the system can be configured to store, in one or more data structures, for each partial image of the first composite image, a respective first association between the partial image and a respective first bearing indicator indicating at least one respective angle relative to the reference direction. The one or more processors can be configured to store, in one or more data structures, for each partial image of the second composite image, a respective second association between the partial image and a respective second bearing indicator indicating at least one respective angle relative to the reference direction. The one or more processors can be configured to transmit, to the client device, each partial image of the first composite image and the respective first bearing indicator and each partial image of the second composite image and the respective second bearing indicator.

The play can include an actionable object, which when interacted with, causes the player to navigate between the first composite image derived from the first plurality of constituent images captured over the first time period and the second composite image derived from the second plurality of constituent images captured over the second time period. The player can be configured to include a zoom function, and wherein adjusting the zoom of the first composite image causes the player to adjust a resolution of the first composite image. The player can be configured to include a pan function. Panning the first composite image of the player to display a first portion of the first composite image corresponding to a first set of angles can cause the player to display a portion of the second composite image corresponding to the first set of angles.

At least one aspect of the present disclosure is directed to a method. The method can include the act of identifying, by one or more processors, a first plurality of constituent images captured by an image capture system rotating about an axis over a first time period. Each constituent image of the first plurality of constituent images can correspond to a respective angle about the axis and a respective time within the first time period. The method can include the act of generating, by the one or more processors, a first composite image based on the first plurality of constituent images arranged according to the respective angles of each of the first plurality of constituent images. The method can include an act of partitioning, by the one or more processors, the first composite image into a first plurality of partial images. Each partial image of the first plurality of partial images can be associated with a respective angle relative to a reference direction. The method can include the act of identifying, by the one or more processors, a second plurality of constituent images captured by the image capture system rotating about the axis over a second time period. Each image of the second plurality of constituent images can correspond to a respective angle about the axis and a respective time within the second time period. The method can include the act of generating, by the one or more processors, a second composite image based on the second plurality of constituent images arranged according to the respective angles of the second plurality of constituent images. The method can include the act of partitioning, by the one or more processors, the second composite image into a second plurality of partial images. Each partial image of the second plurality of partial images can be associated with a respective angle relative to the reference direction. The method can include the act of transmitting, by the one or more processors, to a client device, for presentation via a player, each of the first plurality of partial images and the second plurality of partial images and the corresponding respective angle relative to the reference direction. The player can be configured to reconstruct the first composite image from the first plurality of partial images and the second composite image from the second plurality of partial images and sequentially present the first composite image and the second composite image in accordance with the first time period and the second time period.

The method can include each of the first plurality of constituent images captured by the image capture system at a different point in time within the first time period and each of the second plurality of constituent images captured by the image capture system at a different point in time within the second time period. The method can include each constituent image of the first plurality of constituent images identified based on the respective angle of the constituent image, wherein the respective angle can be determined based on a reference direction.

The method can include the act of storing, by a device, in one or more data structures, a first association between the first composite image and a first bearing indicator indicating a first range of angles about the axis and along a width of the first composite image. The first range of angles can include the respective angles of each of the first group of constituent images. The method can include storing, by the device, in the one or more data structures, a second association between the second composite image and a second bearing indicator indicating a second range of angles about the axis and along a width of the second composite image. The second range of angles can include the respective angles of each of the second group of constituent images. The method can include the act of combining, by the device, for presentation via the player, the first composite image with the first bearing indicator and the second composite image with the second bearing indicator.

The method can include the act of storing, in one or more data structures, for each partial image of the first composite image, a respective first association between the partial image and a respective first bearing indicator indicating at least one respective angle relative to the reference direction. The method can include storing, in the one or more data structures, for each partial image of the second composite image, a respective second association between the partial image and a respective second bearing indicator indicating at least one respective angle relative to the reference direction. The method can include transmitting, to the client device, each partial image of the first composite image and the respective first bearing indicator and each partial image of the second composite image and the respective second bearing indicator.

The method can include the act in which generating the first composite image comprises generating the first composite image by connecting a second end of a central portion of a first constituent image of the first plurality of constituent images with a first end of a central portion of a second constituent image of the second plurality of constituent images. A part of the first constituent image can overlap with a part of the second constituent image. The method can include the player that includes an actionable object, which when interacted with, causes the player to navigate between the first composite image derived from the first plurality of constituent images captured over the first time period and the second composite image derived from the second plurality of constituent images captured over the second time period. The method can include the player that is configured to include a pan function, in which panning the first composite image of the player to display a first portion of the first composite image corresponding to a first set of angles causes the player to display a portion of the second composite image corresponding to the first set of angles.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

In one aspect, this disclosure is directed to a system. The system may include a plurality of image capture systems of respective stations located at separate geographic locations. The system may include one or more processors communicably coupled to the plurality of image capture systems. The one or more processors may be configured to maintain, in one or more data structures, for each station of a plurality of stations, a respective set of geographic coordinates indicating a location of the station at which one or more image capture systems of the station are configured to capture images. The one or more processors may be configured to identify, in a first image obtained from a first image capture system of a first station at a first set of geographic coordinates, a first indicator of an incident at a first geolocation. The first indicator can correspond to first pixel coordinates within the first image. The first image can correspond to a first range of angles about a first axis of rotation of the first image capture system in which the first range of angles is relative to a first reference direction. The one or more processors may be configured to determine a first angle of the first range of angles corresponding to the first pixel coordinates for the first indicator, using a data structure maintaining associations between pixel coordinates of pixels within a given image and angles associated with respective pixels. The one or more processors may be configured to identify, in a second image obtained from a second image capture system of a second station at a second set of geographic coordinates, a second indicator of the incident at the first geolocation. The second indicator can correspond to second pixel coordinates within the second image. The second image corresponds to a second range of angles about a second axis of rotation of the second image capture system. The second range of angles are relative to a second reference direction. The one or more processors may be configured to determine a second angle of the second range of angles corresponding to the second pixel coordinates for the second indicator, using the data structure. The one or more processors may be configured to determine a third set of geographic coordinates for the first geolocation associated with the incident based on the first set of geographic coordinates, the first angle, the second set of geographic coordinates, and the second angle. The one or more processors may be configured to provide an output indicating the third set of geographic coordinates.

In some embodiments, determining the third set of geographic coordinates is based on an intersection of a first line extending away from the first set of geographic coordinates along the first angle and a second line extending away from the second set of geographic coordinates along the second angle. In some embodiments, the first reference direction is different from the second reference direction. In some embodiments, the first reference direction is North and the second reference direction is North. In some embodiments, the first image is a first composite image.

The one or more processors may be further configured to identify a first plurality of constituent images captured by the first image capture system rotating about the first axis over a first time period, each constituent image of the first plurality of constituent images corresponding to a respective angle about the axis and a respective time within the first time period. The one or more processors may be further configured to select, from the first plurality of constituent images, a first group of constituent images, each constituent image of the first group selected based on the respective angle about the axis corresponding to the constituent image. The one or more processors may be further configured to generate the first composite image based on the first group of constituent images arranged according to the respective angles of each of the first group of constituent images. In some embodiments, the one or more processors are configured to receive a request to triangulate responsive to identifying the first indicator. The one or more processors may be further configured to select, from the plurality of stations, the second station based on the second set of geographic coordinates for the second station satisfying a selection criteria. The one or more processors may be further configured to determine the second range of angles about the second axis of rotation of the second image capture system based on the first angle corresponding to the first indicator, the second set of geographic coordinates, and the first reference direction. The one or more processors may be further configured to generate the second indicator in the second image at a second angle of the second range of angles corresponding to the incident.

In some embodiments, the one or more processors are configured to cause a device to display, on a user interface of the device, a time-lapse series of composite images with a viewing region which includes a portion of the composite images including the first indicator or the second indicator. In some embodiments, the user interface includes one or more interface elements to selectively display images of the incident obtained from the first image capture system or the second image capture system. In some embodiments, the one or more processors are further configured to cause a device to display a map including an incident marker at an intersection between a first angular path along the first angle extending from the first set of geographic coordinates and a second angular path along the second angle extending from the second set of geographic coordinates. In some embodiments, the map further displays representations of first angular path, the second angular path, the first image capture system, and the second image capture system. In some embodiments, providing the output further includes transmitting an alert including data corresponding to the third set of geographic coordinates to one or more remote computing devices.

In another aspect, this disclosure is directed to a method. The method may include maintaining, by one or more processors, in one or more data structures, for each station of a plurality of stations, a respective set of geographic coordinates indicating a location of the station at which one or more image capture systems of the station are configured to capture images. The method may include identifying, by the one or more processors, in a first image obtained from a first image capture system of a first station at a first set of geographic coordinates, a first indicator of an incident at a first geolocation, the first indicator corresponding to first pixel coordinates within the first image, the first image corresponding to a first range of angles about a first axis of rotation of the first image capture system, the first range of angles relative to a first reference direction. The method may include determining, by the one or more processors, a first angle of the first range of angles corresponding to the first pixel coordinates for the first indicator, using a data structure maintaining associations between pixel coordinates of pixels within a given image and angles associated with respective pixels. The method may include identifying, by the one or more processors, in a second image obtained from a second image capture system of a second station at a second set of geographic coordinates, a second indicator of the incident at the first geolocation, the second indicator corresponding to second pixel coordinates within the second image, the second image corresponding to a second range of angles about a second axis of rotation of the second image capture system, the second range of angles relative to a second reference direction. The method may include determining, by the one or more processors, a second angle of the second range of angles corresponding to the second pixel coordinates for the second indicator, using the data structure. The method may include determining, by the one or more processors, a third set of geographic coordinates for the first geolocation associated with the incident based on the first set of geographic coordinates, the first angle, the second set of geographic coordinates, and the second angle. The method may include providing, by the one or more processors, an output indicating the third set of geographic coordinates.

In some embodiments, determining the third set of geographic coordinates is based on an intersection of a first line extending away from the first set of geographic coordinates along the first angle and a second line extending away from the second set of geographic coordinates along the second angle. In some embodiments, the first image is a first composite image. The method may further include identifying, by the one or more processors, a first plurality of constituent images captured by the first image capture system rotating about the first axis over a first time period, each constituent image of the first plurality of constituent images corresponding to a respective angle about the axis and a respective time within the first time period. The method may further include selecting, by the one or more processors, from the first plurality of constituent images, a first group of constituent images, each constituent image of the first group selected based on the respective angle about the axis corresponding to the constituent image. The method may further include generating, by the one or more processors, the first composite image based on the first group of constituent images arranged according to the respective angles of each of the first group of constituent images.

In some embodiments, the method further includes receiving, by the one or more processors, a request to triangulate responsive to identifying the first indicator. The method may further include selecting, by the one or more processors, from the plurality stations, the second station based on the second set of geographic coordinates for the second station satisfying a selection criteria. The method may further include determining, by the one or more processors, the second range of angles about the second axis of rotation of the second image capture system based on the first angle corresponding to the first indicator, the second set of geographic coordinates, and the first reference direction. The method may further include generating, by the one or more processors, the second indicator in the second image at a second angle of the second range of angles corresponding to the incident.

In some embodiments, the method includes causing, by the one or more processors, a time-lapse series of composite images to be displayed on a user interface of a device, with a viewing region which includes a portion of the first or second images including the first indicator or the second indicator. In some embodiments, the method includes causing, by the one or more processors, displaying of a map including an incident marker at an intersection between a first angular path along the first angle extending from the first set of geographic coordinates and a second angular path along the second angle extending from the second set of geographic coordinates. In some embodiments, the map further displays representations of first angular path, the second angular path, the first image capture system, and the second image capture system. In some embodiments, providing the output further includes transmitting an alert including data corresponding to the third set of geographic coordinates to one or more remote computing devices.

In another aspect, this disclosure is directed to a non-transitory computer readable medium storing instructions that, when executed by one or more processors, cause the one or more processors to maintain, in one or more data structures, for each station of a plurality of stations, a respective set of geographic coordinates indicating a location of the station at which one or more image capture systems of the station are configured to capture images. The instructions may cause the one or more processors to identify, in a first image obtained from a first image capture system of a first station at a first set of geographic coordinates, a first indicator of an incident at a first geolocation, the first image corresponding to a first range of angles about a first axis of rotation of the first image capture system, the first range of angles relative to a first reference direction. The instructions may cause the one or more processors to determine a first angle of the first range of angles corresponding to the first indicator. The instructions may cause the one or more processors to identify, in a second image obtained from a second image capture system of a second station at a second set of geographic coordinates, a second indicator of the incident at the first geolocation, the second image corresponding to a second range of angles about a second axis of rotation of the second image capture system, the second range of angles relative to a second reference direction. The instructions may cause the one or more processors to determine a second angle of the second range of angles corresponding to the second indicator. The instructions may cause the one or more processors to determine a third set of geographic coordinates for the first geolocation associated with the incident based on the first set of geographic coordinates, the first angle, the second set of geographic coordinates, and the second angle. The instructions may cause the one or more processors to provide an output indicating the third set of geographic coordinates.

According to various embodiments, a system includes a server including one or more processor configured to maintain a first plurality of images, each image of the first plurality of images captured by an image capture system rotating about an axis, each image of the first plurality of images corresponding to a respective range of angles about the axis and a respective time at which the image was captured, provide a first image of the first plurality of images to a first machine learning model trained to detect incidents within images using a plurality of training images, each training image including a first incident indicator identifying a region of interest within the training image that displays a respective incident, determine, responsive to providing the first image to the first machine learning model, that the incident is not detected within the first image, provide a first sequence of images including the first image to a second machine learning model to detect incidents within at least one of the sequence of images, the second machine learning model trained using a plurality of training sequence of images, each training sequence of images including a second incident indicator identifying, within at least one image of the training sequence of images, a region of interest indicating a corresponding incident, determine, responsive to providing the first sequence of images to the second machine learning model, that the incident is detected within the first sequence of images, and store, responsive to determining that the incident is not detected within the first image using the first machine learning model and responsive to determining that the incident is detected within the first sequence of images, an association between the at least one image of the first sequence of images and a label indicating that the incident is detectable in the sequence of images but not detectable in the first image.

According to various embodiments, the one or more processors are configured to training the first machine learning model using a second plurality of training images, each training image of the second plurality of training images associated with a second label indicating that the image does not display the incident. According to various embodiments, each image of the first sequence of images is captured by the image capture system and corresponds to a first range of angles about the axis, wherein the first image is captured at a first time, a second image of the sequence of images is captured at a second time subsequent to the first time and a third image of the sequence of images is captured at a third time subsequent to the second time.

According to various embodiments, the one or more processors are configured to: identify the first sequence of images including the first image and at least two subsequent images arranged in chronological order based on the respective time at which each image of the second sequence of images was captured, identify a second sequence of images including at least one preceding image, the first image and at least one subsequent image arranged in chronological order based on the respective time at which each image of the second sequence of images was captured, identify a third sequence of images including at least two preceding images and the first image arranged in chronological order based on the respective time at which each image of the second sequence of images was captured, and provide the second sequence of images and the third sequence of images to the second machine learning model.

According to various embodiments, the one or more processors are configured to transmit, to a computing device, the first sequence of images responsive to storing the association between the at least one image of the first sequence of images and the label. According to various embodiments, successive images of the first sequence of images are captured within a predetermined time, wherein the predetermined time is less than 15 minutes. According to various embodiments, the first machine learning model is a Faster Region Convolution Network (R-CNN).

According to various embodiments, the one or more processors are configured to determine a confidence score indicating a likelihood that the region of interest includes an incident. According to various embodiments, the one or more processors are configured to assign, to each image of the first plurality of images, at least one attribute including a weather attribute indicating a type of weather detected in the image, a time attribute indicating a time at which the image was taken, or a groundcover attribute indicating whether snow is detected on a ground.

According to various embodiments, the first machine learning model and the second machine learning model are trained using the at least one attribute assigned to each image, and wherein a confidence score indicating a likelihood that the region of interest identifies the incident is based on the at least one attribute assigned to the respective image. According to various embodiments, the one or more processors are configured to receive feedback indicative of an accuracy of the label, and update the first machine learning model and the second machine learning model based on the feedback.

According to various embodiments, a method includes maintaining, by one or more processors, a first plurality of images, each image of the first plurality of images captured by an image capture system rotating about an axis, each image of the first plurality of images corresponding to a respective range of angles about the axis and a respective time at which the image was captured, providing, by the one or more processors, a first image of the first plurality of images to a first machine learning model trained to detect incidents within images using a plurality of training images, each training image including a first incident indicator identifying a region of interest within the training image that displays a respective incident, determining, by the one or more processors, responsive to providing the first image to the first machine learning model, that the incident is not detected within the first image, providing, by the one or more processors, a first sequence of images including the first image to a second machine learning model to detect incidents within at least one of the sequence of images, the second machine learning model trained using a plurality of training sequence of images, each training sequence of images including a second incident indicator identifying, within at least one image of the training sequence of images, a region of interest indicating a corresponding incident, determining, by the one or more processors, responsive to providing the first sequence of images to the second machine learning model, that the incident is detected within the first sequence of images, and storing, by the one or more processors, responsive to determining that the incident is not detected within the first image using the first machine learning model and responsive to determining that the incident is detected within the first sequence of images, an association between the at least one image of the first sequence of images and a label indicating that the incident is detectable in the sequence of images but not detectable in the first image.

According to various embodiments, the method includes training the first machine learning model using a second plurality of training images, each training image of the second plurality of training images associated with a second label indicating that the image does not display the incident. According to various embodiments, each image of the first sequence of images is captured by the image capture system and corresponds to a first range of angles about the axis, wherein the first image is captured at a first time, a second image of the sequence of images is captured at a second time subsequent to the first time and a third image of the sequence of images is captured at a third time subsequent to the second time. According to various embodiments, the method includes identifying, by the one or more processors, the first sequence of images including the first image and at least two subsequent images arranged in chronological order based on the respective time at which each image of the second sequence of images was captured, identifying, by the one or more processors, a second sequence of images including at least one preceding image, the first image and at least one subsequent image arranged in chronological order based on the respective time at which each image of the second sequence of images was captured, identifying a third sequence of images including at least two preceding images and the first image arranged in chronological order based on the respective time at which each image of the second sequence of images was captured, and providing the second sequence of images and the third sequence of images to the second machine learning model. According to various embodiments, the method includes transmitting, to a computing device, the first sequence of images responsive to storing the association between the at least one image of the first sequence of images and the label. According to various embodiments, successive images of the first sequence of images are captured within a predetermined time, wherein the predetermined time is less than 15 minutes. According to various embodiments, the first machine learning model is a Faster Region Convolution Network (R-CNN). According to various embodiments, the method includes determining, by the one or more processors, a confidence score indicating a likelihood that the region of interest includes an incident. According to various embodiments, the method includes assigning, to each image of the first plurality of images, at least one attribute including a weather attribute indicating a type of weather detected in the image, a time attribute indicating a time at which the image was taken, or a groundcover attribute indicating whether snow is detected on a ground.

In one aspect, this disclosure is directed to a system. The system may include a server including one or more processors configured to maintain, in one or more data structures, for each station of a plurality of stations, a respective first set of geographic coordinates indicating a location of the station at which one or more image capture systems of the station are configured to capture images. The processor(s) may be configured to determine a second set of geographic coordinates for an incident, based on information corresponding to a geographic area of interest of the incident included in a notification. The processor(s) may be configured to select, from the plurality of stations, a first station based on a distance between the respective first set of geographic coordinates for the first station and the second set of geographic coordinates for the incident. The processor(s) may be configured to determine a viewing region for viewing the geographic area of interest in images captured from one or more image capture systems of the first station located at the first set of geographic coordinates, based on an angle from the first set of geographic coordinates of the first station relative to the second set of geographic coordinates. The processor(s) may be configured to present a user interface on a computing device, the user interface showing images captured from the one or more image capture systems of the first station, with the images having a viewport instantiated on the user interface according to the viewing region.

In some embodiments, the processor(s) are configured to select one or more images captured by the one or more image capture systems of the first station, based on a timestamp of the alert and the angle. The processor(s) may be configured to cause display of the one or more images with a field-of-view spanning a range of angles about an axis of rotation of the first image capture system, the range of angles including the angle. In some embodiments, the processor(s) are configured to perform image analysis on the one or more images to generate an indicator on at least one image of the one or more images corresponding to the geographic area of interest of the incident. In some embodiments, the one or more processors are configured to identify the timestamp associated with the alert. The processor(s) may be configured to select, from a plurality of images captured from the image capture system, the one or more images captured within a predetermined duration of the timestamp. The processor(s) may be configured to perform image analysis on the one or more images to generate an indicator on at least one image. In some embodiments, the information corresponding to the geographic area of interest includes a description of a location of the incident, and the second set of geographic coordinates are determined based on the description of the location of the incident.

In some embodiments, the one or more processors are configured to detect the incident at a location depicted in the one or more images, and generate an indicator corresponding to the location of the incident on the one or more images. In some embodiments, the angle is a first angle, the image capture system is a first image capture system located at a first geographic location, the range of angles is a first range of angles about a first axis of rotation of the first image capture system, and the indicator is a first indicator. The processor(s) may be configured to determine a second angle of the first range of angles corresponding to the first indicator. The processor(s) may be configured to identify, in a second image obtained from a second image capture system of a second station at a third set of geographic coordinates, a second indicator of the incident at the location, the second image corresponding to a second range of angles about a second axis of rotation of the second image capture system, the second range of angles relative to a second reference direction. The processor(s) may be configured to determine a second angle of the second range of angles corresponding to the second indicator. The processor(s) may be configured to determine a fourth set of geographic coordinates for the first geolocation associated with the incident based on the first set of geographic coordinates, the first angle, the third set of geographic coordinates, and the second angle. In some embodiments, the first range of angles and the second range of angles are relative to a common reference direction.

In some embodiments, the one or more processors are configured to subscribe to a feed on which the notifications are published, and receive the notification published to the feed. In some embodiments, the notification is a first notification and wherein the one or more processors are configured to transmit a second notification to a device, the second notification including a third set of geographic coordinates of the incident, the third set of geographic coordinates determined based on the one or more images of the incident captured by the image capture system and one or more additional images of the incident captured by another image capture system.

In another aspect, this disclosure is directed to a method. The method may include maintaining, by one or more processors, in one or more data structures, for each station of a plurality of stations, a respective first set of geographic coordinates indicating a location of the station at which one or more image capture systems of the station are configured to capture images. The method may include determining, by the one or more processors, a second set of geographic coordinates for an incident, based on information corresponding to a geographic area of interest of the incident included in a notification of the incident. The method may include selecting, by the one or more processors, from the plurality of stations, a first station based on a distance between the respective first set of geographic coordinates for the first station and the second set of geographic coordinates for the incident. The method may include determining, by the one or more processors, a viewing region for viewing the geographic area of interest in images captured from one or more image capture systems of the first station located at the first set of geographic coordinates, based on an angle from the first set of geographic coordinates of the first station relative to the second set of geographic coordinates. The method may include presenting, by the one or more processors, on a computing device, a user interface showing images captured from the one or more image capture systems of the first station, with the images having a viewport instantiated on the user interface according to the viewing region.

In some embodiments, the method includes electing, by the one or more processors, one or more images captured by the one or more image capture systems of the first station, based on a timestamp of the alert and the angle. The method may include causing, by the one or more processors, display of the one or more images with a field-of-view spanning a range of angles about an axis of rotation of the first image capture system, the range of angles including the angle. In some embodiments, the method includes performing, by the one or more processors, image analysis on the one or more images to generate an indicator on at least one image of the one or more images corresponding to the geographic area of interest of the incident.

In some embodiments, the method includes identifying, by the one or more processors, the timestamp associated with the alert, and selecting, by the one or more processors, from a plurality of images captured from the image capture system, the one or more images captured within a predetermined duration of the timestamp. The method may further include performing, by the one or more processors, image analysis on the one or more images to generate an indicator on at least one image. In some embodiments, the information corresponding to the geographic area of interest includes a description of a location of the incident, and the second set of geographic coordinates are determined based on the description of the location of the incident.

In some embodiments, the method includes detecting, by the one or more processors, the incident at a location depicted in the one or more images, and generating, by the one or more processors, an indicator corresponding to the location of the incident on the one or more images. In some embodiments, the angle is a first angle, the image capture system is a first image capture system located at a first geographic location, the range of angles is a first range of angles about a first axis of rotation of the first image capture system, and the indicator is a first indicator. The method may further include determining, by the one or more processors, a second angle of the first range of angles corresponding to the first indicator. The method may further include identifying, by the one or more processors, in a second image obtained from a second image capture system of a second station at a third set of geographic coordinates, a second indicator of the incident at the location, the second image corresponding to a second range of angles about a second axis of rotation of the second image capture system, the second range of angles relative to a second reference direction. The method may further include determining, by the one or more processors, a second angle of the second range of angles corresponding to the second indicator. The method may further include determining, by the one or more processors, a fourth set of geographic coordinates for the first geolocation associated with the incident based on the first set of geographic coordinates, the first angle, the third set of geographic coordinates, and the second angle. In some embodiments, the first range of angles and the second range of angles are relative to a common reference direction.

In some embodiments, the method may include subscribing, by the one or more processors, to the feed. The method may further include receiving, by the one or more processors, the notification published to the feed. In some embodiments, the notification is a first notification. The method may further include transmitting, by the one or more processors, a second notification to a device, the second notification including a third set of geographic coordinates of the incident, the third set of geographic coordinates determined based on the one or more images of the incident captured by the image capture system and one or more additional images of the incident captured by another image capture system.

In one aspect, this disclosure is directed to a system. The system may include one or more processors coupled to memory. The one or more processors may be configured to identify an indicator indicating an incident at a region of interest within a composite image, the region of interest corresponding to an angle relative to a reference direction, the composite image comprising a plurality of partial images arranged in a sequence in accordance with a respective position assigned to each partial image, the plurality of partial images including a first partial image associated with the indicator. The one or more processors may be configured to select, from the plurality of partial images, a first subset of partial images to send to a computing device, based on a position of partial images of the first subset relative to a position of the first partial image. The one or more processors may be configured to transmit, to the computing device, the first subset of partial images to the computing device prior to transmitting a second subset of partial images of the plurality of images.

In some embodiments, the one or more processors are further configured to assign a respective priority to each of the plurality of partial images based on the position of the partial image relative to the position of the first partial image. The first subset of partial images may be selected based on the priority assigned to the partial images of the first subset. In some embodiments, the one or more processors are further configured to partition the composite image into the plurality of partial images, each partial image of the plurality of partial images associated with a respective angle relative to a reference direction.

In some embodiments, the one or more processors may be configured to identify a first plurality of constituent images captured by an image capture system rotating about an axis over a first time period, each constituent image of the first plurality of constituent images corresponding to a respective angle about the axis and a respective time within the first time period. The one or more processors may be configured to generate the composite image based on the first plurality of constituent images arranged according to the respective angles of each of the first plurality of constituent images. The one or more processors may be configured to partition the composite image into the plurality of partial images, each partial image of the first plurality of partial images associated with a respective angle relative to a reference direction.

In some embodiments, the computing device includes a player executing on the computing device. The player may be configured to reconstruct a portion of the composite image using the first subset of images. The player may be configured to display the reconstructed portion of the composite image including the region of interest corresponding to the angle at a central portion of the viewport. In some embodiments, the computing device is configured to receive the second subset of partial images and the player is configured to combine the second subset of partial images to the reconstructed portion of the composite image in accordance with positions assigned to the second subset of partial images. In some embodiments, the composite image spans a range of angles relative to the reference direction. Each partial image may correspond to a respective subset of angles of the range of angles. The position assigned to a respective partial image in the sequence may be based on the subset of angles for the partial image within the range of angles. In some embodiments, the one or more processors are further configured to identify, responsive to providing the composite image to a machine learning model, the region of interest corresponding to the incident. The one or more processors may be configured to provide the indicator at the region of interest corresponding to the incident.

In another aspect, this disclosure is directed to a method. The method may include identifying, by one or more processors, an indicator indicating an incident at a region of interest of a composite image, the region of interest corresponding to an angle relative to a reference direction, the composite image comprising a plurality of partial images arranged in a sequence in accordance with a respective position assigned to each partial image, the plurality of partial images including a first partial image associated with the indicator. The method may include selecting, by the one or more processors, from the plurality of partial images, a first subset of partial images to send to a computing device, based on a position of partial images of the first subset relative to a position of the first partial image. The method may include transmitting, by the one or more processors, to the computing device, the first subset of partial images to the computing device prior to transmitting a second subset of partial images of the plurality of images.

In some embodiments, the method includes assigning a respective priority to each of the plurality of partial images based on the position of the partial images relative to the position of the first partial images. The first subset of partial images may be selected based on the priority assigned to the partial images of the first subset. In some embodiments, the method includes partitioning, by the one or more processors, the composite image into the plurality of partial images, each partial image of the plurality of partial images associated with a respective angle relative to a reference direction.

In some embodiments, the method includes obtaining, by the one or more processors, from the computing device, information used to determine a size of a viewport of the computing device. The method may include determining, by the one or more processors, based on the size of the viewport, a number of partial images to include in the first subset. In some embodiments, the method includes transmitting, by the one or more processors, a notification to the computing device prior to transmitting the first subset of partial images to the computing device, the notification including a link to access at least one partial image of the plurality of partial images. The method may include receiving, by the one or more processors from the computing device, a request identifying the information used to determine the size of the viewport of the computing device.

In some embodiments, the method includes identifying, by the one or more processors, a first plurality of constituent images captured by an image capture system rotating about an axis over a first time period, each constituent image of the first plurality of constituent images corresponding to a respective angle about the axis and a respective time within the first time period. The method may include generating, by the one or more processors, the composite image based on the first plurality of constituent images arranged according to the respective angles of each of the first plurality of constituent images. The method may include partitioning, by the one or more processors the composite image into the plurality of partial images, each partial image of the first plurality of partial images associated with a respective angle relative to a reference direction. In some embodiments, the composite image spans a range of angles relative to the reference direction, each partial image corresponds to a respective subset of angles of the range of angles, and the position assigned to a respective partial image in the sequence is based on the subset of angles for the partial image within the range of angles.

In some embodiments, the method includes identifying, by the one or more processors, responsive to providing the composite image to a machine learning model, the region of interest corresponding to the incident. The method may include providing, by the one or more processors, the indicator at the region of interest corresponding to the incident. In some embodiments, the method includes identifying, by the one or more processors, responsive to providing the composite image to a machine learning model, the region of interest corresponding to the incident. The method may include providing, by the one or more processors, the indicator at the region of interest corresponding to the incident.

BRIEF DESCRIPTION OF THE DRAWINGS

FIG. 17A show another image of the incident of FIG. 15A including an indicator, according to an exemplary embodiment.

FIG. 17B is a view of a map including an observation region of the image shown in FIG. 17A, according to an exemplary embodiment.

FIG. 25A is a view of a map showing a viewing region from a station included in the map of FIG. 24, according to an exemplary embodiment.

FIG. 25B is a view of an image captured from an image capture system of the station of FIG. 25A and having the viewing region, according to an exemplary embodiment.

FIG. 29A-FIG. 29D show a series of views of the computing device as the computing device receives partial images from the server, according to an exemplary embodiment.

DETAILED DESCRIPTION

Figure 1A:
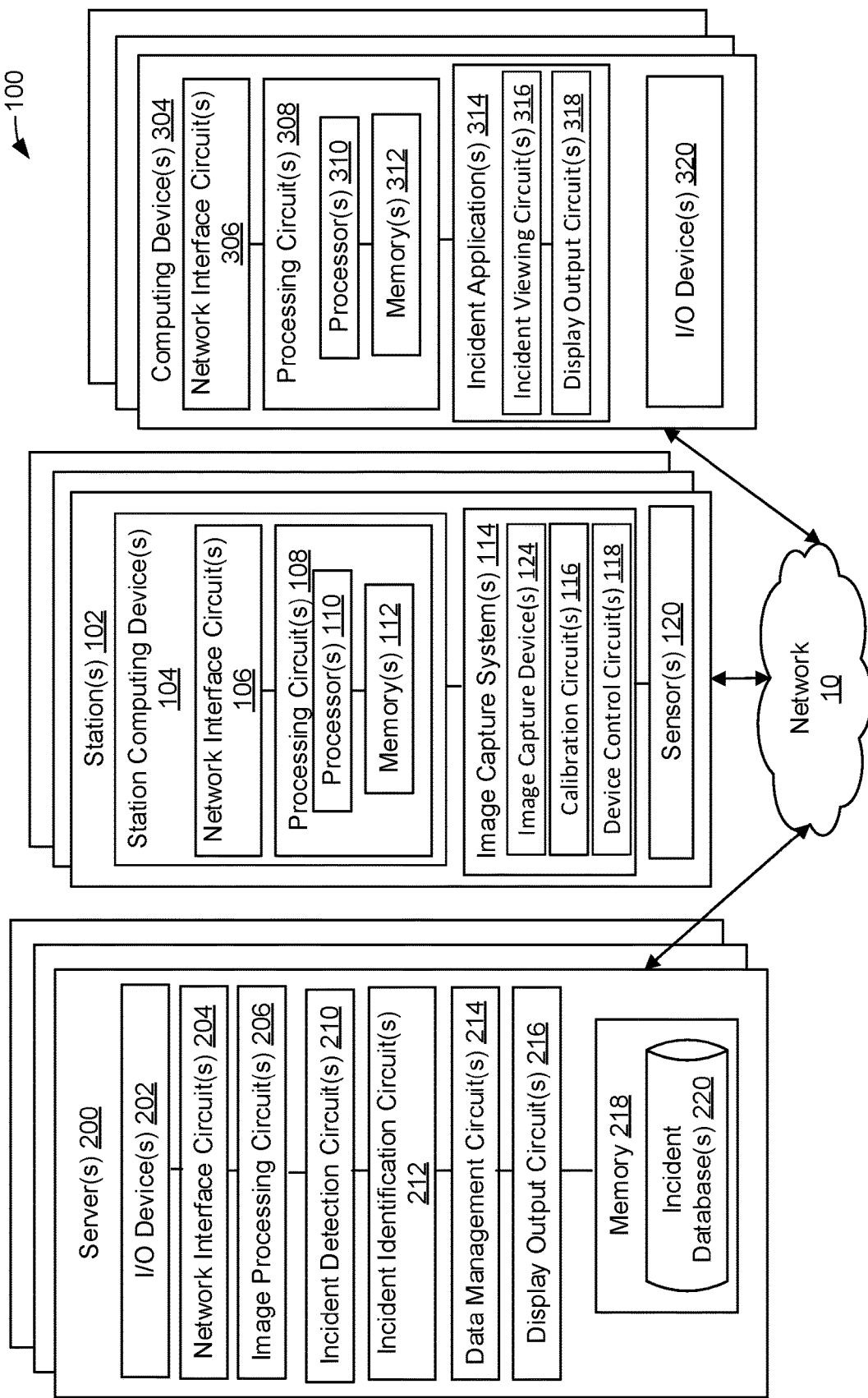
FIG. 1A is a schematic illustration of an incident detection system, according to an exemplary embodiment.

For purposes of reading the description of the various embodiments below, the following descriptions of the sections of the specification and their respective contents may be helpful:

Section A describes an overview of an incident detection system;

Section B describes calibration to reference direction of image capture systems of the incident detection system described in Section A;

Section C describes embodiments of image capture and time lapse panorama generation;

Section D describes embodiments of triangulating a location of an incident based on images captured from different image capture systems;

Section E describes embodiments of using machine learning models for generating image labels and detecting incidents;

Section F describes embodiments of image capture system and angle selection based on location data included in notifications;

Section G describes embodiments of systems and methods for prioritizing partial images for transmission; and Section H describes embodiments of a network environment and computing environment which may be useful for practicing embodiments described herein.

Referring to the figures generally, one or more systems and methods of smoke detection are described herein. The system includes a plurality of stations positioned at various geolocations positioned across a geographical area. Each station includes an image capture system configured to capture an image and one or more station computing devices configured to receive the image captured by the image capture system. Each image capture system includes one or more image capture devices configured to rotate about an axis such that the image capture system may capture an image while the one or more image capture devices are orientated in a desired direction. For example, the image capture system may be elevated above the ground such that the image capture system is configured to capture a portion of the horizon and the respective foreground. For example, according to various embodiments, the image capture system may capture a group of images that may be stitched together to create a composite image that shows a 360 degree view of the foreground surrounding the image capture system. According to various embodiments, the stations are configured to routinely (e.g., every one minute, every 10 minutes, etc.) capture the surrounding area such that the surrounding area can be monitored for incidents (e.g., smoke incidents, wildfires, landslides, car accidents, severe weather, theft, property damage, etc.), as discussed further herein.

As will be discussed further herein, the station computing device located at each station may associate one or more pieces of data (e.g., image attributes, metadata, etc.) with a given image or a group of images. For example, the station computing device may determine a relative angular orientation of the one or more image capture devices used to capture a given image. As is discussed further herein, each station may be calibrated such that the angular orientation of the one or more image capture devices is relative to a reference direction (e.g., north, south, east, west, etc.). For example, the station computing device may store a first angular orientation of a first image capture device, wherein the first angular orientation corresponds with north. In this example, when an image is captured by the first image capture device while the device is orientated in the first angular orientation, the station computing device may determine that a horizontal center of the image corresponds with the north direction. Thus, when an image is captured, the station computing device may associate data with the image that is indicative of the angular orientation of the image capture device relative to a reference direction such that a bearing of an object or a region of interest captured in the image relative to the image capture system may be subsequently determined, as is discussed further herein.

According to various embodiments, calibrating multiple image capture devices using the same reference direction, or a variant thereof (e.g., a first reference direction of north and a second reference direction of south), may facilitate identifying a location of an incident captured by multiple image capture devices, as is discussed further herein. For example, an incident detection system may determine a bearing of each image capture device relative to the same reference direction such that the geolocation of the incident captured by two different image capture systems may be estimated or determined. According to various embodiments, two different image capture devices may be orientated using different reference directions so long as those references directions have a direct relationship to one another (e.g., each of the cardinal directions are directly related to one another). It should be appreciated that orientating a first image capture device using a first reference direction and a second image capture device using a second reference direction may provide similar benefits so long as the first reference direction and the second reference direction are related to one another. For example, the first reference direction may be north and the second reference direction may be south. In this example embodiment, a first image capture device may be orientated using north as a reference direction while a second image capture device may be orientated using south as a reference directions. Since south is offset from north by 180 degrees, the second reference direction (e.g., south) may be used to determine the first reference direction (e.g., north).

According to various embodiments, images captured by the various stations, and data associated with the images, may be provided to a server for image processing. For example, the server may be configured to receive the images, maintain a database of the images, and provide one or more images and data associated with the image to a machine learning model trained to detect incidents within images. The machine learning model may be configured to identify a region of interest in an image that displays an incident. Once the region of interest is identified, the server may leverage the determined position of the region of interest within the image along with the angular orientation of the image capture device relative to the determined reference direction to determine a bearing (e.g., a direction of interest) of the incident relative to the respective image capture system. According to various example embodiments, the machine learning model may include a neural network, such as a deep convolution network used for object detection (e.g. a Faster Region Convolution Network (R-CNN)).

According to various embodiments, the incident detection system includes two or more stations configured to capture the same incident. For example, a plurality of stations may be distributed across a geographical area and the stations may be distributed such that most or all of the geographical area may be captured by two or more stations. For example, two or more stations may have a field of view overlap that covers a geographical area. When two or more image capture systems capture an incident in an image, which may be determined by the machine learning model, the server may leverage the location of the incident within each image and a geolocation of each of the stations to determine the bearing of the incident relative to the each of the respective image capture station to determine a geolocation of the incident, as will be discussed further herein. Thus, by leveraging a plurality of image capture stations distributed across a geographical area, the geographical area can be automatically monitored for incidents on a routine basis, thereby increasing the likelihood of early detection of a wildfire. Further, by automatically determining a geolocation of the incident, resources may be deployed to the geolocation immediately, thereby reducing the likelihood that the wildfire will continue to spread uncontrollably.

According to various embodiments, the server utilizes two or more machine learning models to identify incidents. For example, the server may receive a series of individual images taken over a time period. In this example, the series of images may be provided to a first machine learning model trained to detect incidents within images using a plurality of training images and each of the individual images may be provided to a second machine learning model trained to detect incidents within at least one of the sequence of images. As is discussed further below, discrepancies between the first model and the second model may be leveraged to train each model. Further, the first model and the second model may be leveraged to reduce the amount of data sent and/or received while monitoring geographical areas for incidents. For example, if the incident is only detectable in the series of images and not in an individual image, multiple images from the series may be provided to the computing device as a part of an alert. However, if a smoke event is detected by both the first model and the second model, just one individual image may be provided as a part of an alert to a computing device operated by a user of the system, thereby reducing the amount of data transmitted.

A. Overview of Incident Detection System

Referring now to FIG. 1, a schematic illustration of an incident detection system 100 is shown, according to an example embodiment. The incident detection system 100 (e.g., a smoke detection system, a fire detection system, landslide detection system, a car accident detection system, etc.) is configured to detect incidents via images captured from image capture systems in communication with the incident detection system. In some embodiments, the incident detection system 100 can be configured to detect smoke within one or more images and provide an alert in response to detecting the smoke according to embodiments of the present disclosure.

As shown in FIG. 1, the incident detection system 100 includes one or more servers 200 communicably and operably coupled to one or more stations 102 and/or one or more computing devices 304 via a network 10. In some embodiments, the one or more servers 200, one or more stations 102 and/or one or more computing devices 304 are directly communicably coupled. In some embodiments, the components of the incident detection system 100 may be communicably and operatively coupled to each other over a network, such as network 10, that permits the direct or indirect exchange of data, values, instructions, messages, and the like (represented by the double-headed arrows in FIG. 1). The network 10 may include one or more of a Local Area Network ("LAN"), a wide area network ("WAN"), a wireless network, a satellite communication system, acellular network, the Internet, Wi-Fi, Wi-Max, a proprietary provider network, a proprietary retail or service provider network, and/or any other kind of wireless or wired network.

Each system or device in the incident detection system 100 may include one or more processors, memories, network interfaces and user interfaces. The memory may store programming logic that, when executed by the processor, controls the operation of the corresponding computing system or device. The memory may also store data in databases or data structures. For example, memory 218 may store programming logic that when executed by one or more processors within one of the processing circuits (e.g., image processing circuit(s) 206, incident detection circuit(s) 210, incident identification circuit(s) 212, data management circuit(s) 214, display output circuit(s) 216, etc.), causes incident database(s) 220 to update information with communications received from a station(s) 102 and/or computing device(s) 304. The network interfaces (e.g., network interface circuit 204) may allow the computing systems and devices to communicate wirelessly or otherwise. The various components of devices in the incident detection system 100 may be implemented via hardware (e.g., circuitry), software (e.g., executable code), or any combination thereof. Devices and components in FIG. 1A can be added, deleted, integrated, separated, and/or rearranged in various embodiments of the disclosure.

The stations 102 are positioned at various geolocations across a geographical area and are configured to capture images of the surrounding area, associate data (e.g., image attributes, metadata, etc.) with the images, and provide the images and data to the server 200 for further processing. As shown in FIG. 1, each station 102 includes a station computing device(s) 104 communicably and operatively coupled to an image capture system(s) 114 and one or more sensor(s) 120.

As shown, the station computing device 104 includes a network interface circuit 106 that may allow the station computing device 104 to communicate wirelessly or otherwise. The network interface circuit 106 includes program logic that facilitates connection of the station computing device 104 to the network 10. For example, the network interface circuit 106 may include any combination of a wireless network transceiver (e.g., a cellular modem, a Bluetooth transceiver, a WiFi transceiver, etc.) and/or a wired network transceiver (e.g., an Ethernet transceiver). In some arrangements, the network interface circuit 106 includes the hardware and machine-readable media sufficient to support communication over multiple channels of data communication. Further, in some arrangements, the network interface circuit 106 includes cryptography capabilities to establish a secure or relatively secure communication session in which data communicated over the session is encrypted.

In some embodiments, the network interface circuit 106 can include a plurality of communication channels, ports, interfaces, or modules that enable the station computing device to communicate with the server 200 or other entities. The network interface circuit 106 can be configured to maintain two or more data or internet connections with the server 200 or other entities and can be configured to monitor each of the data or internet connections to determine which connection to use for data transmission. In some embodiments, the station computing device 104 can establish, maintain, or manage two or more cellular connections simultaneously via two or more subscriber identity module (SIM) cards that are coupled to the station computing device 104. In some embodiments, the network interface circuit 106 can be configured to monitor data transmission rates, error rates, or other metrics for each of the two or more cellular connections to select a cellular connection via which to transmit data. If the selected cellular connection fails to satisfy certain performance metrics, for instance, upload speed falling below a threshold limit, or data throughput falling below a threshold limit, the network interface circuit can select another cellular connection to be the cellular connection via which to transfer subsequent data. By maintaining multiple SIM card connections, the station computing device 104 can maintain network redundancy in the event that a first SIM card connection fails. In some embodiments, the SIM cards can belong to different network carriers such that if a first network carrier fails, the second SIM card belonging to a second network carrier can be used. In some embodiments, the one or more SIM cards are configured to communicate over a satellite communication system. It should be appreciated that the connection types can be cellular or non-cellular and the station computing device 104 can switch between a cellular connection and a non-cellular connection as well based on the network conditions of each type of connection.

As shown, the station computing device 104 includes a processing circuit 108 that includes one or more processors 110 coupled to one or more memories 112. The memory 112 may be one or more devices (e.g., RAM, ROM, Flash memory, hard disk storage) for storing data and/or computer code for completing and/or facilitating the various processes described herein. The memory 112 may be or include non-transient volatile memory, non-volatile memory, and non-transitory computer storage media. Memory 112 may include database components, object code components, script components, or any other type of information structure for supporting the various activities and information structures described herein. Memory 112 may be communicably coupled to the processor 110 and include computer code or instructions for executing one or more processes described herein. The processor 110 may be implemented as one or more application specific integrated circuits (ASICs), field programmable gate arrays (FPGAs), a group of processing components, or other suitable electronic processing components. As such, the station computing device 104 is configured to run a variety of application programs and store associated data in a database of the memory 112.

According to various embodiments, the memory 112 may store data associated with the station 102 and/or one or more station computing devices 104. For example, the memory 112 may store data such that the processor 110 may associate one or more pieces of data with subsequently captured images. For example, the memory 112 may store one or more indicators. According to various embodiments, the one or more indicators are added to the image as metadata. According to various embodiments, the one or more indicators may include a station identification indicator that is unique to the image capture system 114 and/or an image capture device identification indicator that is unique to the image capture device 124 used to capture the image. The one or more indicators may include a sequence indicator that is unique to a plurality of images (e.g., a sequence of images, a set of images, etc.). For example, some or all of the images captured in a sequence may include the same sequence indicator. The one or more indicators may include a time stamp indicator that indicates the time at which an individual image was captured or the times at which a plurality (e.g., sequence) of images were captured. The one or more indicators may include an image indictor that is unique to that image. The one or more indicators may include a device indicator that identifies the type of image capture device (e.g., make, model, image resolution, number of pixels in the horizontal direction, number of pixels in the vertical direction, the field of view of the device (e.g., epoch minutes and seconds), and/or any other attributes of the device) used to capture the image. The one or more indicators may include a geolocation indicator that indicates a geolocation (e.g., a latitude and/or a longitude) of the image capture device used to capture the image. The one or more indicators may include a structure indicator that indicates the type of structure the image capture device 124 is mounted to. The one or more indicators may include an elevation indicator that indicates the altitude of the image capture device 124 at the time the image was captured.

It should be appreciated that each indicator may also, or alternatively, be stored on one or more devices in the incident detection system 100. For example, a remote memory storage, such as cloud storage, the server 200, and/or the computing device 304 may store indicators associated with a specific station 102, image capture system 114, and/or a specific image capture device 124. In this example embodiment, the memory 112 of the station 102 may store a station identification indicator and/or one or more image capture device identification indicators and provide the station identification indicator and/or one or more image capture device identification indicators to another device along with an image or a plurality of images. The other device (e.g., the server 200, the computing device 304, etc.) may then retrieve other indicators (e.g., from local storage, from cloud storage, etc.) based on the station identification indicator and/or one or more image capture device identification indicators.

According to various embodiments, the processor 110 may generate metadata in response to an image being captured by the image capture system 114. For example, the station computing device 104 may be configured to determine a device angle of image capture device relative to an axis of rotation, a time at which the image was taken, etc. As is discussed further herein, this information may be stored as metadata within the image and utilized during various processes described herein.

As shown, the stations 102 each include an image capture system 114 configured to capture an image of an area near the image capture system 114. As shown, the image capture system 114 includes one or more image capture devices configured to capture an image of an area near the image capture system 114. The one or more image capture devices may include any type of camera, video camera, and/or any other optoelectronic component (e.g., a UV sensor/camera, an IR sensor/camera, etc.).

The image capture system 114 further includes a calibration circuit 116. The calibration circuit 116 may be used to determine a reference direction for use by the processing circuit 108, as is discussed further herein. The image capture system 114 further includes a device control circuit 118 that is configured to control the one or more image capture devices 124. For example, the device control circuit 118 may cause each of the image capture devices 124 to capture an image or a video and/or cause each of the image capture devices 124 to rotate about an axis, as is discussed further herein.

It should be appreciated that, according to some embodiments, the station computing devices 104 may be located apart from the image capture system 114. For example, the image capture system 114 may be elevated above the ground while the station computing device 104 may be located proximate the ground such that the station computing device 104 may be accessed by an operator while the operator is on the ground.

As shown, the station 102 includes one or more sensors 120. The one or more sensors 120 may be configured to detect local conditions proximate the station 102. For example, the one or more sensors 120 may include light sensors, noise sensors, weather sensors, wind sensors, pressure sensors, etc. According to various embodiments, one or more conditions detected by the one or more sensors 120 may be associated with an image captured by the image capture system 114 such that the data from the one or more sensors 120 may be provided to the server 200 along with one or more images captured by the image capture system 114.

According to various embodiments, the image capture device 124 can include or can be coupled to a mounting device configured to mount the image capture device to a structure, as is discussed further below. According to various embodiments, each image capture device 124 includes a housing. For example, the housing may reduce the risk of damage to the image capture device 124 (e.g., as a result of wind, rain, fire, falling debris, animal damage, etc.). According to various embodiments, each image capture device 124 may include a wiper configured to wipe (e.g., clear obstructions off) a lens and/or a housing of the image capture device 124.

As shown, the server 200 includes one or more input/output (I/O) device(s) 202, network interface circuit(s) 204, an image processing circuit(s) 206, incident identification circuit(s) 212, data management circuit(s) 214, and display output circuit(s) 216. Each of the one or more input/output (I/O) device(s) 202, network interface circuit(s) 204, an image processing circuit(s) 206, incident identification circuit(s) 212, data management circuit(s) 214, and/or display output circuit(s) 216 may include one or more processors coupled to one or more memories. The memory may be one or more devices (e.g., RAM, ROM, Flash memory, hard disk storage) for storing data and/or computer code for completing and/or facilitating the various processes described herein. The memory may be or include non-transient volatile memory, non-volatile memory, and non-transitory computer storage media. Memory may include database components, object code components, script components, or any other type of information structure for supporting the various activities and information structures described herein. Memory may be communicably coupled to the processor and include computer code or instructions for executing one or more processes described herein. The processor may be implemented as one or more application specific integrated circuits (ASICs), field programmable gate arrays (FPGAs), a group of processing components, or other suitable electronic processing components. As such, each of the circuits included as a part of the server 200 are configured to run a variety of application programs and store associated data in a database of the memory.

In some embodiments, the input/output device 202 includes suitable input/output ports and/or uses an interconnect bus (not shown) for interconnection with a local display (e.g., a touchscreen display) and/or keyboard/mouse devices (when applicable), or the like, serving as a local user interface for programming and/or data entry, retrieval, or other user interaction purposes. As such, the input/output device 202 may provide an interface for the user to interact with various applications stored on the server 200. For example, the input/output device 202 includes a keyboard, a keypad, a mouse, joystick, a touch screen, a microphone, a camera device, a biometric device, a virtual reality headset, smart glasses, and the like. As another example, input/output device 202, may include, but is not limited to, a television monitor, a computer monitor, a printer, a facsimile, a speaker, and so on.

As shown, the server 200 includes a network interface circuit 204 that may allow the server 200 to communicate wirelessly or via wired communication. The network interface circuit 204 includes program logic that facilitates connection of the server 200 to the network 10. For example, the network interface circuit 204 may include any combination of a wireless network transceiver (e.g., a cellular modem, a Bluetooth transceiver, a WiFi transceiver, etc.) and/or a wired network transceiver (e.g., an Ethernet transceiver). In some arrangements, the network interface circuit 204 includes the hardware and machine-readable media sufficient to support communication over multiple channels of data communication. Further, in some arrangements, the network interface circuit 204 includes cryptography capabilities to establish a secure or relatively secure communication session in which data communicated over the session is encrypted.

According to various embodiments, the server may receive data or other information from third parties. For example, the network interface circuit 106 may facilitate receive information from third party sources. For example, as is discussed further herein, the sever 200 may interact with one or more third party websites, extract data or other information from the third party websites, and associate the data or other information with one or more images received from the station 102. For example, the server 200 may access a website that publishes locations (e.g., GPS coordinates) and/or times (e.g., date, local time, etc.) of controlled burns and associate that information with one or more images that capture the controlled burn.

As shown, the server 200 includes an image processing circuit 206. The image processing circuit 206 is configured to manipulate one or more images. For example, the image processing circuit 206 may receive a plurality of images from a first station 102 and combine the plurality of images into a single image (e.g., a composite image). For example, according to various embodiments, the first station 102 captures a plurality of images representing a panoramic view (e.g., a 360 degree field of view, a 270 degree field of view, a 180 degree field of view, etc.) surrounding the station 102 and provides the plurality of images to the image processing circuit 206 such that the image processing circuit 206 may stitch together the plurality of images to create a single composite image (e.g., a 360 degree field of view, a 270 degree field of view, a 180 degree field of view, etc.).

As shown, the server 200 includes an incident detection circuit 210. As discussed further herein, the incident detection circuit 210 is configured to detect an incident (e.g., smoke, fire, etc.) within an image and/or a plurality of images. For example, the incident detection circuit 210 may include one or more machine learning models trained to detect an incident (e.g., smoke) within an image. For example, the incident detection circuit may include a first machine learning model trained to detect incidents within images using a plurality of training images and a second machine learning model trained to detect incidents within at least one of the sequence of images. As is discussed further below, discrepancies between the first model and the second model may be leveraged to train each model. It should be appreciated that the computing device 304 may include a similar incident detection circuit 210 such that the first machine learning model and/or the second machine learning model may be trained and/or executed on the computing device 304.

According to various embodiments, the incident detection circuit 210 is configured to receive one or more inputs that indicate the location of an incident in an image. For example, a user of the server 200 may review images from an image capture system 114. The user may provide an indication of the incident in one or more images that captured an incident. Additionally or alternatively, a user of the computing device 304 (e.g., via the incident application 314) may provide indications of incidents in images provided to the computing device 304. The image and/or corresponding indication of the incident may then be provided to the server 200.

As shown, the server 200 includes an incident identification circuit 212. The incident identification circuit 212 is configured to receive images from two or more stations, wherein the images capture an incident, and determine a geolocation or an approximate geolocation of the incident based on the images received and data associated with the images, as is discussed further herein.

As shown, the server 200 includes a data management circuit 214. The data management circuit 214 is configured to reduce the amount of data transmitted from the server 200 to other components of the incident detection system 100. For example, as discussed herein, the server may leverage two different machine learning models to detect an incident. The data management circuit 214 may leverage the predictions output by the models to reduce the amount of data from the server 200 to other components of the incident detection system 100.

Further, the data management circuit 214 is configured to write, store, organize, and/or control access to data stored on the server. For example, the data management circuit 214 may be configured to organize data within various folders. Further, the data management circuit may be configured to store and delete data from the server 200. For example, after a predetermined period of time has passed, an image may be deleted by the data management circuit 214. Further, the data management circuit 214 may be configured to control access to the data. For example, a first type of user account may access individual (e.g., constituent) images while a second type of user account may access composite images.

As shown, the server 200 includes a display output circuit 216. The display output circuit 216 is configured to generate a graphical user interface (GUI) that includes an image and/or a plurality of images and various information related to that image or the plurality of images. For example, as is discussed further herein, the display output circuit 216 may generate a GUI that includes an image, a bearing corresponding with the image, a compass, and/or a map overly that shows the location of an incident on a map. According to various embodiment, the display generated by the display output circuit 216 may be provided to and/or retrieved by an incident application 314 on one or more computing devices 304, as is discussed further herein. According to various embodiments, the display output circuit 216 can communicate with a remote device (e.g., the computing device 304) and cause the graphical user interface to be displayed on a display of the remote device.

As shown, the server 200 includes a memory 218 including one or more incident databases 220. The memory 218 may be one or more devices (e.g., RAM, ROM, Flash memory, hard disk storage) for storing data and/or computer code for completing and/or facilitating the various processes described herein. The memory 218 may be or include non-transient volatile memory, non-volatile memory, and non-transitory computer storage media. Memory 218 may include database components, object code components, script components, or any other type of information structure for supporting the various activities and information structures described herein. Memory 218 may be communicably coupled to the processor and include computer code or instructions for executing one or more processes described herein. The one or more incident databases 220 may store images received from the stations 102 and/or any other data associated with the images received from the stations 102. Further, the one or more incident databases 220 may store displays and/or graphical user interfaces (GUI) output by the display output circuit 216 as is discussed further herein. Furthermore, the one or more incident databases 220 may store training data for the one or more models.

The input/output device 202 is configured to receive communications from and provide communications to a user associated with the server 200. The input/output device 202 is configured to exchange data, communications, instructions, etc. with an input/output component of the server 200. In one embodiment, the input/output device 202 includes communication circuitry for facilitating the exchange of data, values, messages, and the like between the input/output device 202 and the components of the incident detection system 100. In yet another embodiment, the input/output device 202 includes machine-readable media for facilitating the exchange of information between the input/output device and the components of the incident detection system 100. In yet another embodiment, the input/output device 202 includes any combination of hardware components, communication circuitry, and machine-readable media.

As shown, the computing device(s) 304 includes a network interface circuit 306 may allow the station computing device 104 to communicate wirelessly or otherwise. The network interface circuit 306 includes program logic that facilitates connection of the computing device 304 to the network 10. For example, the network interface circuit 306 may include any combination of a wireless network transceiver (e.g., a cellular modem, a Bluetooth transceiver, a WiFi transceiver, etc.) and/or a wired network transceiver (e.g., an Ethernet transceiver). In some arrangements, the network interface circuit 306 includes the hardware and machine-readable media sufficient to support communication over multiple channels of data communication. Further, in some arrangements, the network interface circuit 306 includes cryptography capabilities to establish a secure or relatively secure communication session in which data communicated over the session is encrypted.

As shown, the computing device(s) 304 includes a processing circuit 308 that includes one or more processors 310 coupled to one or more memories 312. The memory 312 may be one or more devices (e.g., RAM, ROM, Flash memory, hard disk storage) for storing data and/or computer code for completing and/or facilitating the various processes described herein. The memory 312 may be or include non-transitory volatile memory, non-volatile memory, and non-transitory computer storage media. Memory 312 may include database components, object code components, script components, or any other type of information structure for supporting the various activities and information structures described herein. Memory 312 may be communicably coupled to the processor 310 and include computer code or instructions for executing one or more processes described herein. The processor 310 may be implemented as one or more application specific integrated circuits (ASICs), field programmable gate arrays (FPGAs), a group of processing components, or other suitable electronic processing components. As such, the station computing device 304 is configured to run a variety of application programs and store associated data in a database of the memory 312.

As shown, the computing device 304 includes an incident application 314. The incident application 314 is configured to enable a user of the computing device 304 to communicate with one or more components of the incident detection system 100. For example, the incident application 314 is shown to include an incident viewing circuit 316 configured to retrieve and/or receive displays (e.g., GUIs) generated by the display output circuit 216 for viewing and interaction on the computing device 304. For example, upon detection of an incident (e.g., smoke), the server 200 may generate an interactive time-lapse display. A user of the computing device 304 may retrieve this display from the incident database 220 and interact with the display, as is discussed further herein. Further, the incident application 314 may include a display output circuit 318, which may generate displays using images and/or data stored in the incident database 220 in a similar manner as the display output circuit 216. According to various embodiments, the incident application 314 is configured to run as a native application, a web application, a mobile application, a web application, hybrid applications, etc. According to various embodiments, the display output circuit 216 is configured to run a player configured to display images and/or videos. As is discussed further herein, the player may receive partial images and/or constituent images and create a display. According to various embodiments, the incident application 314 is configured to cause the display to be presented as a responsive web (e.g., creates dynamic changes to the appearance of a website, depending on the screen size and orientation of the device being used to view it).

According to various embodiments, the incident application 314 is configured to receive one or more inputs that indicate the location of an incident in an image. For example, a user of the incident application 314 may review images from an image capture system 114. The user may provide an indication of the incident in one or more images that captured an incident. Additionally or alternatively, a user of the incident application (e.g., via the incident application 314) may provide multiple indications of multiple incidents in an image provided to the computing device 304. The image and/or corresponding indication of the incident may then be provided to the server 200.

The input/output device 320 is configured to receive communications from and provide communications to a user associated with the computing device 304. The input/output device 320 is configured to exchange data, communications, instructions, etc. with an input/output component of the computing device 304. In one embodiment, the input/output device 320 includes communication circuitry for facilitating the exchange of data, values, messages, and the like between the input/output device 320 and the components of the incident detection system 100. In yet another embodiment, the input/output device 320 includes machine-readable media for facilitating the exchange of information between the input/output device and the components of the incident detection system 100. In yet another embodiment, the input/output device 320 includes any combination of hardware components, communication circuitry, and machine-readable media.

In some embodiments, the input/output device 320 includes suitable input/output ports and/or uses an interconnect bus (not shown) for interconnection with a local display (e.g., a touchscreen display) and/or keyboard/mouse devices (when applicable), or the like, serving as a local user interface for programming and/or data entry, retrieval, or other user interaction purposes. As such, the input/output device 320 may provide an interface for the user to interact with various applications stored on the computing device 304. For example, the input/output device 320 includes a keyboard, a keypad, a mouse, joystick, a touch screen, a microphone, a camera device, a biometric device, a virtual reality headset, smart glasses, and the like. As another example, input/output device 320, may include, but is not limited to, a television monitor, a computer monitor, a printer, a facsimile, a speaker, and so on.

Figure 1B:
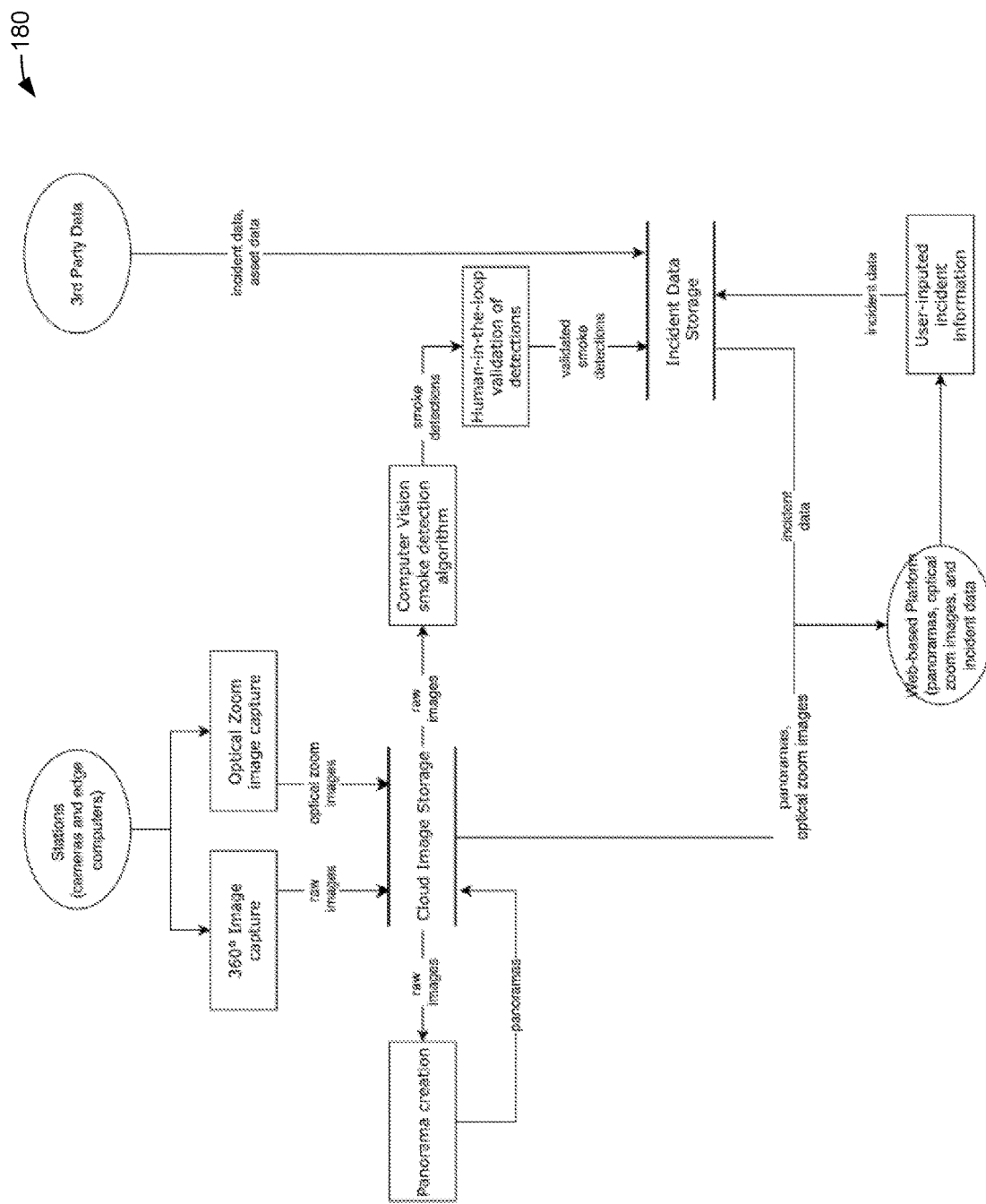
FIG. 1B is a flow chart for a method of maintaining an incident data storage database, according to an exemplary embodiment.

Referring now to FIG. 1B, a flow chart for a method of maintaining an incident data storage database 180 is shown, according to an example embodiment. The method 180 may be performed using one or more systems described herein (e.g., the incident detection system 100). Additionally, various processes described herein may involve some or all of the method 180. It should be appreciated that the method 180 need not be performed in the order shown. Further, one or more of the shown steps/processes may be omitted. Furthermore, one or more steps/processes may be added to the method 180.

The method 180 includes capturing one or more images at a station (e.g., the station 120). For example, an image capture device may capture an image of some or all of the area surrounding the station. According to various embodiments, the image capture device may rotate about an axis to capture a plurality of images which may later be stitched together to create a composite panoramic image (e.g., having a 360 degree field of view, a 180 degree field of view, etc.). Further, the image capture device may include an optical zoom feature. In this example embodiment, the image capture device may take a plurality of images at different zoom levels. For example, if an incident is able to be captured by the image capture device, zooming in and capturing the incident may result in more accurate incident detection via a model trained to detect incidents.

Images captured by the image capture devices at each station are then provided to a storage device. For example, the storage device may be included as a part the server 200. Additionally or alternatively, the storage device may include cloud storage. According to various embodiments, the cloud storage is operated by a third party.

As discussed further herein, the images stored in the storage device may be accessed by one or more devices. For example, the raw images may accessed by the server 200 and/or the computing device 304. According to various embodiments, the images are stitched together to create composite (e.g., panoramic) images. The composite images may then be provided to the image storage device such that the composite images may be accessed by one or more devices. According to various embodiments, the raw images, the optical zoom images, and/or the composite images may be accessed by the one or more devices via a web based platform. According to various embodiments, the images may be tagged with incident data by a user of the computing device. For example, a user of the computing device may indicate that an incident is shown in one or more images. The user of the computing device may further indicate the location of the incident within the image. According to various embodiments, this incident data may be provided to and stored within an incident data storage database.

As is discussed further herein, the images may be provided to one or more models trained to detect incidents in an image and/or in a plurality of images. According to various embodiments, the raw images and/or the composite images may be provided to the one or more models. The model(s) may then detect an incident (e.g., smoke, landslide, car accident, tornado, etc.) and an alert may be provided to one or more computing devices. According to various embodiments, the alert may include one or more of the image(s) that an incident was detected within. The incident may then be confirmed by a user of the computer device that received the alert. For example, the user of the computing device (e.g., the computing device 304) may manually review one or more images that an incident was detected in and confirm that there is an incident in the image or indicate that no incident is shown in the image. According to various embodiments, the user's indication of an incident being present or not being present may be converted to incident data and stored with the one or more images and stored in an incident data storage database.

According to various embodiments, the images may be provided to one or more computing devices 304 at a remote location. For example, one or more user accounts associated with a computing device 304 may be able to access constituent images from one or more image capture systems 114. A user of the computing device 304 may interact with the image and indicate a location of an incident or multiple locations or incidents within the image. The computing device 304 may then provide the image and/or the indication of the incident within the image to the server 200.

According to various embodiments, third party data may be stored in the incident data storage database. The third party data may further be associated with one or more images. The third party data may be provided to the model(s) trained to detect incidents to further train the model(s).

Figure 2:
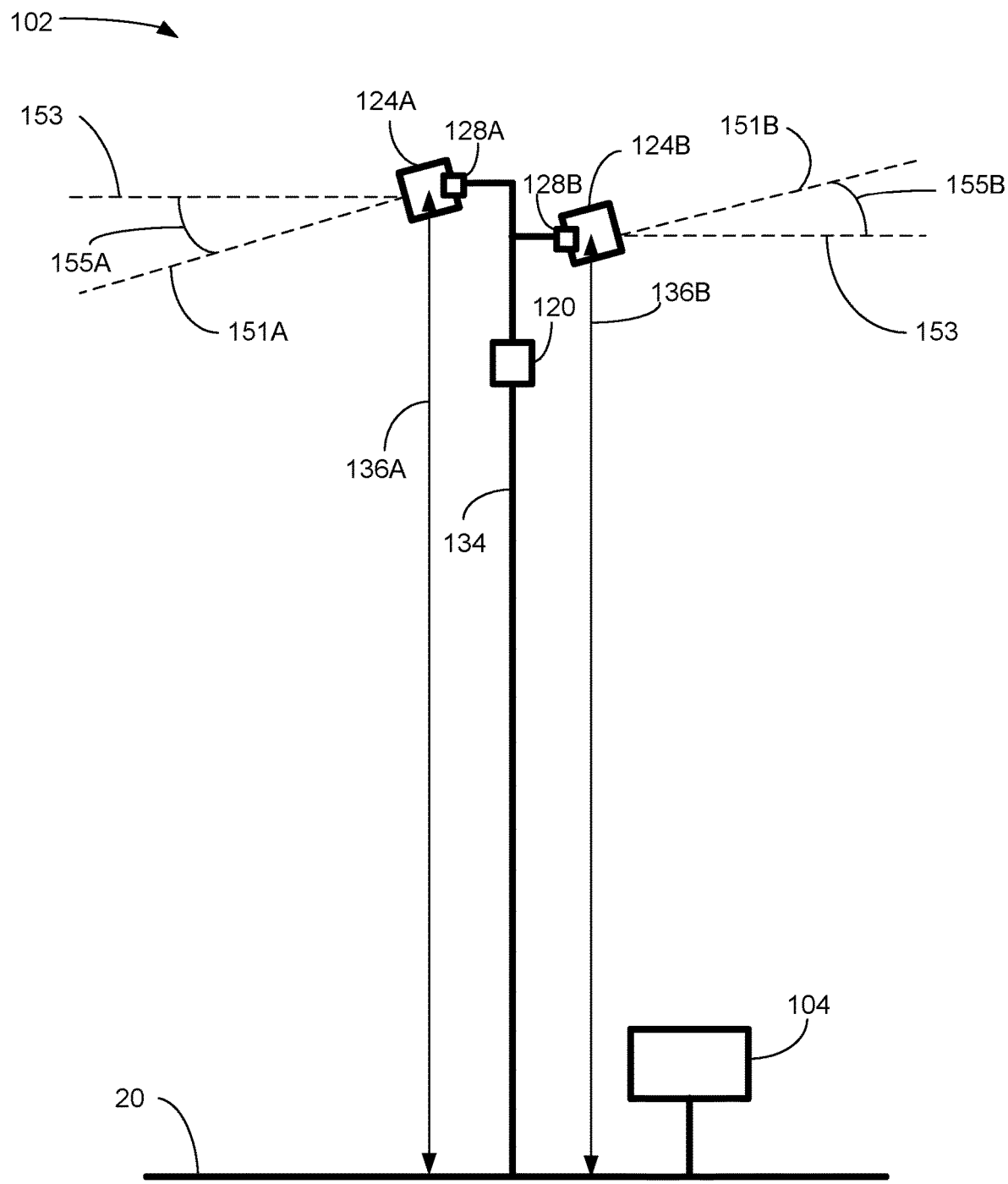
FIG. 2 is a side schematic view of a station, according to an exemplary embodiment.

B. Calibration to Reference Direction of Image Capture Systems of Incident Detection System Referring now to FIG. 2, a side schematic view of the station 102 is shown, according to an example embodiment. As shown, the station 102 includes the one or more image capture devices 124A, 124B coupled to a support 134, the station computing device 104, the one or more sensors 120, and a device adjustment mechanism 128A, 128B (e.g., a leveling adjustment mechanism) coupled to each image capture device 124A, 124B.

As shown, the station 102 includes a first image capture device 124A and a second image capture device 124B coupled to a support 134. As shown, the first image capture device 124A is a first height 136A off a ground 20 and the second image capture device 124B is a second height 136B off the ground 20. As shown, the first height 136A and the second height 136B need not necessarily be the same. Further, according to various embodiments, the first height 136A and/or the second height 136B may be individually adjustable. For example, the height of each image capture device 124 may be adjusted to increase the total field of view of the image capture device 124 (e.g., by avoiding obstructions in the field of view).

According to various embodiments, the support 134 may include an existing structure such that a new support 134 does not need to be built. For example, the support 134 may include a cell tower, a telephone pole, a tree, a lookout tower, a weather station, etc.). In this sense, the image capture devices 124 may include a mounting device (e.g., included in the adjustment mechanism 128) that allows the image capture device 124 to be coupled to a number of different types of supports 134.

As shown, the first image capture device 124A includes a first line of sight 151A. The line of sight 151A corresponds with the vertical angle the image capture device 124A is orientated (e.g., relative to a horizontal sight line 153 that is parallel to the ground 20). For example, according to various embodiments, the first line of sight 151A corresponds with a horizontal midline (e.g., the horizontal center 410 shown in FIG. 3) of an image captured by the image capture device 124A, as is discussed further herein. As shown, the first line of sight 151A defines a first vertical device angle 155A with respect to the horizontal sight line 153. Similarly, the second line of sight 151B defines a second vertical device angle 155B with respect to the horizontal sight line 153.

As shown, the station 102 includes a first device adjustment mechanism 128A coupled to the first image capture device 124A. The first device adjustment mechanism 128A is configured to adjust the first vertical device angle 155A. For example, the first device adjustment mechanism 128A may include an actuator (e.g., a servo motor) configured to adjust the first vertical device angle 155A. Alternatively or additionally, the first image capture device 124A may be configured to receive a level device such that the first device adjustment mechanism 128A may be utilized to adjust first vertical device angle 155A until the first image capture device 124A is level or approximately level (e.g., +/−0.1 degrees). For example, the device adjustment mechanism 128A may include one or more bolts or screws configured to alter the first vertical device angle 155A. Similarly, the second image capture device 124B is coupled to a second device adjustment mechanism 128B configured to adjust the second vertical device angle 155B.

The appropriate vertical camera angle 155 may vary by station 102. For example, depending on the surroundings, each image capture device 124 may have a desirable vertical device angle 155 that increases the amount of viewable foreground surrounding the station 102. For example, according to various embodiments, the vertical device angle 155 may be adjusted using the device adjustment mechanism 128A until approximately 0 degrees (e.g., +/−0.1 degrees). Similarly, the second image capture device 124B includes a second device adjustment mechanism 128B configured to adjust the second vertical device angle 155B.

According to various embodiments, each device adjustment mechanism 128 may include a horizontal angle adjustment mechanism that enables rotation of the image capture device 124 about an axis, as is discussed further herein. For example, the device control circuit 118 may cause the image capture device 124 to rotate about the axis. For example, each image capture device 124 may rotate 180 degrees or more about the axis such that the image capture system 114 is able to capture a plurality of images that represent a panoramic view (e.g., a 360 degree field of view, a 270 degree field of view, a 180 degree field of view, etc.) surrounding the station 102.

Figure 3:
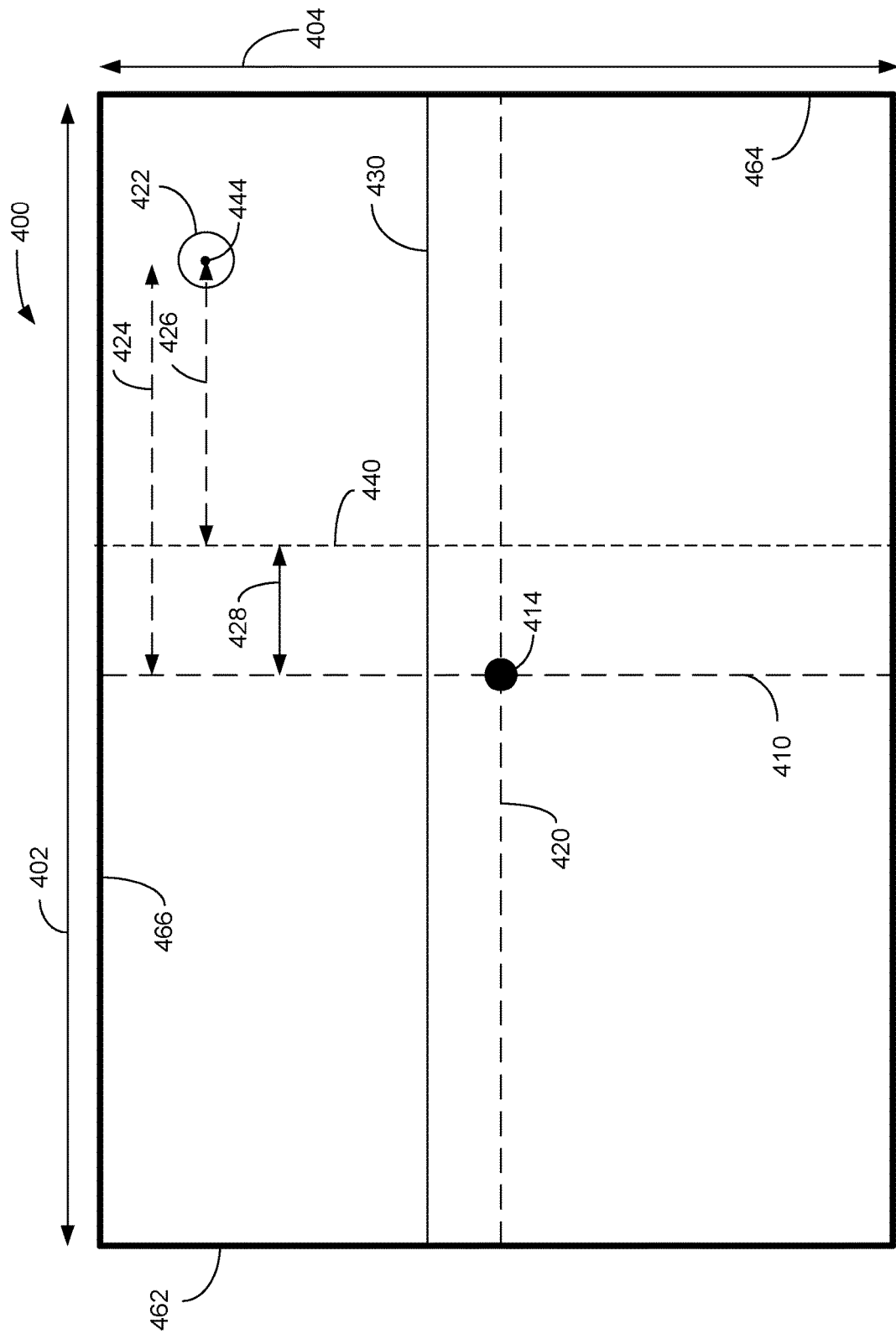
FIG. 3 is a schematic view of an image, according to an exemplary embodiment.

Referring now to FIG. 3, a schematic view of an image 400 is shown, according to an example embodiment. The image 400 may have been captured by an image capture system 114. The image 400 may be utilized for determining a reference direction 440 (e.g., via the calibration circuit 116). For example, the image 400 may be utilized during the method of determining a reference direction 500 described below with respect to FIG. 4.

As shown, the image 400 is defined by a width 402 and height 404. Collectively, the width 402 and the height 404 define the field of view of the image capture device 124 while the image capture device 124 is in a fixed orientation (e.g., the device angle is fixed). As shown, the width 402 extends from a first edge 462 to a second edge 464. According to various embodiments, the first edge 462 may be correspond with a first angle and the second edge 464 may correspond with a second angle, such that the horizontal field of view spans from the first angle to the second angle.

According to various embodiments, the image 400 is a digital image including a plurality of pixels. In this example embodiment, the width 402 and the height 404 may be represented using a number of pixels (e.g., the number of pixels spanning the image 400 in the horizontal direction and the vertical direction, respectively). Thus, a horizontal center 410 and a vertical center 420 may be determined (e.g., via the station computing device 104) based on the number of pixel spanning the image 400 horizontally and vertically. The horizontal center 410 and the vertical center 420 intersect at a center 414 of the image 400. According to various embodiments, the location of the vertical center 420 relative to the foreground may be adjusted (e.g., leveled) by adjusting the vertical device angle 155 (see FIG. 2) via the device adjust mechanism 128. According to various embodiments, the vertical center 420 may be adjusted to be below a horizon 430 to increase the amount of foreground visible within the image 400.

As is discussed further herein, the reference direction 440 may be determined (e.g., via the station computing device 104, the server 200, etc.) in part by identifying an object of interest 422 (e.g., a celestial object, a landmark, etc.). For example, an image capture device 124 may be coupled to a support 134 such that the reference direction 440 is within the field of view (e.g., between the first edge 462 and the second edge 464). For example, the reference direction 440 may be north. In this example, as the image capture device 124 is installed, the image capture device 124 may generally be aimed north when installed. For example, a compass may be referenced while installing the image capture device 124 to aim the image capture device 124 in the north direction. Further, in embodiments wherein the image capture device 124 may rotate about an axis between about a range of angles, the horizontal center 410 of the image capture device 124 is generally orientated towards the reference direction (e.g., north) while the device angle is generally centered within the range of angles.

After the image capture device 124 is installed, the image 400 may be taken while the image capture device 124 is set at a first device angle. An object of interest 422 may be identified in the image 400. For example, the object of interest 422 may be manually selected within image 400 via the station computing device 104. Alternatively, object detection software (e.g., a machine learning model trained to identify the object of interest 422) may be utilized by the station computing device 104 to identify the object of interest 422 within the image 400. As is discussed further below, a pixel coordinate 444 is assigned to the object of interest (e.g., via the station computing system 104). The pixel coordinate 444 generally includes a horizontal coordinate and a vertical coordinate that corresponds with a number of pixels between the horizontal edges 462, 464, a vertical edge 466, and the object of interest 422 (e.g., the center pixel of the object of interest 422).

As is discussed further herein, an expected bearing 426 of the object of interest 422 (e.g., with respect to the reference direction 440) may be determined based on the object of interest 422, the geolocation of the image capture device 124, and/or the time the image 400 was captured. For example, if the object of interest 422 is a celestial object (e.g., the sun, the moon, a star, etc.), the expected bearing 426 of the object of interest 422 (e.g., with respect to the reference direction 440) may be determined based on the object of interest 422, the geolocation of the image capture device 124, and the time (e.g., date, local time, etc.) the image 400 was captured. In another example embodiment, if the object of interest 422 is a landmark, the expected bearing 426 of the object of interest 422 (e.g., with respect to the reference direction 440) may be determined based on the object of interest 422 and the geolocation of the image capture device 124 without the time the image was captured. It should be appreciated that, according to various embodiments, identifying the reference direction 440) using a celestial object (e.g., the sun, the moon, a star, a consolation, etc.) or a landmark (e.g., a mountain peak, a building, a body of water, etc.) may be more accurate than determine a reference direction based on a compass.

As shown, the expected bearing 426 corresponds with the number of pixels (e.g., in the horizontal direction) between the pixel coordinate 444 and the reference direction 440. Thus, the reference direction 440 may be determined by converting (e.g., via the station computing device 104) the expected bearing 426 to a number of pixels and determining the reference direction using the number of pixels and the pixel coordinate 444.

The image capture system 114 may be calibrated such that the bearing of any object or incident identified in an image may be determined with reference to the reference direction 440. For example, a first angle 424 may be determined by counting the number of pixels between the horizontal center 410 and the pixel coordinate 444 and converting the number of pixels to the first angle. A second angle 428 (e.g., an offset angle) may be determined based on the difference between the first angle 424 and the expected bearing 426. The second angle 428 may then be used as an angular offset from the horizontal center 410 in images subsequently taken to ensure that bearings are determined with respect to the same reference direction 440. According to various embodiments, two or more image capture systems 114 located at various geolocations may all be calibrated to use the same reference direction 440 when determining the bearing of an object or incident in an image.

According to various embodiments, the first angle 424, the expected bearing 426, and/or the second bearing 428 may be determined by estimating a number of pixels rather than determining an exact number of pixels between various points in the image 400. For example, the number of pixels extending in a direction (e.g., the number of pixels corresponding with the width 402) may be determined or estimated based on the type of hardware being used to capture the image 400. For example, the image resolution may be determined or inferred from the data specification sheet associated with the image capture device 124. According to various embodiments, estimating a number of pixels, rather than determining the exact number of pixels, may accelerate one or more processes described herein and/or increase the efficiency by reducing the amount of data transferred/processed. For example, rather than downloading the entire image 400 to determine a number of pixels in the horizontal 402 direction, the total number of pixels may be estimated or determined based on the specification data sheet associated with the image capture device 124. This number may then be used to estimate the first angle 424, the expected bearing 426, and/or the second bearing 428. For example, a partial image may be downloaded to determine the number of pixels between the horizontal center 410 and the object of interest 444 to determine the first angle 424.

Figure 4:
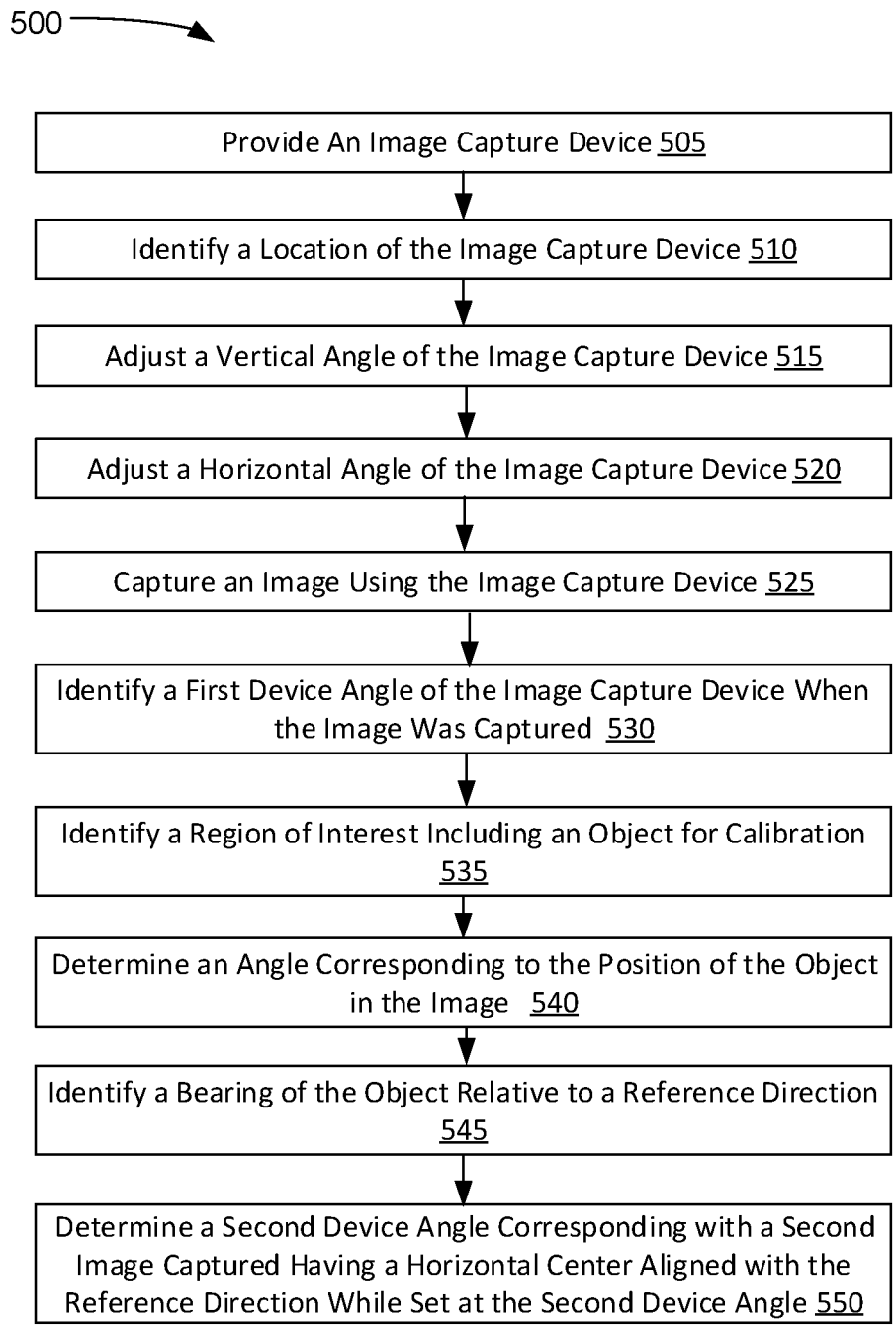
FIG. 4 is a flow chart of a method of determining a reference direction, according to an exemplary embodiment.

Referring now to FIG. 4, a flow chart of a method of determining a reference direction 500 is shown, according to an example embodiment. The method 500 may utilized to calibrate an image capture system 114. For example, the method 500 may be performed during the setup of a station 102. The method 500 may be performed by one or more components of the incident detection system 100. For example, the method 500 may be performed by one or more stations 102. For example, the method 500 may be performed by a plurality of stations 102 such that each station 102 is calibrated to determine a bearing corresponding with an object or incident captured within an image based on a reference direction. It should be appreciated that the method 500 does not need to be performed in the order shown in FIG. 4. Further, various processes shown in FIG. 4 may be omitted during the method 500. Furthermore, the method 500 may include additional processes not shown in FIG. 4.

At process 505, an image capture device is provided. For example, the process 505 may involve coupling one or more image capture devices 505 to a support (e.g., the image capture devices 124A, 124B may be coupled to support 134 shown in FIG. 2). The process 505 may involve setting an initial device angle for the image capture device. For example, process 505 may involve estimating a reference direction (e.g., using a compass to determine north) and orientating the image capture device such that the device angle is in the same general direction as a reference direction. According to various embodiments, the image capture device is configured to rotate about an axis. For example, the image capture device may be a Danhua™ outdoor turret camera.

At process 510, a location of the image capture device is identified. For example, a geolocation of the image capture device may be identified by one or more components of the incident detection system 100. The location of the image capture device may correspond with coordinates (e.g., Global Positioning System (GPS) coordinates) of the image capture device. According to various embodiments, the location of the image capture device may be identified by a station computing system. For example, the station that the image capture device is a part of may include a GPS system configured to determine coordinates of the image capture device. Alternatively or additionally, the location of the image capture device may be determined based on a satellite image that includes the image capture device. The location of the image capture device may be stored within a memory of the station computing device for later reference.

As discussed above, according to various embodiments, the memory 112 may store data associated with the station 102 and/or one or more station computing devices 104. For example, the memory 112 may store data such that the processor 110 may associate one or more pieces of data with subsequently captured images. For example, the memory 112 may store one or more indicators. According to various embodiments, the one or more indicators are added to the image as metadata. According to various embodiments, the one or more indicators may include a station identification (ID) indicator that is unique to the image capture system 114 and/or an image capture device identification (ID) indicator that is unique to the image capture device 124 used to capture the image. The one or more indicators may include a sequence indicator that is unique to a plurality of images (e.g., a sequence of images, a set of images, etc.). For example, some or all of the images captured in a sequence may include the same sequence indicator. The one or more indicators may include a time stamp indicator that indicates the time at which an individual image was captured or the times at which a plurality (e.g., sequence) of images were captured. The one or more indicators may include an image indictor that is unique to that image. The one or more indicators may include a device indicator that identifies the type of image capture device (e.g., make, model, image resolution, number of pixels in the horizontal direction, number of pixels in the vertical direction, the field of view of the device, and/or any other attributes of the device) used to capture the image. The one or more indicators may include a geolocation indicator that indicates a geolocation (e.g., a latitude and/or a longitude) of the image capture device used to capture the image. The one or more indicators may include a structure indicator that indicates the type of structure the image capture device 124 is mounted to. The one or more indicators may include an elevation indicator that indicates the altitude of the image capture device 124 at the time the image was captured.

According to various embodiments, the processor 110 may generate metadata in response to an image being captured by the image capture system 114. For example, the station computing device 104 may be configured to determine a device angle of image capture device relative to an axis of rotation, a time at which the image was taken, etc. As is discussed further herein, this information may be stored as metadata within the image and utilized during various processes described herein.

According to various embodiments, the indicators and/or metadata may be stored on the memory 112 of the station 102, the memory 218 of the server 200, the memory 312 of the computing device 304, and/or a cloud memory that is accessible via the network 10. According to various embodiments, this information, along with any other information, may be stored in a lookup table or other data structure. A sample data structure, which may be stored on the memory 112 of the station 102, is shown below:

| Number | Data | Value |
| --- | --- | --- |
| 1 | Station ID | S19 |
| 2 | First Image Capture Device ID | S19A |
| 3 | Second Image Capture Device ID | S19B |
| 4 | Sequence ID | 124315 |
| 5 | First Device Angle | A42 |

-continued

| Number | Data | Value |
|---|---|---|
| 6 | Second Device Angle | B48 |
| 7 | Geolocation of First Image Capture Device | 15426, 26475 |
| 8 | Geolocation of Second Image Capture Device | 26325, 32678 |
| 9 | Elevation of First Image Capture Device | 6531 |
| 10 | Elevation of Second Image Capture Device | 3163 |
| 11 | Reference Direction of First Image Capture Device | R1 |
| 12 | Reference Direction of Second Image Capture Device | R2 |
| 13 | Second Angle Associated with First Image Capture Device | A242642 |
| 14 | Second Angle Associated with Second Image Capture Device | A23625 |
| 15 | Mounting Structure Identifier | M3 |
| 16 | Make of First Image Capture Device | C462 |
| 17 | Make of Second Image Capture Device | C462 |
| 18 | Model of First Image Capture Device | CM6427 |
| 19 | Model of Second Image Capture Device | CM6427 |
| 20 | First Time Stamp | 12, 52 |
| 21 | Second Time Stamp | 12, 57 |

At process 515, a vertical angle of the image capture device is adjusted. For example, a device adjustment mechanism (e.g., a leveling adjustment mechanism) may be coupled to the image capture device. For example, the device adjustment mechanism may include an actuator (e.g., a servo motor) configured to adjust the first vertical device angle. Alternatively or additionally, the image capture device may be configured to receive a level device such that the first device adjustment mechanism may be utilized to manually adjust first vertical device angle until the leveling device indicates that the first image capture device is level or approximately level (e.g., +/−0.1 degrees). For example, the device adjustment mechanism may include one or more bolts or screws configured to alter the first vertical device angle.

At process 520, a horizontal angle of the image capture device is adjusted. For example, when coupling the image capture device to the support, the horizontal device angle may be adjusted by a user installing the image capture device. For example, an image capture device may be coupled to a support such that a desired reference direction is within the field of view (e.g., between a first horizontal edge of an image captured by the image capture device and a second horizontal edge). For example, the reference direction may be north. In this example, as the image capture device is installed, the image capture device may generally be aimed north when installed. For example, a compass may be referenced while installing the image capture device to aim the image capture device in the north direction. Further, in embodiments wherein the image capture device may rotate about an axis between about a range of angles, the horizontal center of the image capture device is generally orientated towards the reference direction (e.g., north) while the device angle is generally centered within the range of angles.

At process 525, an image is captured by the image capture device. The image may be utilized for determining a reference direction (e.g., via the calibration circuit 116). For example, the image may be the image 400 show in FIG. 3. According to various embodiments, one or more pieces of data are associated with the image. For example, the station computing system may associate a time the image was captured, a location of the image capture device, a device angle associated with the image capture device at the time the image was captured, weather attributes present at the time the image was captured, and/or any other piece of information discussed herein.

At process 530, a first device angle of the image capture device at the time the image was captured is identified. The device angle may correspond with the direction of the horizontal middle of the image. For example, the image capture device and/or image capture system may provide a relative device angle to the station computing device at the time the image is captured. The station computing device may then identify the device angle by identifying the data associated with the image as a part of process 520.

At process 535, a region of interest including an object for calibration is identified within the region for calibration of the image capture device. For example, a region of interest that includes an object of interest may be identified in the image. For example, the region of interest may be manually selected within image via the station computing device. Alternatively, object detection software (e.g., a machine learning model trained to identify the object of interest) may be utilized by the station computing device to identify a region of interest within the image. As a part of process 535, pixel coordinates within the region of interest may be identified for the object of interest. The pixel coordinate includes a vertical pixel coordinate and/or a horizontal pixel coordinate. The vertical pixel coordinate may be determined based on the number of pixels between the region of interest and a vertical edge of the image. The horizontal pixel coordinate may be determined based on the number of pixels between the region of interest and a horizontal edge of the image.

At process 540, an angle corresponding to the position of the object in the image is determined. For example, the angle may be determined with reference to the device angle identified as a part of process 520. According to various embodiments, the horizontal device angle corresponds with the vertical middle of the image (e.g., the vertical center 420 shown in the image 400 of FIG. 3). Using the pixel coordinates of the region of interest, the station computing system may determine a number of pixels between the vertical middle and the region of interest. The number of pixels may then be converted to a corresponding angle (e.g., angle 424 shown in FIG. 3), which corresponds with the position of the region of interest, including the object of interest, within the image.

At process 545, a bearing of the object relative to a reference direction is identified. For example, an expected bearing (e.g., the expected bearing 426 shown in FIG. 3) of the object relative to the reference direction may be determined. The expected bearing of the region of interest, and object of interest, (e.g., with respect to the reference direction) may be determined based on the image coordinates of the region of interest, the geolocation of the image capture device, and/or the time the image was captured. For example, if the object of interest is a celestial object, the expected bearing of the object of interest (e.g., with respect to the reference direction) may be determined based on the object of interest, the geolocation of the image capture device, and the time (e.g., date, local time, etc.) the image was captured. According to various embodiments, the location of a celestial object in the sky may be predicted based on a geolocation of the observer and the time the celestial object is observed. For example, on Apr. 26, 2022, at 7:00 AM PST, an observer in San Francisco, California may expect to see the sun at a bearing (e.g., corresponding with an azimuth of the sun) of 78.05 degrees relative to the north direction. Thus, in this example embodiment, the expected bearing would be 78.05 degrees.

In another example embodiment, the object of interest is a landmark. The expected bearing of the object of interest (e.g., with respect to the reference direction) may be determined based on the object of interest and the geolocation of the image capture device without relying on the time the image was captured. For example, by identifying the geolocation of the object of interest and the geolocation of the image capture device, an expected bearing (e.g., with respect to a reference direction) may be determined based on the geolocations.

At process 550, a second angle device angle is determined. For example, the second device angle (e.g., the angle 428 shown in FIG. 3) may correspond with a second image captured having a horizontal center aligned with the reference direction while set at the second device angle. In other words, when the image capture device is set to the second angle, the image capture device is orientated in the reference direction.

The second angle (e.g., an offset angle, the second angle 428 shown in FIG. 3, etc.) may be determined based on the difference between the first device angle (e.g., the horizontal center 410 shown in FIG. 3) identified at process 520 and the reference direction (e.g., the reference direction 440) determined using the expected bearing (e.g., the expected bearing 426) identified at process 545. The second angle may be used as an angular offset from the horizontal center in images subsequently taken to ensure that any bearing determined is determined with respect to the reference direction. For example, the station commuting system may associate the second angle with some or all images captured by the respective image capture device. According to various embodiments, two or more image capture systems located at various geolocations may all be calibrated to use the same reference direction when determining the bearing of an object or incident in an image.

According to various embodiments, the method 500 may be performed two or more times by a given image capture device and/or image capture system. For example, the reference direction and second angle may be determined using the same object of interest at different times. The reference directions determined during each iteration of the method 500 may then be used (e.g., by averaging, taking a weighted average, taking a median value, etc.) to determine a second angle to be associated with the image capture system. Additionally or alternatively, the reference direction and the second angle may be determined using a variety of objects of interest. The reference directions determined during each iteration of the method 500 may then be used (e.g., by averaging, taking a weighted average, taking a median value, etc.) to determine a second angle to be associated with the image capture system.

Figure 5:
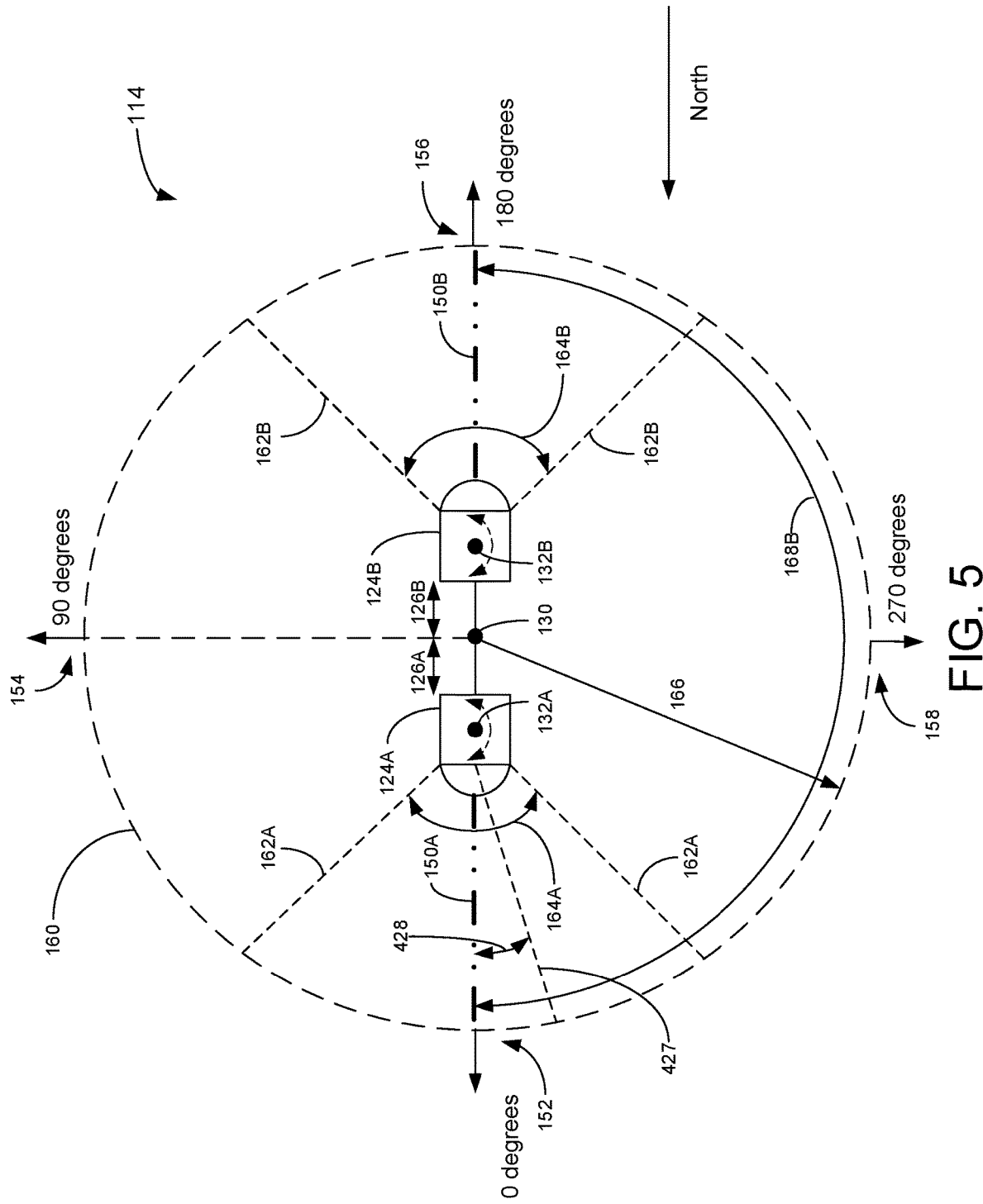
FIG. 5 is top view of a schematic illustration of an image capture system included in an incident detection system, according to an exemplary embodiment.
Figure 6:
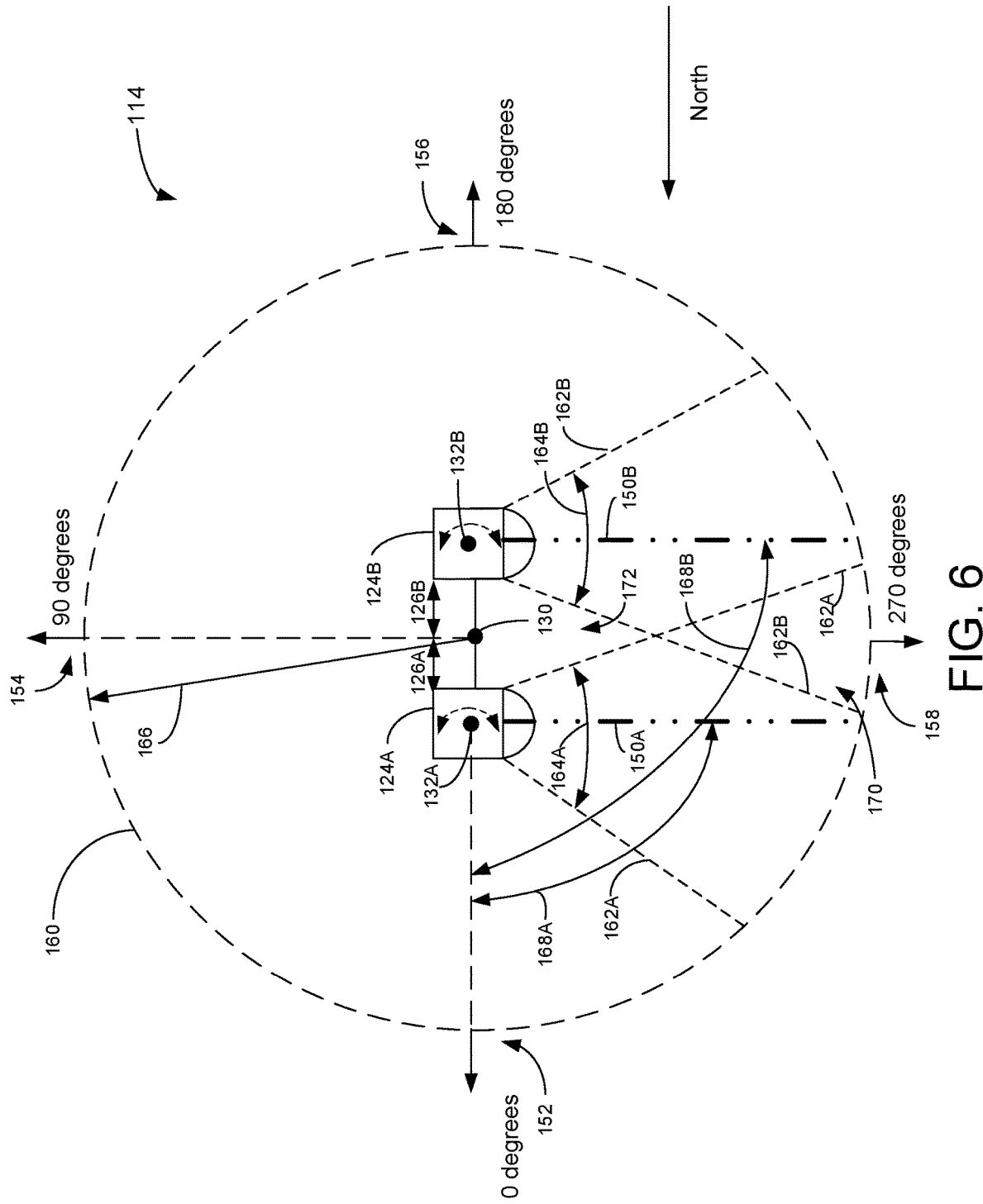
FIG. 6 is another top view of the image capture system schematic illustration of FIG. 5.

Referring now to FIGS. 5 and 6, schematic illustrations of a top view of an image capture system 114 included in an incident detection system 100 are shown, according to an example embodiment. As shown, the image capture system 114 defines a center 130 between the first image capture device 124A and the second image capture device 124B. As shown, the first image capture device 124A is located a first distance 126A from the center 130 and the second image capture device 124B is located a second distance 126B from the center. Further, as shown, the first image capture device 124A may rotate about a first axis of rotation 132A and the second image capture device 124B may rotate about a second axis of rotation. According to various embodiments, the image capture devices 124 are configured rotate (e.g., 90 degrees, 180 degrees, 270 degrees, 360 degrees, etc.) about the respective axis 132. According to other embodiments, the image capture devices 124 are configured rotate less than 360 degrees (e.g., 190 degrees, 180 degrees, etc.) about the respective axis 132.

As shown, each image capture device 124 has a field of view 162 associated with the image capture device 124. The field of view 164 corresponds to the horizontal limits (e.g., the first horizontal edge 462 and the second horizontal edge 464 shown in FIG. 3) of an image captured by the image capture device 124 while set at a given device angle (e.g., the device angle 150). According to various embodiments, the field of view 164 for each image capture device 124 may be between 25 degrees and 75 degrees. For example, the field of view 164 may be 30 degrees, 45 degrees, 60 degrees, etc.

According to various embodiments, the image capture system 114 enables a panoramic view of the area 160 surrounding the image capture system 114. According to example embodiments, each image capture device 124 may be configured to capture objects and incidents in images up to a maximum distance 166 away from the center 130 of the image capture system.

According to example embodiments, each image capture device 124 may be calibrated (e.g., via the method 500). For example, when the first image capture device 124A is being calibrated, the device angle may align with a first angle 427 such that when an image is captured, the horizontal center (e.g., the horizontal center 410 shown in FIG. 3) aligns with the first angle 427. The method 500 may be utilized to determine a reference direction (e.g., a first reference direction 152, a second reference direction 154, a third reference direction 156, a fourth reference direction 158, etc.) and the second angle 428. As shown in FIG. 5, the first device angle 150A is aligned with the first reference direction 152 (e.g., north) and the second device angle 150B is aligned a second reference direction 156 (e.g., south). According to various embodiments, the device angle 150 of each image capture device 124 may be represented by an angular offset from a reference direction. For example, as shown in FIG. 6, the first device angle 150A defines a first angular offset angle 168A with respect to the first reference direction 152 and the second device angle 150B defines a second angular offset angle 168B with respect to the first reference direction. According to various embodiments, some or all images captured by the image capture devices 124 may be associated with an angular offset angle 168 such that the device angle 150 of the image capture device 124 at the time the image was captured may be identified.

As shown in FIG. 6, the first image capture device 124A and the second image capture device 124B may be orientated such that the first field of view 162A and the second field of view 162B define an overlap region 170 such that both the first image capture device 124A and the second image capture device 124B may capture an image that shows the overlap region 170. As is discussed further herein, the overlap region 170 may be utilized while generating a composite image.

As shown in FIG. 6, the first image capture device 124A and the second image capture device 124B are orientated such that an omitted area 172 exists between the first field of view 162A and the second field of view 162B. As shown, the omitted area 172 is largest proximate the center 130 and decreases in size as the distance from the center 130 increases. According to various embodiments, the omitted area 172 may be reduced by reducing the distance 126 between each image capture device 124 and the center 130. Further, as is discussed further herein, the image capture devices 124 may capture some or all of the omitted area 172 when orientated at a different device angle. These other images that do capture some or all of the omitted area 172 may be used to fill in the omitted area 172 when creating a composite image.

Figure 7:
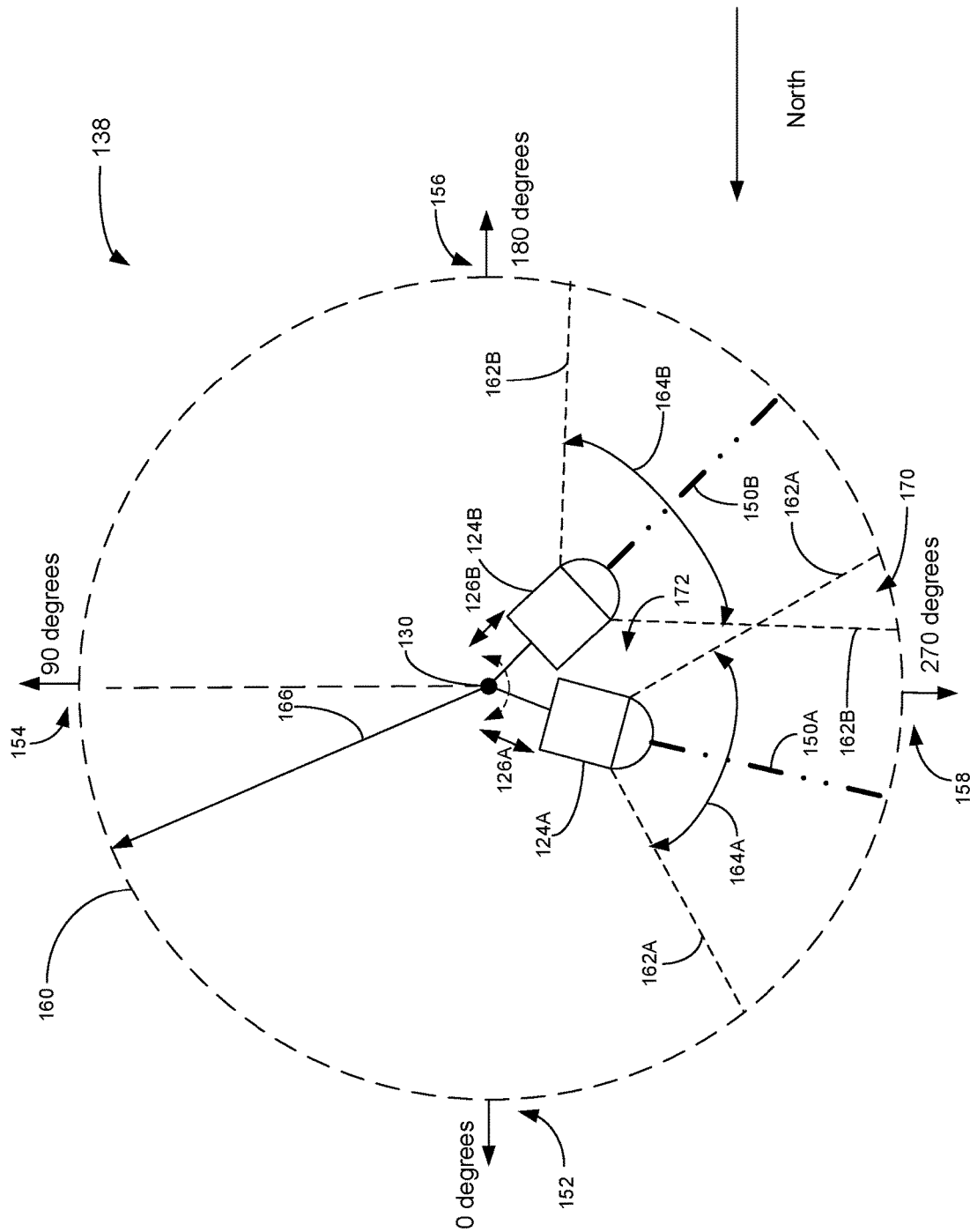
FIG. 7 is a schematic illustration of another station included in an incident detection system, according to an exemplary embodiment.

Referring now to FIG. 7, an alternate image capture system 138 is shown, according to an example embodiment. The image capture system 138 may share one or more features with the image capture system 114 discussed herein. However, as shown, the first image capture device 124A and the second image capture device 124B rotate about the center 130 (e.g., about an axis at the center 130) rather than about the first axis of rotation 132A and the second axis of rotation 132B.

C. Image Capture and Time lapse Panorama Generation

As high-resolution, panoramic composite images can be useful to identify and track wild fires, creating such large composite images from multiple smaller constituent images can be compute intensive and more suitable for processing on a set of servers or a cloud service with many resources. Once generated, the large composite images can be transmitted from the remote servers, or the cloud, over the network and to the client devices on which the users can display the images on their local displays. However, transmitting large images across a network can be challenging. For example, when a large high-resolution, panoramic composite image encounters an error in transmission resulting in the corrupted image file being received at the receiving device, the entire image may have to be retransmitted over the network once again. Thereby, the error and the subsequent retransmission of the file can delays, which as smaller in the event of smaller images and larger in the event of larger images. In the instances in which an application utilizing large image files relies on many transmissions of such large images, as can be the case with the panoramic, composite images herein, network transmission errors can accumulate delays that can adversely affect the user experience. These delays can be exacerbated in the situations in which the network connection is spotty, such as in the mountains or remote areas in which the network communication is provided by remote cellphone towers.

The present solution can address these and other obstacles by transmitting over the network only either individual constituent images to be combined into larger composite images at the server or the cloud, or partitioned parts of the generated composite image to be transmitted over the network to the user device for display. Using this approach, the present solution in both instances sends smaller images instead of the larger one, thereby minimizing the duration of delays associated with any transmission errors, improving the user experience.

Figure 8:
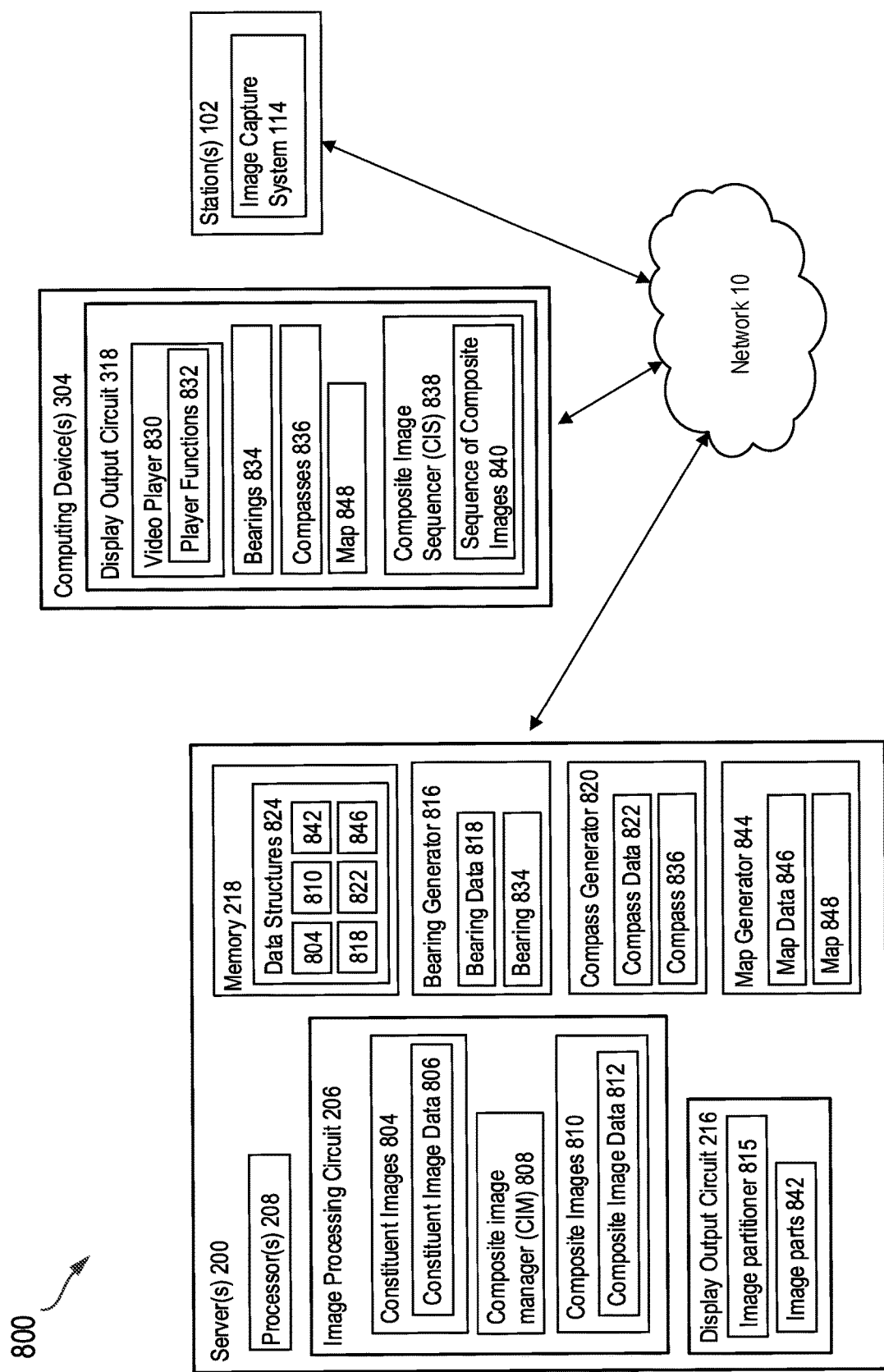
FIG. 8 illustrates an example of a system for implementing image capture and time lapse panorama composite image generation.

FIG. 8 illustrates an example system 800 in which one or more servers 200 communicate with one or more stations 102 and computing devices 304 via a network 10. One or more stations 102 can include one or more image capture systems 114. One or more computing devices 304 can include one or more display circuits 318 that can include one or more bearings 834, one or more compasses 836, one or more maps 848, one or more composite video sequencers (CIS) 838 having one or more sequences of composite images 840 and one or more video players 830 having one or more player functions 832. Along with processors 208, one or more servers 200 can include an image processing circuit 206 that can include one or more constituent images 804 that can include one or more constituent image data 806, one or more composite image managers (CIM) 808 and one or more composite images 810 that can include composite image data 812. One or more servers 200 can include one or more display output circuits 216, that can include one or more image partitioners 814 having one or more image parts 842 and one or more bearing generators 816 that can include one or more bearing data 818 and one or more bearings 834. One or more servers 200 can also include one or more compass generators 820 that can include one or more compass data 822 and one or more compasses 836 as well as one or more map generators 844 that can include one or more map data 846 and maps 848. Memory 218 can include one or more data structures 824 that can store one or more constituent images 804, one or more composite images 810, one or more bearing data 818, one or more maps data 846 and one or more compass data 822.

Constituent images 804 can include any images captured by an image capture system 114, including any raw images that can be captured by any image capture device 124. Constituent image 804 can include image 2100 along with any of features of image 2100, such as width 2102, height 2104 and a horizontal center 2110. Constituent images 804 can be digital images and have any resolution in terms of megapixels, such as for example 10, 20, 30, 40, 50, 60, 70, 80, 90, 100, 200, 300, 400, 500 or more than 500 megapixels. Constituent images 804 can include any formats, including JPEG or JPG, PNG, TIFF, PSD, PDF, EPS or any other image formats. Constituent images 804 can include any aspect ratio of width to height, such as for example width to height ratios of 1:1, 4:3, 3:2 or 16:9. The aspect ratios can be defined by the field of view associated with an image capture device 124. Constituent images 804 can include width and height that can be defined by pixels. For example, constituent images 804 can be wide 2048 pixels and wide 1536 pixels, or any other pixel size, such as 4096 pixels by 3072, or 8192 pixels by 6144, or any other pixel size.

Constituent images 804 can include images along any range of electromagnetic spectrum or wavelength range. Constituent images 804 can include human visible range images, such as images whose captured light generally corresponds to wavelengths of about 400 nm to about 800 nm. Constituent images 804 can include infrared images, such as images whose captured light generally corresponds to wavelengths greater than 800 nm, such as for example any range between 800 nm and 50 micrometers. For example, constituent images 804 can include images whose captured light generally corresponds to wavelengths in the near-infrared images of about 0.8 to 5 micrometers in wavelength, mid-infrared wavelengths of about 5-25 micrometers or far-infrared wavelengths of about 25-40 micrometers. Constituent images 804 can include images whose captured light generally corresponds to any combination of visible and any infrared wavelength range.

Constituent images 804 can cover a specific angular range within the field of view 162 associated with an image capture device 124. Therefore, multiple constituent images 804 can be used to piece together a composite image 810 of 180° or more degrees about the axis. For the purposes of producing a composite image 810, constituent images 804 can include portions, such as a central portion 840 and the overlap portion 842, such as for example, illustrated in FIG. 10. The central portion of the constituent image 804 can include the portion of the constituent image 804 that can be used for creating the composite image 810, while the overlap portions 842 can include portions of a constituent image 804 that overlaps with another neighboring constituent image 804 that can be used for creating the composite image 810.

Constituent image data 806 can include any data for a constituent image 804. Constituent image data 806 can any data or information about an image, including any angle, direction or location discussed herein in connection with FIGS. 2-3 and 5-7. Constituent image data 806 can include information identifying an angle of a constituent image 804, such as a device viewing angle 164, or a device angle 168 that is relative to a reference direction, such as a reference direction 440, or any other angle, direction or other information corresponding to the constituent image 804 or a status of the image capture system 114 that captured the constituent image 804. Constituent image data 806 can include a time stamp indicating the time when the constituent image 804 was taken. Constituent image data 806 can include information on location where the constituent image 804 was taken. Constituent image data 806 can include information about neighboring constituent images 804 to be combined to either side of the constituent image 804 in order to create a composite image 810. Constituent image data 806 can include information about a reference direction 2140, width 2102, height 2104, device angles 150, device viewing angle 164, device angle relative to a reference direction 168, bearing to incident relative to reference direction 2170, reference direction 2140 or any other data, including directional and angular data or information discussed herein.

Composite images 810 can include any images generated by combining two or more constituent images 804. Composite images 810 can include a panoramic image spanning any range of angles. The range of angles can include any range of angles between 1 and 360, such as more than 20 degrees, 30 degrees 45 degrees, 60 degrees, 75 degrees, 90 degrees, 120 degrees, 140 degrees, 160 degrees, 180 degrees, 200 degrees, 220 degrees, 240 degrees, 270 degrees, 300 degrees, 330 degrees or up to full 360 degrees around a location, such as an axis. The axis can be an axis 132 of an image capture device 124, depending on the design.

The axis about which degree angles about the composite image 810 are defined can include the center 130 of the image capture system 114. For instance, a composite image 810 can cover a range of angles defined about axis corresponding to the center 130 of the image capture system 114. The center 130 can serve as the axis of the image capture system 114 when the image capture system 114 includes one or more image capture devices 124. In the instances in which an image capture system 114 utilizes two or more image capture devices 124 centered away from the center 130 by some distance, the distance between the center 130 and the axes 132 of image capture devices 124 can be very small in comparison to the distance between the image capture system 114 (including devices 124) and the areas or features being images in the far field. For example, the distance between the center 130 and axes 132 can be hundreds or thousands of times smaller than the distance between the image capture system 114 (e.g., devices 124) and the locations or terrains at the distance that are being imaged by the constituent images 804. In such instances, given the large difference between these two distances, the center 130 can be used as an axis about which composite image 810 is formed despite the fact that it may not correspond exactly to the mathematical axis for each of the plurality of image capture devices 124 from which constituent images 804 may be gathered for the composite image 810.

Composite images 810 can be generated such that each portion of a composite image 810 corresponds to an angle, or a range of angles, defined about an axis of the image capture system 114. In some implementations, a composite image 810 can be generated from multiple constituent images 804 so that each portion of a composite image 810 corresponds to an angle, or a range of angles, defined about an axis of the image capture device 124. Composite images 810 can be generated by combining, merging or stitching constituent images 804 along vertical axes of the constituent images 804 (e.g., along the height). Composite images 810 can be generated by combining, merging or stitching multiple constituent images 804 end to end along their respective vertical heights. Composite images 810 can be generated by combining, merging or stitching multiple constituent images 804 end to end along their respective vertical heights.

Composite images 810 can be generated such that when constituent images 804 are combined, merged or stitched long their respective widths, they are combined, merged or stitched so that their respective ends overlap. The overlap can be defined based on device field of view overlap 170 as it applies to each constituent image. For example, the overlap between two concatenated neighboring constituent images 804 in a composite image 810 can correspond to about 59, 109, 159 or 209 of the two neighboring constituent images 804. The two overlapping parts of each neighboring constituent image 804 can correspond to the same one or more items, features or locations imaged and can be identical to each other.

Composite image data 812 can include any data of a composite image 810. Composite image data 812 can include any constituent image data 806 for each portion of the composite image 810 corresponding to each constituent image 804 included in the composite image 810. Composite image data 812 can include a timestamp or a time data for the composite image 810. The timestamp or time data can correspond to a time period of time to which the composite image 810 corresponds. For example, the timestamp or time data can correspond to a time range spanning the time period when each of the constituent images 804 were taken. Timestamp or time data can correspond to series of timestamps, each timestamp corresponding to the time of capture of each individual constituent image 804 of the composite image 810.

Composite image data 812 can include data corresponding to the resolution of the composite image 810. The resolution can be defined based on pixels, such as discussed earlier with respect to constituent images 804. Composite image data 812 can include or identify the width and height of the composite image 810 such as discussed earlier with respect to constituent images 804. Composite image data 812 can identify the locations along the width of the composite image 810 where constituent images 804 are combined, stitched or merged. Composite image data 812 can include information about a reference direction 2140, width 2102, height 2104, device angles 150, device viewing angle 164, device angle relative to a reference direction 168, bearing to incident relative to reference direction 2170, reference direction 2140 or any other data, including directional and angular data or information discussed herein.

Composite image manager 808 can include hardware, software or any combination of hardware and software for creating composite images 810. Composite image manager 808 can include computer code, instructions or functions stored in memory (e.g., 218) to implement its functionality via processors 208. Composite image manager 808 can include the functionality to generate composite images 810 by combining constituent images 804. Composite image manager 808 can include the functionality to utilize constituent images 804 and their corresponding constituent image data 806 to form composite image 810. Composite image manager 808 can include the functionality to generate composite image data 812, including by utilizing constituent image data 806. Composite image manager 808 can include the functionality to determine overlap between constituent images 804.

Image partitioner 814 can include hardware, software or any combination of hardware and software for partitioning composite images 810 into various parts or portions. Image partitioner 814 can include computer code, instructions or functions stored in memory (e.g., 218) to implement its functionality via processors 208. Image partitioner 814 can include the functionality to separate a composite image 810 into any number of parts, such as for example into up to 2, 3, 4, 5, 6, 7, 8, 9, 10, 11, 12, 14, 16, 18, 20, 22, 24, 26, 28, 30 or more parts. The parts partitioned can be equal in size or different in size, can be equal in shape or be differently shaped. Image partitioner 814 can include the functionality to separate a composite image 810 into parts, such that each part corresponds to an individual constituent image 804. Each part can also include the constituent image data 806 for each corresponding part corresponding to a constituent image 804. Image partitioner 814 can include the functionality to separate images along the height, along the width, or along any combination of height and width.

Image parts 842 can include any one or more parts of a composite image 810 partitioned by an image partitioner 814. Image parts 842 can include composite image 810 split into any number of parts, such as up to 4, 6, 8, 10, 12, 16, 18, 20, 24, 30 or more parts. Image parts 842 can correspond to the constituent images 804 used to generate the composite image 810. Image parts 842 can for example include 10 parts for a composite image 810 that is generated based on ten constituent images 804 stitched together. Image parts 842 can include likewise any other number of parts. Image parts 842 can include information included in the composite image data 812 which can be sent to the computing devices 304 in order to recombine the image parts 842 into the composite image 810.

Bearing 834, which can also be referred to as the bearing indicator 834, can include an indication of one or more angles corresponding to an image, such as a constituent image 804 or a composite image 810. The angles corresponding to an image can include a series of angles about an axis of an image capture system 114 or an image capture device 124. Bearing 834 can include a strip that can be combined with or displayed with a composite image 810 or a constituent image 804. The strip can be rectangular and include a series of angles identifying angles respective to a constituent image 804 or a composite image 810. The series of angles can include anywhere between 0 and 360 degrees around the reference axis about which, or with respect to which, the composite image 810 was created. Between any two degrees, bearing 834 can identify minutes of angle, such as anywhere between 0 and 60 minutes. Between any two minutes of angle, bearing 834 can identify seconds of angle, such as anywhere between 0 and 60 seconds.

Bearing data 818 can correspond to any data or information concerning angles or directions of a constituent image 804 or a composite image 810. Bearing data 818 can include information about a reference direction 2140, width 2102, height 2104, device angles 150, device viewing angle 164, device angle relative to a reference direction 168, bearing to incident relative to reference direction 2170, reference direction 2140 or any other data, including directional and angular data or information discussed herein. Bearing data 818 can include the information about the range of angles corresponding to each portion of an image (e.g., 804 or 810). Bearing data 818 can include the information about the location within each image to which each individual angle, minute or angle or second or angle applies.

Bearing generator 816, which can also be referred to as the bearing circuit 816, can include hardware, software or any combination of hardware and software for creating a bearing 834, sometimes also referred to as the bearing indicator 834. Bearing generator 816 can include computer code, instructions or functions stored in memory (e.g., 218) to implement its functionality via processors 208. Bearing circuit 816 can include the functionality to generate a bearing 834 (e.g., a bearing indicator) for display within or with a composite image 810. Bearing generator 816 can include the functionality to determine an angle or a range of angles for each portion of a composite image 810, or each portion of a constituent image 804. Bearing circuit 816 can include the functionality to assign or associate an angle or a range of angles for each portion of a composite image 810, or each portion of a constituent image 804. Bearing circuit 816 can include the functionality to utilize constituent image data 806 or composite image data 812 to generate bearing 834.

Compass generator 820, which can also be referred to as the compass circuit 820, can include hardware, software or any combination of hardware and software for partitioning composite images 810 into various parts or portions. Compass generator 820 can include computer code, instructions or functions stored in memory (e.g., 218) to implement its functionality via processors 208. Compass generator 820 can include the functionality to generate a compass 836. Compass circuit 820 can include the functionality to generate a marker or an indicator denoting the range of angles or directions corresponding to the portion of the image (e.g., 804 of 810) being displayed on a display. Compass circuit 820 can include the functionality to generate markers or indicators for denoting or identifying cardinal directions with respect to the portion of the image being displayed.

Compass 836 can include any digital representation of an instrument showing direction, or a range of directions, or an angle, or a range of angles, of a displayed portion of composite image 810 or a constituent image 804. Compass 836 can provide a range of directions or a range of angles corresponding to a portion of the image displayed by a player, such as a video player 830. Compass 836 can include an image or an illustration of a physical magnetic compass instrument to be displayed within or together with a composite image 810 or a constituent image 804. Compass 836 can identify four cardinal directions: east, west, north and south. Compass 836 can identify the direction, range of directions, an angle, or a range of angles to which the image displayed corresponds with respect to an axis about which the displayed image is captured. Compass 836 can display angles defined based on the axis, which can include a center 130 of an image capture system 114 or axes 132 of image capture devices 124. Compass 836 can highlight, display or identify the range of directions corresponding to the width of the displayed portion of the image with respect to the cardinal directions. The range of directions highlighted, displayed or identified by the compass 836 can include the range of angles corresponding to a reference direction 2140.

Compass data 822 can include any data corresponding to a direction of a portion of a composite image 810 or a constituent image 804 being displayed. Compass data 822 can include any bearing data 834, constituent image data 806 and composite image data 812. Compass data 822 can include any on the range of angles or directions corresponding to a portion of an image being displayed by a video player 830. Compass data 822 can include information about a reference direction 2140, width 2102, height 2104, device angles 150, device viewing angle 164, device angle relative to a reference direction 168, bearing to incident relative to reference direction 2170, reference direction 2140 or any other data, including directional and angular data or information discussed herein.

Maps 848, which can also be referred to as map indicators, can include an indication of regions towards which an image, such as a displayed image 804 or 810, is turned or focused. Maps 848 can include indicators identifying areas covered by an image 804 or 810, or by a portion of the image 804 or 810 displayed in the image. The angles of the indicators on the map 848 can correspond to a series of angles about an axis of an image capture system 114 or an image capture device 124. Maps 848 can identify locations, geographical areas, mountains, rivers, roads and towns, which can be displayed along with an indicator showing a portion of the map 848 to which the image being displayed corresponds.

Map data 846 can correspond to any data or information concerning a geographical representation of an area, along with the angles or directions of a constituent image 804 or a composite image 810. Map data 846 can include data on the geographical area being imaged. Map data 846 can include, be based on, or correspond to the bearing data 818 or compass data 836. Map data 846 can include geographic locations, towns, roads, mountains, rivers and other landmarks, that can be associated with angles about an axis (e.g., 130, 132) defined in terms of a reference direction 2140, width 2102, height 2104, device angles 150, device viewing angle 164, device angle relative to a reference direction 168, bearing to incident relative to reference direction 2170, reference direction 2140 or any other data, including directional and angular data or information discussed herein.

Map generator 844 can include hardware, software or any combination of hardware and software for creating a map 848, sometimes also referred to as the map indicator 848. Map generator 844 can include computer code, instructions or functions stored in memory (e.g., 218) to implement its functionality via processors 208. Map generator 844 can include the functionality to generate a map 848 for display within or with a composite image 810. Map generator 844 can include the functionality to determine an angle or a range of angles for each portion of a composite image 810, or each portion of a constituent image 804 and display geographic data in the map in relation to such angle or range of angles.

Data structures 824 can include any type and form of a data organization, management and storage format allowing for data access and modification. Data structures 824 can include a collection of data, including values or entries, such as images 804 and 810, including their corresponding data 806 and 812. Data structure 824 can include image parts 842. Data structures 824 can include relationships or associations between different data. Data structures 824 can include functions or operations that can be applied to various data, such as for example algebraic structures. Data structures 824 can be stored in memory 218 and can organize stored data using arrays, linked structures or lists, unions, tagged unions, objects, hashes, graphs and binary trees. Data structures 824 can be stored in the memory of servers 200 or other devices, such as computing devices 304.

Video player 830 can include hardware, software or any combination of hardware and software for displaying composite images 810 and constituent images 804. Video player 830 can include computer code, instructions or functions stored in memory (e.g., 218) to implement its functionality via processors 208. Video player 830 can include the functionality to play or display any media content, such as for example, images, including constituent images 804 and composite images 810, videos, illustrations, maps and presentations. Video player 830 can include the functionality to reconstruct the composite images 810 received using received image parts 842. Video player 830 can utilize composite image data 812, which can be transmitted together with image parts 842 to the computing devices 304, to reconstruct the composite image 810 from the image parts 842. Video player 830 can include the functionality to manipulate via player functions 832 the displayed media content and display sequenced images. Video player 830 can include the functionality to zoom into, or out of media content displayed, as well as to pan the content left or right or scroll the content up or down. Video player 830 can include the functionality to display bearing 834 and compass 836. Video player 830 can include the functionality to display any maps, such as maps of locations of stations at which constituent images 804 are captured.

Player functions 832 can include hardware, software or any combination of hardware and software for partitioning composite images 810 into various parts or portions. Player functions 832 can include computer code, instructions or functions stored in memory (e.g., 218) to implement its functionality via processors 208. Player functions 832 can include the functionality to manipulate an image, whether 804 or 810, including to zoom into, or out of the image being displayed by video player 830, pan sideways across the image being displayed by video player 830 and scroll up or down the image being displayed by video player 830. Player functions 832 can include the functionality to play sequence of composite images 840. Player functions 832 can include buttons for running a sequence of composite images 840 as a video, including a play button, a pause button, a scroll bar to scroll across the sequence of composite images 840, a fast forward button, a rewind button and a replay button.

Sequence of composite images 840 can include any sequence or chain of composite images 810. Sequence of composite images 840 can include two or more composite images 810 arranged chronologically. The two or more composite images 810 of the sequence of composite images 840 can be ordered based on their bearing 834. For example, a first composite image 810 of the sequence can be oriented and displayed based on the angles on the bearing 834 in accordance with a reference direction 440, and a second composite image 810 of the sequence to be displayed after the first image can also be oriented and displayed based on the same angles of the bearing 834 in accordance with the same reference direction 440. Therefore, as multiple images of the sequence of composite images 840 are being displayed on a display, they can be oriented so that they point to the same angle range, and therefore the same features being imaged, as the sequence of composite images 840 is being displayed.

Composite image sequencer (CIS) 838 can include hardware, software or any combination of hardware and software for creating a sequence of composite images 810. Composite image sequencer 838 can include computer code, instructions or functions stored in memory (e.g., 218) to implement its functionality via processors 208. Composite image sequencer 838 can include the functionality to generate a sequence of composite images 840. CIS 838 can include the functionality to arrange the composite images 810 in the sequence and assign them their order. CIS 838 can include the functionality for synchronizing composite images 810 in the sequence of composite images 840 according to their bearing 834 or angle data assigned according to a specified reference direction 440.

Image processing circuit 206 can include functionality implemented in computer code or instructions stored in memory 218 and implemented via processors 208 to process constituent images 804 and composite images 810. Image processing circuit 206 can receive, store, process and transmit images, utilizing any functionality of constituent images 804, constituent image data 806, composite image manager 808, composite images 810 and composite image data 812. Image processing circuit 206 can utilize display output circuit 216, along with the image partitioner 815 to separate composite images 810 into parts to be transmitted over network 10.

It is understood that while FIG. 8 illustrates the system components in the illustrated stated arrangement, computing devices 304 can include any system components or functionality of one or more servers 200, and vice versa, any one or more servers 200 can include any system components or functionality of one or more computing devices 304. For example, computing devices 8304 can include bearing generator 816 and compass generator 820 and server 200 can include the display output circuit 318. Display output circuits 216 and 318 can each include the functionality and system components of the other and can process images for display, such as a computer screen display. Display output circuits 215 and 318 can display constituent images 804 and composite images 810, as well as sequences of composite images 840 along with any bearings 834 and compasses 836.

Figure 9:
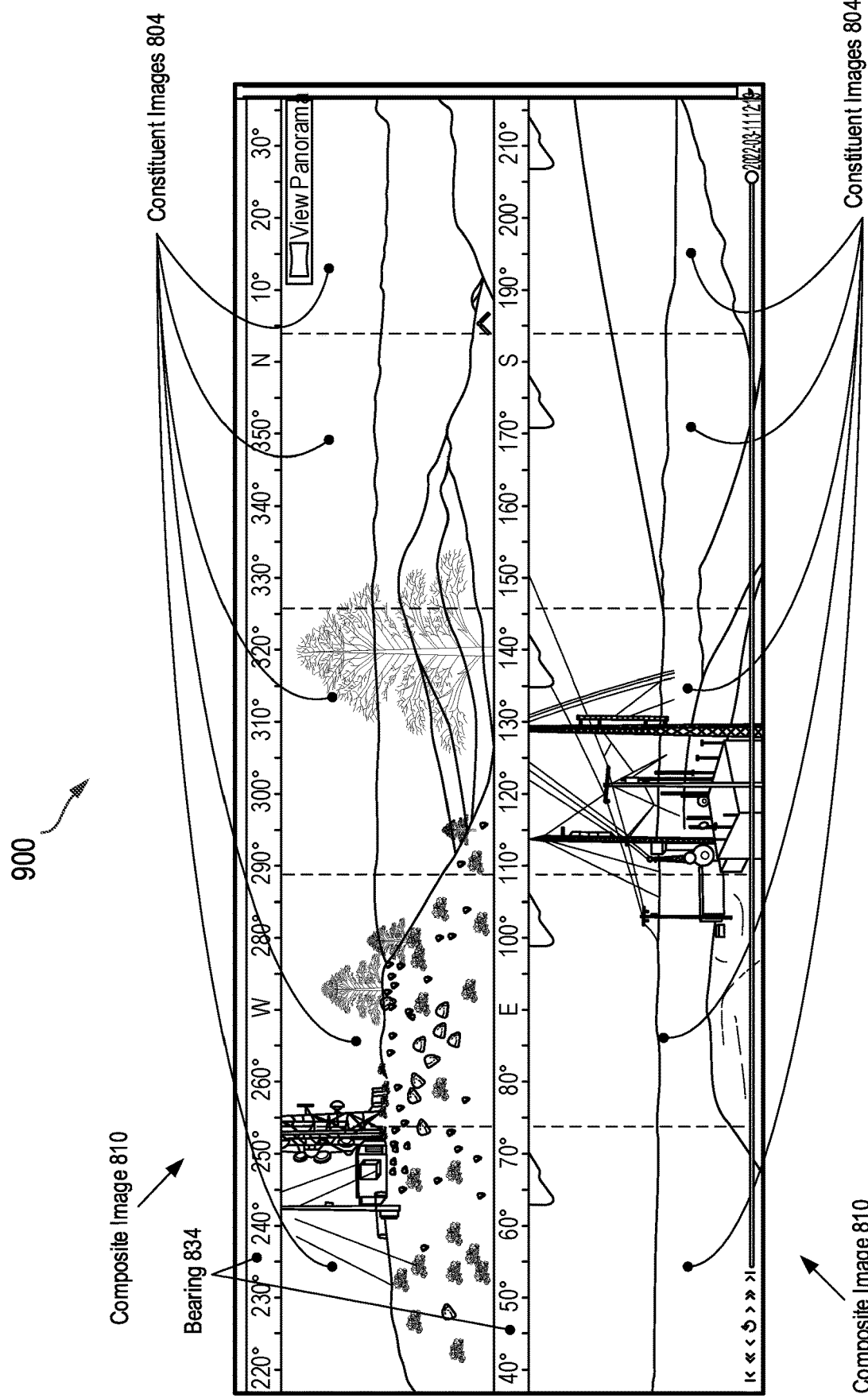
FIG. 9 is an example of a display view of an example composite image displayed with a bearing indicator.

FIG. 9 illustrates an example of a display view 900 that could be displayed on a client device's display. Display view 800 illustrates two example composite images 810, one above the other, and each one comprising its own bearing of about 180 degrees across the top portion of the respective image. The upper composite image 810 includes five constituent images 804 stitched together to form the upper composite image 810. The upper composite image 810 also includes a bearing indicator 834 across the top of the image, marking an angle range of about 180 degrees, more specifically spanning the range of below 220 degrees to about more than 35 degrees.

Similarly, the lower composite image 810 of the example display view 800 also includes five constituent images 804 and a bearing 834 across the top of the image, also covering the range of about 180 degrees, from about less than 40 degrees to about more than 215 degrees. It is evident by observing both the bearings 834 for the upper composite image 810 and the lower composite image 810 that the sum of the two bearings 834 amounts to a full 360 degrees around the axis of the image capture system 114. The illustrated example therefore covers a full 360 degree circle around the axis, utilizing two composite images 810 composed of five individual constituent images 804, where each of the two composite images 810 cover about a half of the circle around the axis.

At the bottom side of the lower constituent image 810 there are player functions 832 for running through the sequence of composite images 840, including a replay button, forward and backward buttons, fast forward and fast rewind buttons and buttons for going back to the beginning or the end of the sequence. Using these player functions 832, a user can run through a sequence of composite images 840 several different ways, seeing all of 360 degrees around the axis of the image capture system 114 at the same time.

Figure 10:
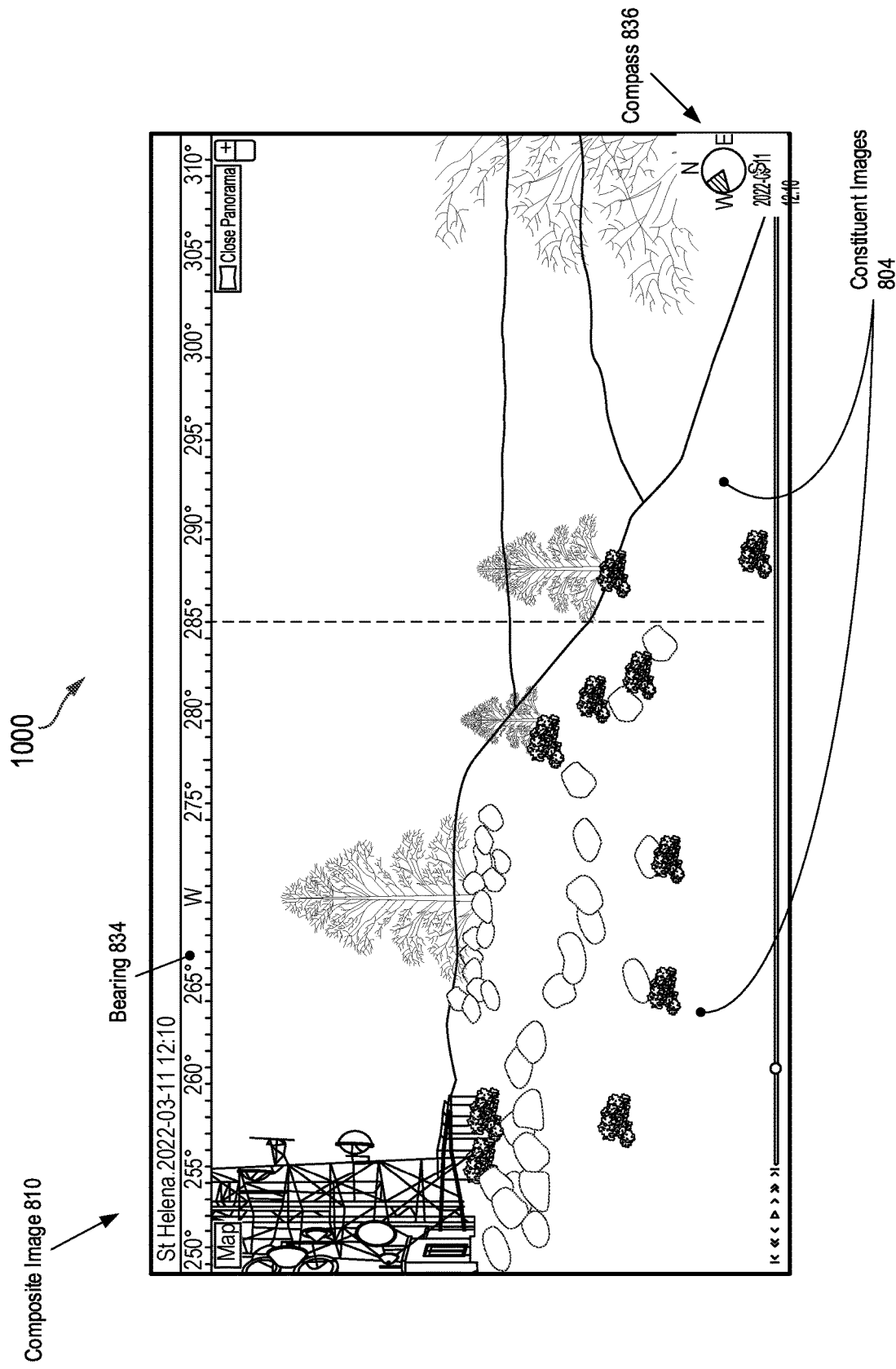
FIG. 10 is another example of a display view of an example composite image displayed with a bearing indicator and a compass.

FIG. 10 illustrates an example of a display view 1000 that could be displayed on a client device's display. In display view 1000, a composite image 810 is displayed. The displayed composite image 810 includes two constituent images 804 and a bearing across the top of the composite image 810 covering a range of angles of about 250 degrees to more than 310 degrees, thereby spanning more than about 60 degrees around the axis of an image capture system 114. At the bottom of the composite image 810 player functions 832 are displayed, including a play button, a forward and backward buttons, a fast forward and a fast rewind buttons and buttons for going back to the beginning or the end of the sequence of composite images 840 being displayed.

The present solution can relate to system in which one or more processors (e.g., 208) of one or more servers (e.g., 200) coupled to memory (e.g., 218) are configured to implement a plurality of tasks. For example, the one or more processors (e.g., 208) can identify a first plurality of constituent images (e.g., 804) captured by an image capture system (e.g., 114) rotating about an axis (e.g., 130, 132) over a first time period. Each constituent image (e.g., 804) of the first plurality of constituent images can correspond to a respective angle about the axis, such as angles of constituent image data 806 and a respective time within the first time period, such as time of the image of the constituent image data 806. The one or more processors can generate a first composite image (e.g., 810) based on the first plurality of constituent images (e.g., 804) arranged according to the respective angles of each of the first plurality of constituent images. The one or more processors can partition the first composite image (e.g., 810) into a first plurality of partial images (e.g., 842), where each partial image of the first plurality of partial images can be associated with a respective angle relative to a reference direction. For example, each partial image 842 of the first composite image can be split into any number of partial images 842, each of which corresponds to an angle about the axis, or a range of angles about the axis of the image capture system 114. The one or more processors (e.g., 208) can be configured to identify a second plurality of constituent images (e.g., 804) captured by the image capture system (e.g., 114) rotating about the axis over a second time period. Each image of the second plurality of constituent images can correspond to a respective angle about the axis and a respective time within the second time period. The one or more processors (e.g., 208) can generate a second composite image (e.g., 810) based on the second plurality of constituent images (e.g., 804) arranged according to the respective angles of the second plurality of constituent images. The respective angles can correspond, for example, to angles about the axis included in the constituent image data 806. The one or more processors can partition the second composite image (e.g., 810) into a second plurality of partial images (e.g., 842). Each partial image of the second plurality of partial images can be associated with a respective angle relative to the reference direction (e.g., 440). The one or more processors can transmit, to a client device, for presentation via a player (e.g., 830), each of the first plurality of partial images and the second plurality of partial images and the corresponding respective angle relative to the reference direction. The player can be configured to reconstruct the first composite image from the first plurality of partial images and the second composite image from the second plurality of partial images. The player can be configured to sequentially present the first composite image and the second composite image in accordance with the first time period and the second time period.

The one or more processors can select, from the first plurality of constituent images (e.g., 804), a first group of constituent images, each constituent image of the first group can be selected based on the respective angle about the axis (e.g., 130, 132) corresponding to the constituent image. The one or more processors can select, from the second plurality of constituent images (e.g., 804), a second group of constituent images, each image of the second group selected based on the respective angle about the axis (e.g., 130, 132) corresponding to the constituent image. The first group of constituent images can include a subset of the first plurality of constituent images. Each respective constituent image of the subset of the first plurality can include a first portion overlapping with a second portion of at least one of a preceding or a subsequent respective constituent image of the subset of the first plurality. The second group of constituent images can include a subset of the second plurality of constituent images. Each respective constituent image of the subset of the second plurality can include a third portion overlapping with a fourth portion of at least one of a preceding or a subsequent respective constituent image of the subset of the second plurality.

The image capture system (e.g., 114) can include a first image capture device (e.g., 124) capturing a first group of the first plurality of constituent images over at least a first 180 degrees about the axis and a first group of the second plurality of constituent images over at least the first 180 degrees about the axis. The image capture system (e.g., 114) can include a second image capture device capturing a second group of the first plurality of constituent images over at least a second 180 degrees about the axis and a second group of the second plurality of constituent images over at least the second 180 degrees about the axis.

The player (e.g., 830) can be configured to include a zoom function, and wherein a zoom level of the player adjusted during the presentation of the first composite image remains unchanged during the presentation of the second composite image. Each of the first plurality of constituent images can be captured by the image capture system at a different point in time within the first time period and each of the second plurality of constituent images is captured by the image capture system at a different point in time within the second time period. For example, the first plurality of constituent images can be captured within a first minute time period and a second plurality of constituent images can be captured within a second minute time period following the first minute time period. The time difference between the first minute time period can be any period, such as zero seconds, at least 1 minute, at least 5 minutes, at least 10 minutes, at least 12 minutes, at least 15 minutes, at least 30 minutes, at least an hour, at least 2 hours, at least 3 hours, at least 4 hours, at least 6 hours, at least 12 hours or at least 24 hours.

The one or more processors can be configured to identify each constituent image of the first plurality of constituent images based on the respective angle of the constituent image, wherein the respective angle is determined based on a reference direction (e.g., 440). The angle can include a degree angle about the axis with respect to the reference direction 440. The one or more processors can be configured to generate the first composite image (e.g., 810) by connecting a second end of a central portion of a first constituent image of the first plurality of constituent images with a first end of a central portion of a second constituent image of the second plurality of constituent images. A part of the first constituent image (e.g., 804) can overlap with a part of the second constituent image (e.g., 804).

The one or more processors can be configured to store for each partial image of the first composite image, in one or more data structures, (e.g., 824) a respective first association between the partial image (e.g., 824) and a respective first bearing indicator (e.g., 834) indicating at least one respective angle relative to the reference direction. The one or more processors can be configured to store for each partial image (e.g., 824) of the second composite image (e.g., 810), in the one or more data structures (e.g., 824), a respective second association between the partial image (e.g., 842) and a respective second bearing indicator (e.g., 834) indicating at least one respective angle relative to the reference direction. The one or more processors can be configured to transmit, to the client device, each partial image of the first composite image (e.g., 810) and the respective first bearing indicator (e.g., 834) and each partial image of the second composite image (e.g., 810) and the respective second bearing indicator (e.g., 834).

The player (e.g., 830) can include an actionable object (e.g., 832), which when interacted with, causes the player to navigate between the first composite image (e.g., 810) derived from the first plurality of constituent images captured over the first time period and the second composite image (e.g., 810) derived from the second plurality of constituent images captured over the second time period. The player can be configured to include a zoom function (e.g., 832), and wherein adjusting the zoom of the first composite image causes the player to adjust a resolution of the first composite image. The player (e.g., 830) can be configured to include a pan function (e.g., 832), and wherein panning the first composite image of the player to display a first portion of the first composite image (e.g., 810) corresponding to a first set of angles causes the player to display a portion of the second composite image (e.g., 810) corresponding to the first set of angles.

The present solution can include a system that can include a video player 830, that can include a panoramic canvas player having a file player.js to display images from cameras deployed on mountains and hills to identify and monitor wildfires. Each monitoring spot can be referred to as a station and each station could include one or more cameras (e.g., image capture devices 124). The cameras take images periodically and continuously and the station can send the images (e.g., constituent images 804) to a cloud service, which can be referred to as a Pano cloud. The cloud service, which can be provided by one or more servers, such as servers 200, can include one or more services or processes that process, compress, store and serve the images, including composite panoramic images, for the front-end users.

When a front end user or device calls an end point end station camera, such as "/ec" or "/ecs" to acquire the station meta data for images as well as the image, the front end user or device can send API calls to fetch panorama images (e.g., composite images 810). Meanwhile, every time period, such as for example every minute, backend servers (e.g., 200) can receive a group of constituent images 804 from the station, such as 8 or 10 images, to form a composite image 810. Therefore, a new composite image 810 can be generated periodically, such as every minute, and include constituent images 804 generated during that minute.

Backend servers 200 can provide, the composite image 810 as well as the constituent images 804 via one or more web interfaces, such as a website. For example, backend servers 200 can provide individual constituent images 804 using an internet address, such as: https://companywebsite.ai/station_number/scale_number/sequence_number. The group of constituent images 804 can comprise the parts of the full composite image, by being concatenated horizontally in incremental order in order to produce the full panorama composite image 810.

Front-end device, such as the client or user device, can fetch and receive parts (e.g., 842) of the panoramic composite image 810 and concatenate them or put them together to regenerate or reform a whole seamless composite image 810. This can be implemented by the player 830, whose other features or functions (e.g., 832) can include buffering, playback controls, panning, zoom in/out, play the images like a video, mark a fire, etc.

The player 830 can utilize HTML5 canvas to plot the images dynamically. The size of the canvas can vary in sizes. In some implementations, the canvas may be not large enough to hold all the concatenated constituent images 804 forming the composite image 810, and so scroll, panning and zoom player functions 832 can be used. The player 830 can include a float number option, such as "this.state.zoom" which can be set to a number, such as 0.5. In some instances, panoramic composite images 810 with dimension 975*879 can be plotted as 487.5*439.5 images. The player 830 can include a built-in canvas API, such as "drawImage" API which can draw an image enlarged or shrunken. The API can be used via an instruction or a command, such as: ctx.drawImage(image, sx, sy, sWidth, sHeight, dx, dy, dWidth, dHeight)

The player 830 can include multiple variables, inputs or instructions. For example, a variable or input "dois" can identify the number of parts 842 which the panorama composite image 810 has been cut or partitioned into. Therefore "dois–10" can refer to the composite image 810 cut into 10 image parts 842. For example, a variable or input "panoWidth/panoHeight" can be used to identify unzoomed, unscaled, full size of the original panoramic composite image. For example "panoWidth/panoHeight—19500/1758" can identify an image as having 19500 pixels width and 1758 pixels in height. –9 Full Panorama Image" above.

Variables or inputs for a canvas can include for example "ctx:" to identify the canvas context in two dimension. They can include "canvasOffsetX:" to identify the the distance between canvas left-boundary and the window left-boundary. They can also include "canvasOffsetY:" to identify the distance between canvas top-boundary and the window top-boundary. Variables or inputs for a meta data can include, for example, "scale" such as "scale—1:" which can identify or define camera images, such as constituent images 804, to be images with size be up to 1 MB/file. The size can also be set to any other size in terms of megabytes. In some instances, to save bandwidth, the backend servers can keep or store, in the data structures 824, three different sizes of every image, such as the full size, half size and a quarter size, and can serve each one of them upon request. For example, an original composite image 804 with dimension 1950*1758 can have a version that is scaled to a half size (e.g., scale/2) having a dimension 975*879. For example, the scale size for service to client mobile devices can be set to a half of the value to be served on a client laptop or a desktop computer. Variables or inputs can include "canvasWidth/canvasHeight-1200/219" can define the width and height of the canvas, where the images displayed can be plotted. Variables or inputs can include "width/height—975/879:" that can define or identify the width and height of every received image, scaled.

Variables or inputs can include values for a station 102. For example, "zoom" can be set to a scale or zoom level of the player 830. A "scaledWidth/scaledHeight" can be set to equal "meta.width*state.zoom" and can include or correspond to zoomedWidth/zoomedHeight, which can indicate the actual plotted image dimension considering zoom level. For example, "panoWidth" can be set to "state.scaledWidth*camera.dois", which can correspond to the expected panorama full width of concatenated images, considering zoom level. For example, "xm/ym: x/y" can be used to coordinate of the mouse, which can be updated based on any one or more of "onmousewheel", "onmouseenter", "onmousemove", "onmousedown", "onmouseout", "onmouseup." For example, "xd/yd: x/y" can coordinate the mouse when mousedown. It can be used to calculate how far the mouse moves when dragging. For example, "xmd:" can be used to state.xm value when mouse down. For example, "xi/yi:" can treat top-left point of the canvas as (0, 0). The point of image top-left can be (xi, yi). For example, "xo/yo:" can be used to offset the mouse down position relative to the top-left point of the panorama image.

A sequence of the images (e.g., 804) from each camera (e.g., 124) rotation can be used to generate a single panorama composite image 810. The sequence of images can be numbered sequentially. One sequence can be produced every period. A period within which constituent images 804 can be 15 seconds, 30 seconds, 1 minute, 2 minutes, 3 minutes, 4 minutes, 5 minutes, 6 minutes, 10 minutes, 15 minutes, 20 minutes, 30 minutes, 40 minutes, 50 minutes, 60 minutes or any other period above 60 minutes.

A sequence can be used instead of an epoch minute so that cameras (e.g., 124) of edge computers (e.g., 104) can rotate at different periods and still be a part of the same sequence. This can allow the cameras (e.g., 104) to rotate at different speeds, within the period for forming a single composite image 810, and still allow the images from different cameras to be used for the composite image 810.

Constituent images 804 can be stored with metadata (e.g., 806) that include angles defined in terms of epoch. For example, a constituent image 804 can be stored in terms of an angle to which the image is termed, defined in terms of epoch minutes and/or epoch seconds. The images can include an epoch start and epoch end, which can correspond to the beginning of the image on the start of the image 804, such as a start of the width of the image on one end and the end of the width of the image on the other, thus defining a range of angles which the constituent image 804 covers. The angles can be defined in terms of epoch minutes/seconds or angles about the axis, or can be converted between the two, as needed. The angles for each image 804 can be defined in terms of the reference direction 2140.

Image capture devices 124 can rotate around the axis in a stop and go fashion. For example, an image capture device 124 can start from an initial position and take a first constituent image 804. Then, the image capture device 124 can rotate a set number of degrees, such as 36 degrees, and stop to stabilize, zoom and adjust and take a second constituent image 804. Then, the image capture device 124 can rotate another set number of degrees, such as 36 degrees, stop to stabilize, zoom and adjust and take a third constituent image 804. The image capture device 124 can continue in such a stop and go fashion for about one minute to take about 5 images, thus averaging about 10-12 seconds per image. The image capture device 124 can, after taking the last (e.g., fifth) image, continue rotating in the same direction back to the initial position to take the first constituent image 804 for the next composite image 810.

Figure 11:
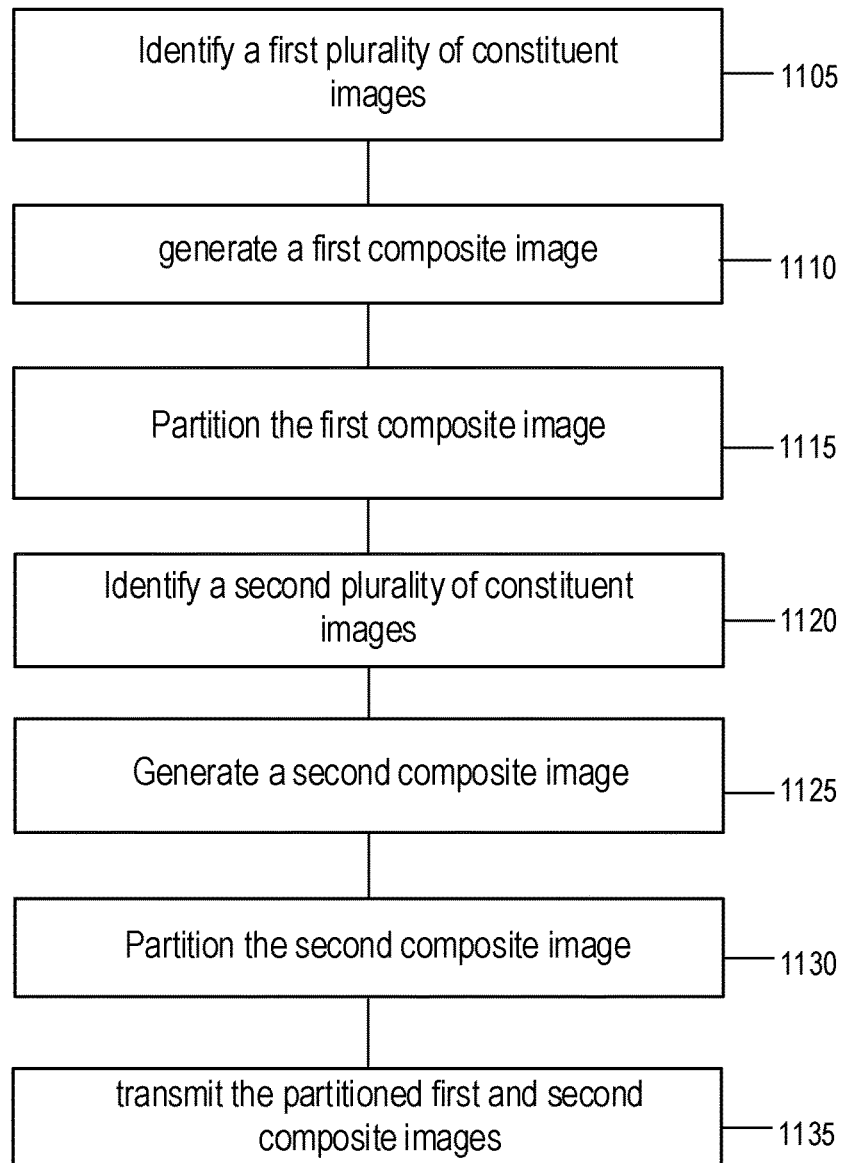
FIG. 11 is an example of a flow diagram illustrating an example method for generating and displaying composite images in accordance with the system features of the present disclosure

FIG. 11 illustrates a method 1100 for utilizing a system 800 to generate and display composite images generated by constituent images generated about an image capture system. Method 1100 can include acts 1105 to 1135. At act 1105, a first plurality of constituent images is identified. At act 1110, a first composite image is generated. At act 1115, the first composite image is partitioned. At act 1120 a second plurality of constituent images is identified. At act 1125, a second composite image is generated. At act 1130, the second composite image is partitioned. At act 1135 the partitioned first and second composite images are transmitted.

At act 1105, a first plurality of constituent images is identified. One or more processors can identify a first plurality of constituent images captured by an image capture system rotating about an axis over a first time period. Each constituent image of the first plurality of constituent images can correspond to a respective angle about the axis and a respective time within the first time period. In an implementation, an image processing system can identify the plurality of constituent images to use to form a composite image based on their constituent image data. For example, each of the first plurality of constituent images can be captured by the image capture system at a different point in time within the first time period. Each of the second plurality of constituent images can be captured by the image capture system at a different point in time within the second time period. Image processing system can identify the first plurality of constituent images for the first composite image based on the time data of the first plurality of constituent images. For example, image processing system can identify all constituent images from a first time period as constituent images to use to generate a first composite image and images of a second time period as constituent images to use to generate a second composite image.

At act 1110, a first composite image is generated. One or more processors can generate a first composite image based on the first plurality of constituent images arranged according to the respective angles of each of the first plurality of constituent images. A device, such as a server or a computing device, can store, in one or more data structures, a first association between the first composite image and a first bearing indicator indicating a first range of angles about the axis and along a width of the first composite image. The first range of angles can comprise the respective angles of each of the first group of constituent images.

Generating the first composite image can include connecting a second end of a central portion of a first constituent image of the first plurality of constituent images with a first end of a central portion of a second constituent image of the second plurality of constituent images. A part of the first constituent image can overlap with a part of the second constituent image.

At act 1115, the first composite image is partitioned. The one or more processors can partition first composite image into a first plurality of partial images. Each partial image of the first plurality of partial images can be associated with a respective angle relative to a reference direction. For each partial image of the first composite image, the one or more processors can store in one or more data structures, a respective first association between the partial image and a respective first bearing indicator indicating at least one respective angle relative to the reference direction.

At act 1120 a second plurality of constituent images is identified. The one or more processors can identify a second plurality of constituent images captured by the image capture system rotating about the axis over a second time period. Each image of the second plurality of constituent images can correspond to a respective angle about the axis and a respective time within the second time period.

At act 1125, a second composite image is generated. The one or more processors can generate a second composite image based on the second plurality of constituent images arranged according to the respective angles of the second plurality of constituent images. A device, such as a server or a computing device can store in the one or more data structures, a second association between the second composite image and a second bearing indicator indicating a second range of angles about the axis and along a width of the second composite image. The second range of angles can comprise the respective angles of each of the second group of constituent images.

At act 1130, the second composite image is partitioned. The one or more processors can partition the second composite image into a second plurality of partial images. Each partial image of the second plurality of partial images can be associated with a respective angle relative to the reference direction. For each partial image of the second composite image the one or more processors can store, in the one or more data structures, a respective second association between the partial image and a respective second bearing indicator indicating at least one respective angle relative to the reference direction.

At act 1135 the partitioned first and second composite images are transmitted. The one or more processors can transmit to a client device, for presentation via a player, each of the first plurality of partial images and the second plurality of partial images and the corresponding respective angle relative to the reference direction. The player can be configured to reconstruct the first composite image from the first plurality of partial images and the second composite image from the second plurality of partial images and sequentially present the first composite image and the second composite image in accordance with the first time period and the second time period. The device can combine for presentation via the player the first composite image with the first bearing indicator and the second composite image with the second bearing indicator.

Figure 12:
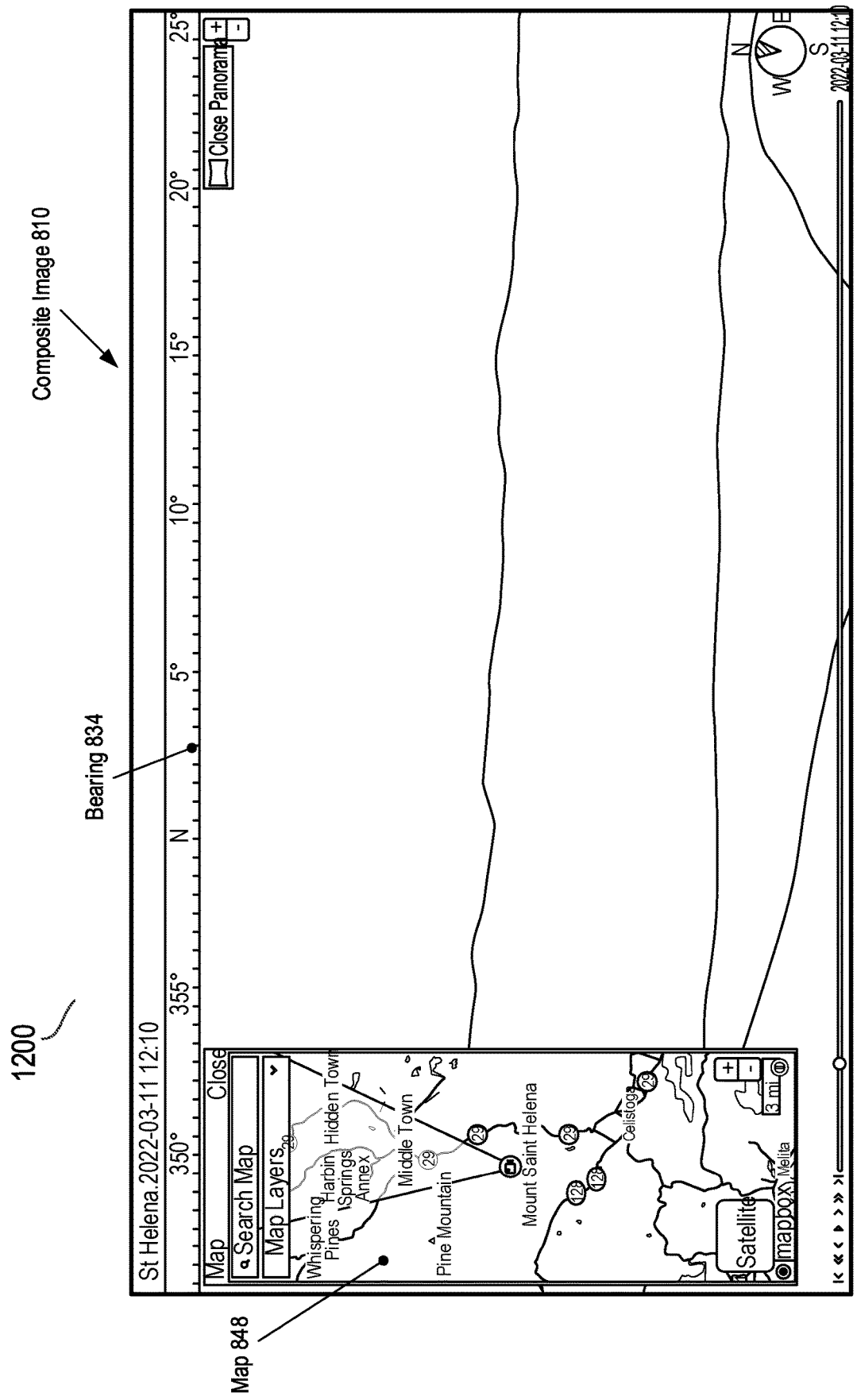
FIG. 12 is another example of a display view of an example composite image displayed with a map indicator.

FIG. 12 illustrates an example of a display view 1200 that could be displayed on a client device's display. In display view 1200, a composite image 810 is displayed. The displayed composite image 810 can include multiple constituent images 804 that span angles from about 345 degrees to about 25 degrees, along with a bearing 834 across the top of the composite image 810 covering the same range of angles. The display view 1200 includes features in the image, but also a map 848 identifying various geographic locations and features, such as towns, roads, rivers and so on. Map 848 also provides an indicator, in the shape of a triangle, illustrating the angular range corresponding to the display view 1200. The triangle shaped indicator can include a starting point of the triangle can be at the location of the image capture system 114 on the map 848 and can widen as the distance from the image capture system 114 increases. The widening of the angle can be in accordance with the angular range corresponding to the displayed view 1200. At the bottom of the composite image 810 player functions 832 are displayed, including a play button, a forward and backward buttons, a fast forward and a fast rewind buttons and buttons for going back to the beginning or the end of the sequence of composite images 804 being displayed.

The present disclosure can also relate to a system that can include a server comprising one or more processors, coupled to memory. The server can identify a composite image corresponding to a range of angles about an axis of rotation of an image capture system. The server can store, in one or more data structures, an association between the composite image and a bearing indicator indicating the range of angles along a width of the composite image. Each respective angle of the range of angles can correspond to a respective portion of the width of the composite image. The server can present, on a display, a first portion of the composite image corresponding to a first set of angles of the range of angles and a first portion of the bearing indicator including the first set of angles. The server can also display at least one of a first compass indicator indicating, on a compass, with the first set of angles relative to the range of angles, or a first map indicator indicating a first geographic region on a map, where the first geographic region corresponds to the first set of angles and a location of the image capture system. The server can determine, responsive to a user action that causes a second portion of the composite image to be displayed, a second set of angles of the range of angles corresponding to the second portion of the composite image. The server can present, on the display, responsive to determining the second range of angles, a second portion of the composite image corresponding to the second range of angles and a second portion of the bearing indicator including the second set of angles. The server can present, on the display, at least one of a second compass indicator, on the compass, indicating the second set of angles relative to the range of angles, where the second compass indicator can be generated based on the second set of angles, or a second map indicator indicating a second geographic region on the map, where the second geographic region can correspond to the second set of angles and the location of the image capture system.

The system can include the composite image that can correspond to the range of angles relative to a reference direction about the axis of rotation, the reference direction corresponding to a reference angle of the range of angles. The bearing indicator can indicate at least one of four cardinal directions, including: north, east, south or west. The composite image can be generated from a sequence of constituent images. Each constituent image of the sequence can correspond to a respective subset of the range of angles. The range of angles of the composite image can extend from zero to at least 180 degrees around the axis of rotation. The range of angles of the composite image can extend from zero to 360 degrees about the axis of rotation and wherein the server stores an association between the composite image and the bearing indicator indicating the range of angles spanning 360 degrees.

The system can include the server to present, on the display, both of the first map indicator and the first compass indicator. The server can present, on the display both of the second map indicator and the compass indicator. The system can be configured such that the user action causes the first portion of the composite image to pan or scroll to the second portion of the composite image and the first map indicator and the second map indicator each can have a first shape and a first size, or the first compass indicator and the second compass indicator each can have a second shape and a second size.

The system can be configured such that the user action causes a zoom setting for displaying the first portion of the composite image to be changed and the first map indicator has a first shape and a first size and the second map indicator has a second shape and a second size, or the first compass indicator has a third shape and a third size and the second compass indicator has a fourth shape and a fourth size.

The system can include the composite image being a first composite image captured at a first time and the server can be configured to identify a plurality of second composite images captured by the image capture system corresponding to the first set of angles subsequent to the first composite image being captured by the image capture system. The plurality of second composite images can be arranged in chronological order. The server can sequentially present in the chronological order respective first portions of the plurality of second composite images subsequent to presenting the first portion of the first composite image.

The server can present the composite image corresponding to the range of angles from zero to 360 degrees about the axis of rotation of the image capture system and captured by the image capture system during a first time period. The server can present a second composite image corresponding to the range of angles from zero to 360 degrees about the axis of rotation of the image capture system and captured by the image capture system during a second time period, the second time period following the first time period.

The server can identify a first sequence of composite images. Each composite image of the first sequence captured by the image capture system can be based on a first time interval. The server can receive a selection of a viewing setting that can correspond to a time duration and determine a subset of the first sequence of composite images. Each composite image of the subset can be selected based on a second time interval. The second time interval greater than the first time interval and computed based on the time duration. The server can sequentially present for display, each composite image of the subset in chronological order.

The server can receive a request to mark an incident at a first position within the composite image and provide an indicator identifying the first position. The server can determine, based on the first position and a stored association between the composite image and the range of angles, an angle of interest of the range of angles corresponding to the first position. The server can present, for display, a map showing the map indicator identifying a geographical region based on the angle of interest corresponding to the first position.

The server can identify, on a first composite image captured by the first image capture system, a first position within the first composite image corresponding to an incident. The server can determine a first angle of interest based on the first position. The server can identify, on a second composite image captured by the second image capture system, a second position within the second composite image corresponding to the incident. The server can determine a second angle of interest based on the second position. The server can present, for display, on a map: (i) a first map indicator based on the first angle of interest and a geographic location of the first image capture system, (ii) a second map indicator based on the second angle of interest and a second geographic location of the second image capture system, and (iii) a third map indicator identifying a location of the incident at a region where the first map indicator intersects the second map indicator.

The server can receive a request to triangulate a location of the incident using one or more second composite images captured from a second image capture system at a second geographic location. The server can identify the location of the incident determined based on an angle of interest of the range of angles corresponding to the location of the incident. The server can display, on the map, the location of the fire and the map indicator indicating an intersection of the first map indicator and the second map indicator.

Figure 13:
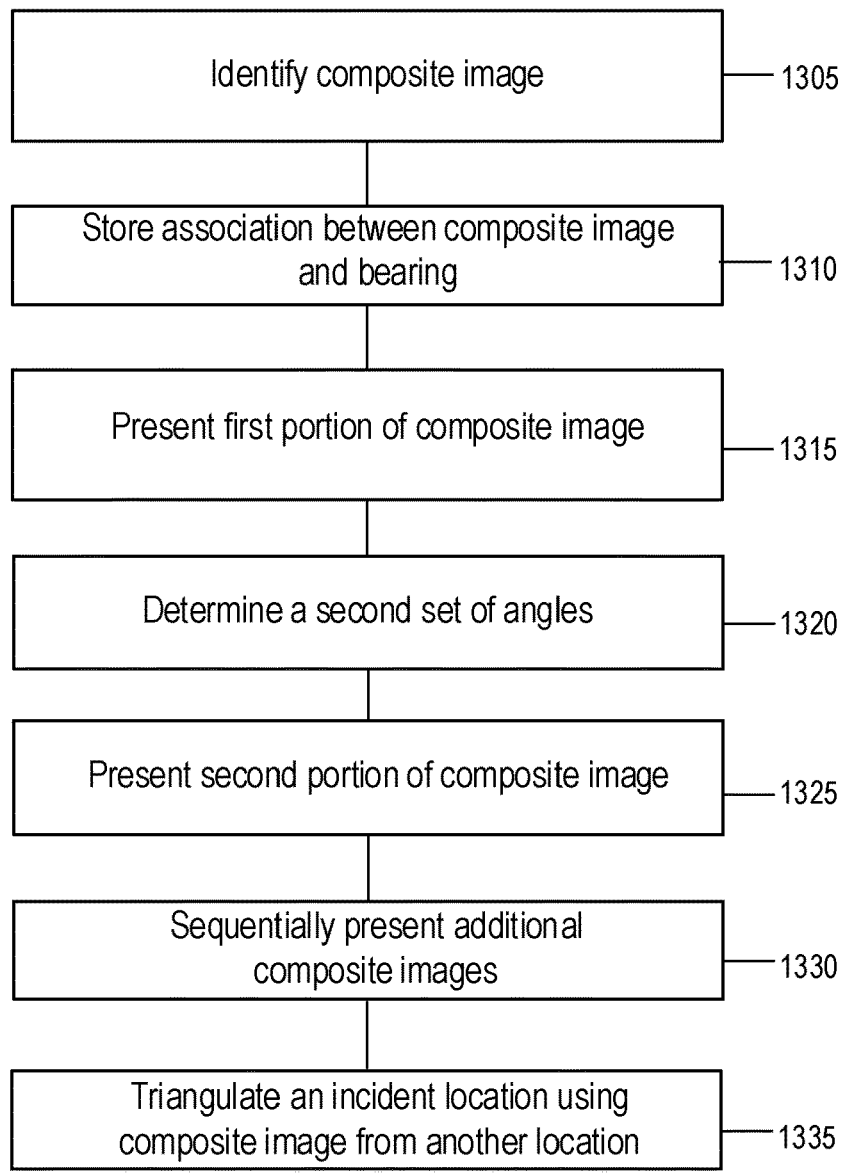
FIG. 13 is an example of a flow diagram illustrating an example method for providing angular an view indications based on displayed images in accordance with the system features of the present disclosure

FIG. 13 illustrates a method 1300 for utilizing a system 800 to generate and display composite images generated by constituent images generated about an image capture system. Method 1300 can include acts 1305 to 1335. At act 1305, a composite image is identified. At act 1310, an association between composite image and bearing is stored. At act 1315, the first portion of composite image is presented. At act 1320 a second set of angles is determined. At act 1325, a second portion of composite image is presented. At act 1330, additional composite images are sequentially presented. At act 1335, an incident location is triangulated using composite image from another location.

At act 1305, a composite image is identified. A client device can identify a composite image corresponding to a range of angles about an axis of rotation of an image capture system. The composite image can include a panoramic image corresponding to a range of at least 180 degrees about an axis of an image capture system. The composite image can include a panoramic image corresponding to a range of 360 degrees about the axis of the image capture system.

At act 1310, an association between composite image and bearing is stored. The client device can store, in one or more data structures, an association between the composite image and a bearing indicator. The bearing indicator can indicate the range of angles along a width of the composite image. Each respective angle of the range of angles corresponding to a respective portion of the width of the composite image.

At act 1315, the first portion of composite image is presented. The client device can present, on a display, a first portion of the composite image. The first portion of the composite image can correspond to a first set of angles of the range of angles. The client device can present a first portion of the bearing indicator including the first set of angles. The client device can present at least one of a first compass indicator indicating, on a compass, the first set of angles relative to the range of angles, or a first map indicator indicating a first geographic region on a map, the first geographic region corresponding to the first set of angles and a location of the image capture system.

At act 1320 a second set of angles is determined. The client device can determine, responsive to a user action that causes a second portion of the composite image to be displayed, a second set of angles of the range of angles corresponding to the second portion of the composite image.

At act 1325, a second portion of composite image is presented. The client device can present, on the display, responsive to determining the second range of angles, a second portion of the composite image corresponding to the second range of angles. The client device can present a second portion of the bearing indicator including the second set of angles. The client device can present at least one of a second compass indicator, on the compass, indicating the second set of angles relative to the range of angles, the second compass indicator generated based on the second set of angles, or a second map indicator indicating a second geographic region on the map, the second geographic region corresponding to the second set of angles and the location of the image capture system.

At act 1330, additional composite images are sequentially presented. The client device can identify a first sequence of composite images. Each composite image of the first sequence can be captured by the image capture system based on a first time interval. The client device can receive a selection of a viewing setting corresponding to a time duration and determine a subset of the first sequence of composite images. Each composite image of the subset can be selected based on a second time interval. The second time interval can be greater than the first time interval and computed based on the time duration. The client device can sequentially present, for display, each composite image of the subset in chronological order.

At act 1335, an incident location is triangulated using composite image from another location. The client device can receive a request to mark an incident at a first position within the composite image and provide an indicator identifying the first position. The client device can determine, based on the first position and a stored association between the composite image and the range of angles, an angle of interest of the range of angles corresponding to the first position. The client device can present, for display, a map showing the map indicator identifying a geographical region based on the angle of interest corresponding to the first position. The client device can identify, on a first composite image captured by the first image capture system, a first position within the first composite image corresponding to an incident. The client device can determine a first angle of interest based on the first position. The client device can identify, on a second composite image captured by the second image capture system, a second position within the second composite image corresponding to the incident. The client device can determine a second angle of interest based on the second position. The client device can present, for display, on a map, a first map indicator based on the first angle of interest and a geographic location of the first image capture system, a second map indicator based on the second angle of interest and a second geographic location of the second image capture system, and a third map indicator identifying a location of the incident at a region where the first map indicator intersects the second map indicator.

The one or more processors can transmit to the client device, such as the computing system, each partial image of the first composite image and the respective first bearing indicator and each partial image of the second composite image and the respective second bearing indicator. The player can include an actionable object. When the actionable object is interacted with, it can cause the player to navigate between the first composite image derived from the first plurality of constituent images captured over the first time period and the second composite image derived from the second plurality of constituent images captured over the second time period. The player can be configured to include a pan function. Panning the first composite image of the player to display a first portion of the first composite image can correspond to a first set of angles and cause the player to display a portion of the second composite image corresponding to the first set of angles.

Figure 14:
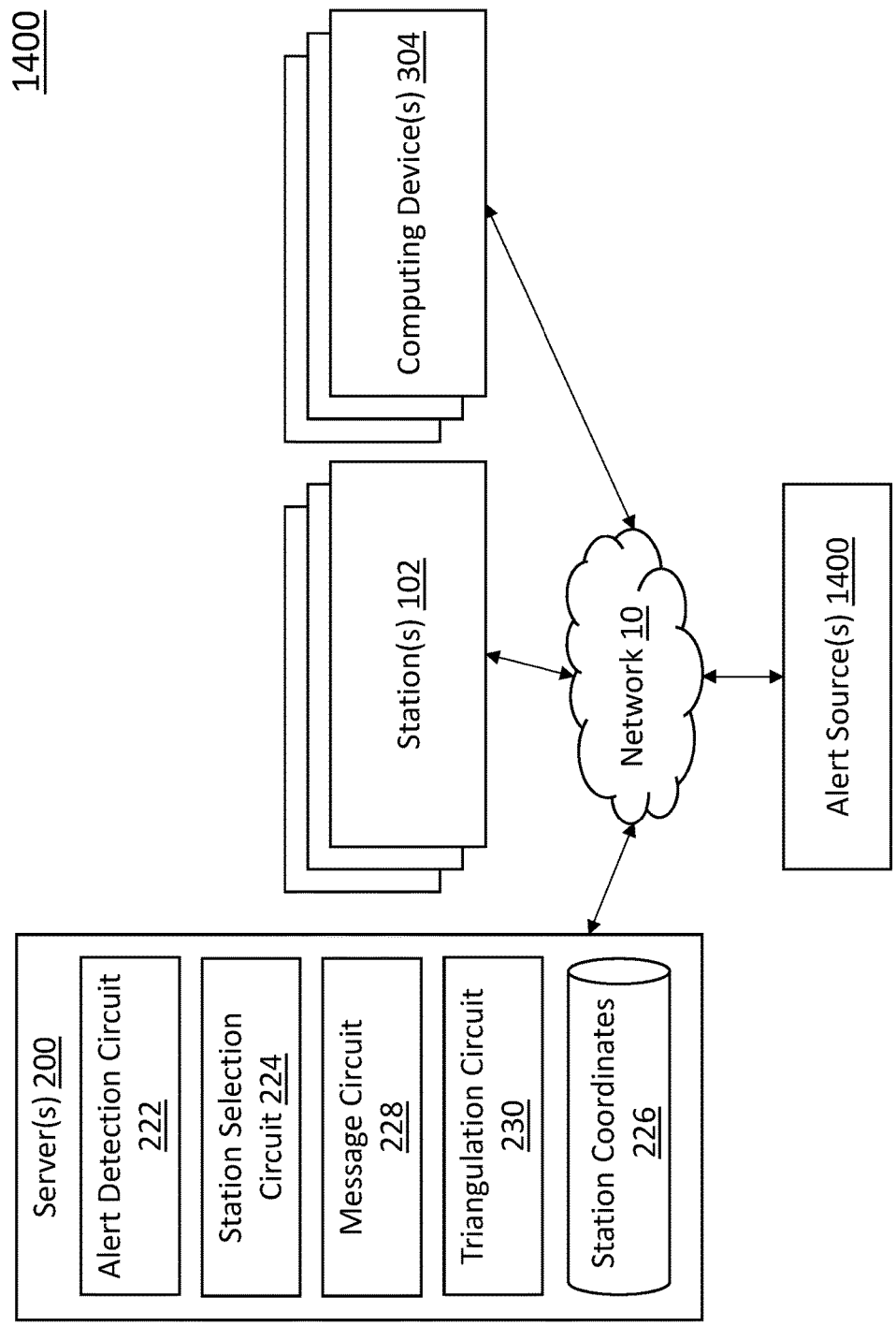
FIG. 14 is another example system for incident detection, according to an exemplary embodiment.

D. Triangulating a Location of an Incident Based on Images Captured from Different Image Capture Systems Referring now to FIG. 14, depicted is another example system 1400 for incident detection, according to an example embodiment. The system 1400 is shown to include the server(s) 200, station(s) 102, and computing device(s) 304 described above with reference to FIG. 1. In this regard, the system 1400 may include elements or features similar to those described above with reference to FIG. 1. As described in greater detail below, the server(s) 200 may be configured to detect, determine, identify, or otherwise determine coordinates associated with an incident. The server(s) 200 may include a triangulation circuit 230. The triangulation circuit 230 may be configured to determine coordinates for an incident based on indicators assigned to, provided for, or otherwise indicating a location of the incident in two or more images captured by image capture systems 114 at separate stations 102.

As shown in FIG. 14 and described in greater detail above in Section F, the server(s) 200 may be configured to maintain station coordinates for the stations 102 in one or more data structures 226. The server(s) 200 may be configured to maintain, in the data structure 226, for each station 102 of a plurality of stations 102, a respective set of geographic coordinates indicating a location of the station 102 at which one or more image capture systems 114 of the station 102 are configured to capture images. The server(s) 200 may be configured to use geographic coordinates indicating the location of the stations 102, along with bearings or other angles corresponding to indicators of the incident, to determine geographic coordinates for the incident, as described in greater detail below.

Figure 15B:
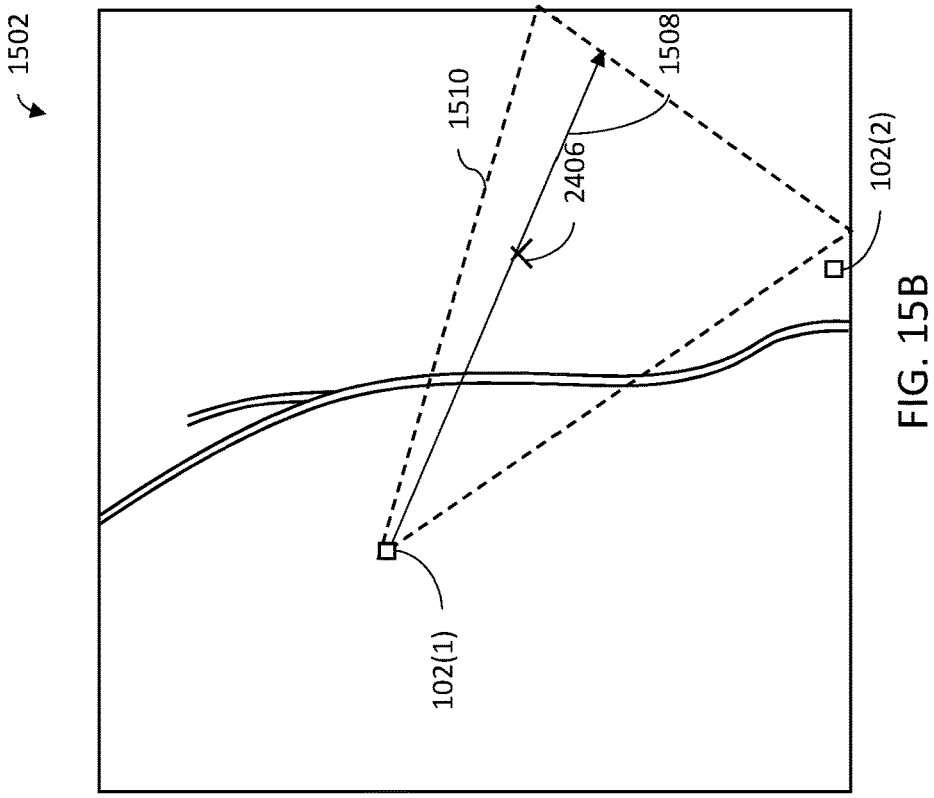
FIG. 15B is a view of a map including an observation region of the image shown in FIG. 15A, according to an exemplary embodiment.
Figure 15A:
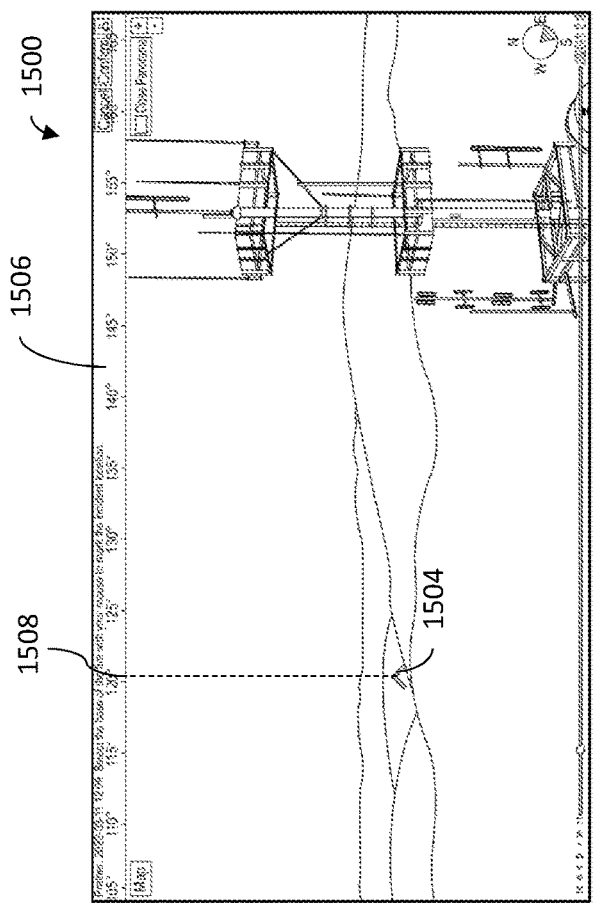
FIG. 15A show an image of an incident including an indicator, according to an exemplary embodiment.

Referring now to FIG. 14 and FIG. 15A and FIG. 15B, the triangulation circuit 230 may be configured to identify indicators of an incident in images obtained from an image capture system of a station. Specifically, FIG. 15A and FIG. 15B show an image 1500 of an incident including an indicator 1504, and a view of a map 1502 including an observation region, according to an exemplary embodiment. As described in greater detail below with reference to FIG. 16, the triangulation circuit 230 may be configured to determine an angle corresponding to the indicator 1504, and use the angle and coordinates of the station 102 at which the image capture system 114 that captured the image 1502 is located, for determining geographic coordinates associated with the incident.

In some embodiments, the triangulation circuit 230 may be configured to determine, detect, locate, or otherwise identify an indicator 1504 from an image 1502 captured via an image capture system 114 at a station 102. The indicator 1504 may be or include an identifier, a callout, or some other user interface element which denotes, identifies, or otherwise indicates a location of an incident. In some embodiments, the triangulation circuit 230 may be configured to receive the image including the identifier form a computing device 304. For example, an operator or user of the computing device 304 may be configured to select a button, drag their cursor, or otherwise manually apply the indicator 1504 at a location corresponding to the incident within the image 1502. In some embodiments, the and as described in greater detail above with reference to Section 5, the server(s) 200 may be configured to detect the incident at a location depicted in the image, and generate an indicator corresponding to the location of the incident in the images. In various embodiments, the image may include an indicator which is located at an angle relative to a reference direction within the image, where the location corresponds to the incident in the environment represented in the image.

The triangulation circuit 230 may be configured to identify the indicator within the image. In some embodiments, the indicator may be or include metadata which indicates its presence and location within the image. The triangulation circuit 230 may be configured to identify the indicator 1504 using the metadata from the image. In this regard, the presence of the indicator may be included in the metadata, such that when the server(s) 200 receive the image 1502, the triangulation circuit 230 determines that the indicator is present in the image 1502.

Figure 16:
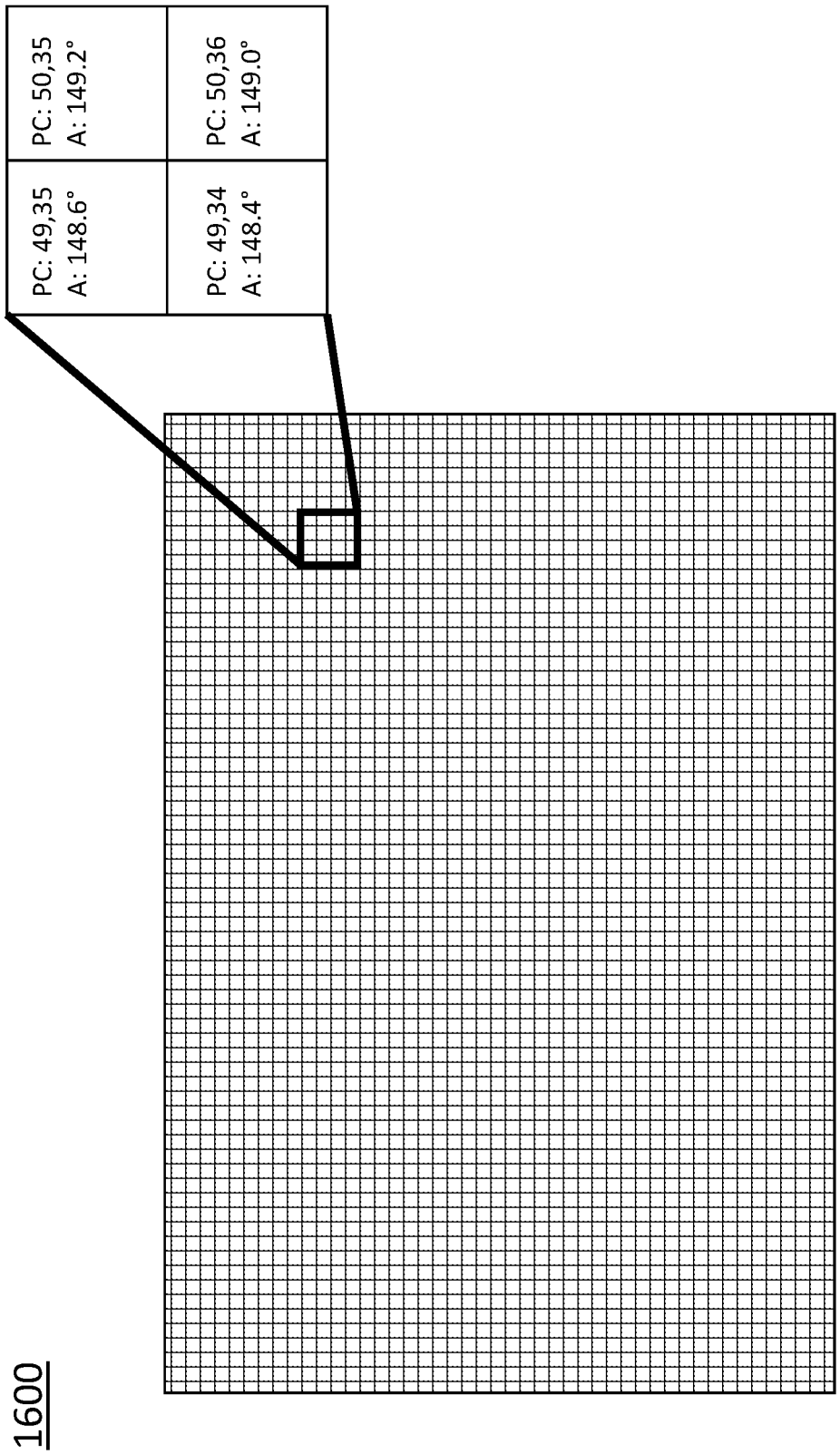
FIG. 16 shows a pixel map including pixel coordinates and associated angles, according to an exemplary embodiment.

Referring now to FIG. 14 and FIG. 16, the triangulation circuit 230 may be configured to determine the angle corresponding to the indicator. Specifically, FIG. 16 shows a pixel map 1600 including pixel coordinates and associated angles, according to an exemplary embodiment. As noted above, the angles determined for an indicator may be defined or determined with reference to a reference direction, such as True North, or some other reference direction. The triangulation circuit 230 may be configured to determine the angle based on pixel coordinates which correspond to the indicator. As noted above, the metadata may include a location of the indicator within the image. In some embodiments, the location may be or include pixel coordinates. The pixel coordinates may be or include coordinates (e.g., X-Y coordinates) of a point or pixel within an image which is selected or otherwise determined to identify an incident. In some embodiments, the coordinates may be or include coordinates of a pixel which is automatically (or manually) selected that identifies or denotes an incident which is shown in the image. The triangulation circuit 230 may be configured to receive a selection of the pixel (e.g., from the computing device 304, from the server 200 responsive to automatic detection of the incident as described above in Section E, etc.).

As shown in FIG. 16, the triangulation circuit 230 may be configured to maintain, include, or otherwise access a pixel map 1600. The pixel map 1600 may be or include data which represents an association of various pixel locations (e.g., pixel coordinates, or "PC" in FIG. 16) and corresponding angles (or "A" in FIG. 16). The triangulation circuit 230 may be configured to maintain, include, or otherwise access the pixel map 1600 in one or more data structures. The triangulation circuit 230 may be configured to determine the angle which corresponds to a selected pixel from the image based on the pixel map 1600. For example, the triangulation circuit 230 may be configured to cross-reference pixel coordinates for a pixel which corresponds to the indicator with the pixel map 1600 to determine the corresponding angle. The triangulation circuit 230 may be configured to map the image to the pixel map 1602 (e.g., by assigning pixels located at corners of the image to corresponding pixels in the pixel map 1602 based on the viewing region for the image and following calibration of the image capture system at the station 102). Following mapping the image to the pixel map 1602, the triangulation circuit 230 may be configured to identify the pixel from the pixel map 1602 which corresponds to the pixel that corresponds to the indicator.

In some embodiments, and as shown in FIG. 15B, the image 1502 may include bearing information 1506 which shows a bearing angle (or bearing range of angles) in which images captured by the image capture system 114 represent the environment outside of the station 102. The bearing angles may correspond to a viewing region of the images. For example, if the viewing region is centered at due East, and the viewing region spans 40°, the bearing range of angles may be between 70° (e.g., due East [or 90°]−20°) and 110° (e.g., due East+20°). The triangulation circuit 230 may be configured to determine the angle corresponding to the indicator based on the bearing range of angles for the image, and the location of the indicator 1504 relative to the bearing range of angles. The triangulation circuit 230 may be configure to determine the angle by locating the bearing of the bearing range of angles on or along which a center of the indicator is located. As shown in FIG. 15B, the indicator 1504 may be located on bearing 121° relative to the reference direction. Assuming the reference direction is North, the indicator 1504 may be located at approximately East-Southeast.

Referring now to FIG. 17A and FIG. 17B, the triangulation circuit 230 may be configured to identify an indicator and determine an angle relative to a reference direction for a second image. FIG. 17A and FIG. 17B show a view of another map 1700 including an observation region, and another image 1702 of the incident shown in FIG. 15A-15B including an indicator 1704, according to an exemplary embodiment. The triangulation circuit 230 may be configured to identify the indicator in a manner similar to identifying the indicator described above with reference to FIG. 15A and FIG. 15B. Specifically, and in some embodiments, the triangulation circuit 230 may receive a manual selection of the indicator (e.g., from a user), and/or automatically determine the location of the indicator.

In some embodiments, the triangulation circuit 230 may be configured to automatically select the station 102 from which the incident may be viewed responsive to identifying the indicator and angle for the first image. For example, a user operating a computing device 304 may first select a location of the indicator on the first image (e.g., shown in FIG. 25A), and select a user interface element to request to triangulate the location of the indicator on the first image. The triangulation circuit 230 may be configured to select a second station 102(2) based on coordinates for the second station 102(2) (e.g., in a manner similar to selection of a station described above with reference to Section F) relative to the first station 102(1). For example, the triangulation circuit 230 may be configured to select the second station 102(2) based on the coordinates satisfying a selection criteria (e.g., based on the coordinates being closest to or being within a predetermined distance from the first station 102(1), based on the second station 102(2) having a field-of-view which may include the incident, etc.).

The triangulation circuit 230 may be configured to determine a range of angles about an axis of rotation for an image capture system 114 of the second station 102(2). The triangulation circuit 230 may be configured to determine the range of angles based on the angle corresponding to the indicator in the first image 2502, coordinates for the first station 102(1), coordinates for the second station 102(2), and the reference direction corresponding to the stations 102. For example, assuming the first station 102(1) is located due West from the incident (and correspondingly, the first angle is 90° from the reference angle, North) and the second station 102(2) is located South of the incident, the triangulation circuit 230 may be configured to determine a range of angles which encompasses North. In this example, the range of angles may be or include 20° (e.g., from North), and 340° (e.g., from North). In some embodiments, the triangulation circuit 230 may be configured to generate the indicator in the second image (e.g., which includes or depicts the environment from the perspective of the range of angles) (as described above with reference to Section E. In some embodiments, the triangulation circuit 230 may be configured to trigger displaying of the image (such as the image shown in FIG. 17A) at the computing device 304. In this example, the triangulation circuit 230 may be configured to receive the selection of the indicator from the computing device 304. The triangulation circuit 230 may be configured to determine the angle corresponding to the indicator in a manner similar to the determination described above with reference to FIG. 0.15A and FIG. 15B.

It is noted that, while described as the triangulation circuit 230 using indicators from two images obtained from image capture systems 114 of two different stations 102, it is noted that any number of indicators/images/stations may be used for determining the coordinates. For example, the triangulation circuit 230 may obtain a third image captured from an image capture system 114 at a third station (such as station 102(3) shown in FIG. 24), identify an indicator in the third image, and determine a third angle (in a manner similar to identifying the indicator and determining the angle described above with reference to the first and second angles in the first and second images, respectively). Such implementations and embodiments may provide more accurate coordinate determination results (particularly where the server(s) 200 compute coordinates for each of the stations which are located within a distance threshold from each other or from the incident), with an added cost of increased complexity for computing the coordinates (e.g., by averaging coordinate results or by computing a probability or other score associated with the respective coordinates to determine which is more likely to be accurate). Additionally, by relying on additional images captured from separate image capture systems at different stations, the computed coordinates may be more reliable in the event of camera malfunction, field-of-view blocking, inclement weather, sun angle, etc. For example, prior to computing coordinates based on an image, the server may be configured to analyze the image to determine whether any conditions in the image are present which would indicate an unreliable image (e.g., a sunspot which indicates potential sun angle obstructions, cloud-cover or rain which indicates inclement weather and potential poor viewing conditions, any foreign objects which moved into the field-of-view from a previous image which may indicate potential obstructions). The server may be configured to assign a weighted score to the image based on the detected conditions within the image. The server may discard images having a score which falls below a threshold. However, where the image is relied upon for computing coordinates, coordinates computed using images having higher relative scores (e.g., indicating clear conditions) may be weighted more than coordinates computed using images having lower scores. Such implementations may provide more accurate and reliable coordinate computation.

Figure 18:
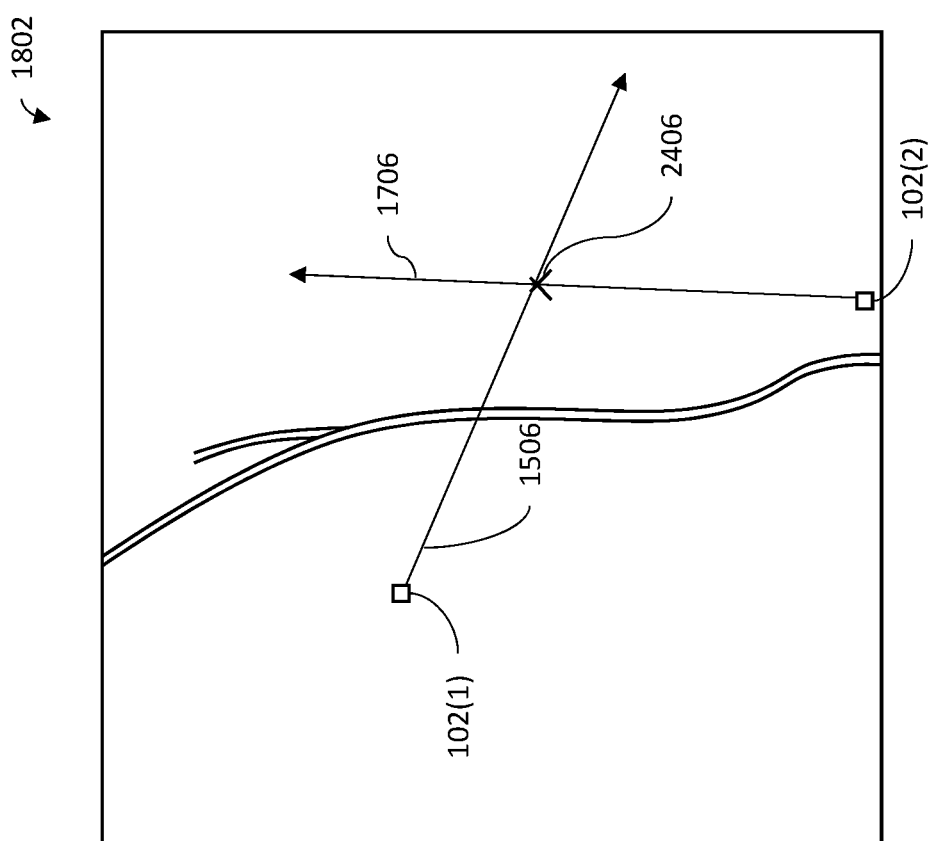
FIG. 18 shows an example map depicting angles from stations shown in FIG. 15A, FIG. 15B, FIG. 17A, and FIG. 17B used for determining coordinates corresponding to the incident, according to an exemplary embodiment.

Referring now to FIG. 14 and FIG. 18, the triangulation circuit 230 may be configured to determine coordinates corresponding to the incident 2406. Specifically, FIG. 18 shows an example map depicting angles 1508, 1708 from the stations 102(1), 102(2) used for determining coordinates corresponding to the incident 2406, according to an exemplary embodiment. The triangulation circuit 230 may be configured to determine the coordinates for the incident 2406 based on the angles 1508, 1708 and coordinates corresponding to the stations 102(1), 102(2). In some embodiments, the triangulation circuit 230 may be configured to define lines extending along the angles 1508, 1708 from the stations 102(1), 102(2). The triangulation circuit 230 may be configured to determine the coordinates corresponding to the incident 2406 based on the intersection between the lines (e.g., which would be located at the location of the incident 2406) and coordinates for at least one of the stations 102. For example, the triangulation circuit 230 may be configured to determine a longitudinal and latitudinal offset of the intersection of the lines from the coordinates of the station 102, and determine coordinates for the incident 2406 by applying the longitudinal and latitudinal offset to the coordinates of the station 102. In some embodiments, the triangulation circuit 230 may be configured to determine the longitudinal and latitudinal offset by determining the distance (e.g., straight-line distance) from the intersection to the station 102, and the angle determined for the incident at the station 102. In this example, the triangulation circuit 230 may be configured to compute (e.g., based on a trigonometric between the angle and the distance) the longitudinal and latitudinal offset. As another example, the triangulation circuit 230 may be configured to determine the longitudinal and latitudinal offset by determining or measuring a distance shift between the location of the intersection and the location in which the intersection is aligned with the station 102 (e.g., in the East-West direction for latitudinal offset and in the North-South direction for the longitudinal offset). The triangulation circuit 230 may be configured to apply the longitudinal and latitudinal offset to the coordinates of the station to determine coordinates for the incident 2406 (which is located at the intersection).

Referring back to FIG. 14, and in some embodiments, the server(s) 200 may be configured to generate an output which corresponds to the coordinates for the incident 2406. For example, the message circuit 228 may be configured to generate (and transmit) an alert including data corresponding to the coordinates for the incident 2406 to a remote computing device 304. The alert may include, for example, coordinates (e.g., latitude and longitude) for the incident that were determined based on the indicators 1504, 1704 and corresponding angles 1508, 1708. The alert may include images, or a link for viewing images, of the incident. In some embodiments, the images which are viewed on the computing device 304 may be sent to the computing device 304 as described below in Section G. The alert may include additional information relating to the incident (e.g., incident type, such as brush or grass fire, house/residential fire, or other types of incidents, start time/estimated start time, status, etc.).

In some embodiments, responsive to the user selecting a link on the alert to view the images, the computing device 304 may render a user interface (such as one of the user interfaces depicted above in Section C). The user interface may include panes or panels for viewing the images (or time-lapse series of images) which shows or depicts the incident (e.g., the images show a portion that includes respective indicators of the incident), toggle switch or other user interface elements for switching between viewing images from the first and/or second station 102(1), 102(2), a map which includes an incident marker (similar to maps shown in FIG. 15B and FIG. 17B) and angular paths corresponding to the angles 1508, 1708, and a field of view 1510, 1710 of the images from the station 102. In some embodiments, the map may show both angular paths corresponding to the angles 1508, 1708 and fields of views 1510, 1710 from both stations 102(1), 102(2), (e.g., the map may be a composite of both maps 1502, 1702 from FIG. 15B and FIG. 17B).

Figure 19:
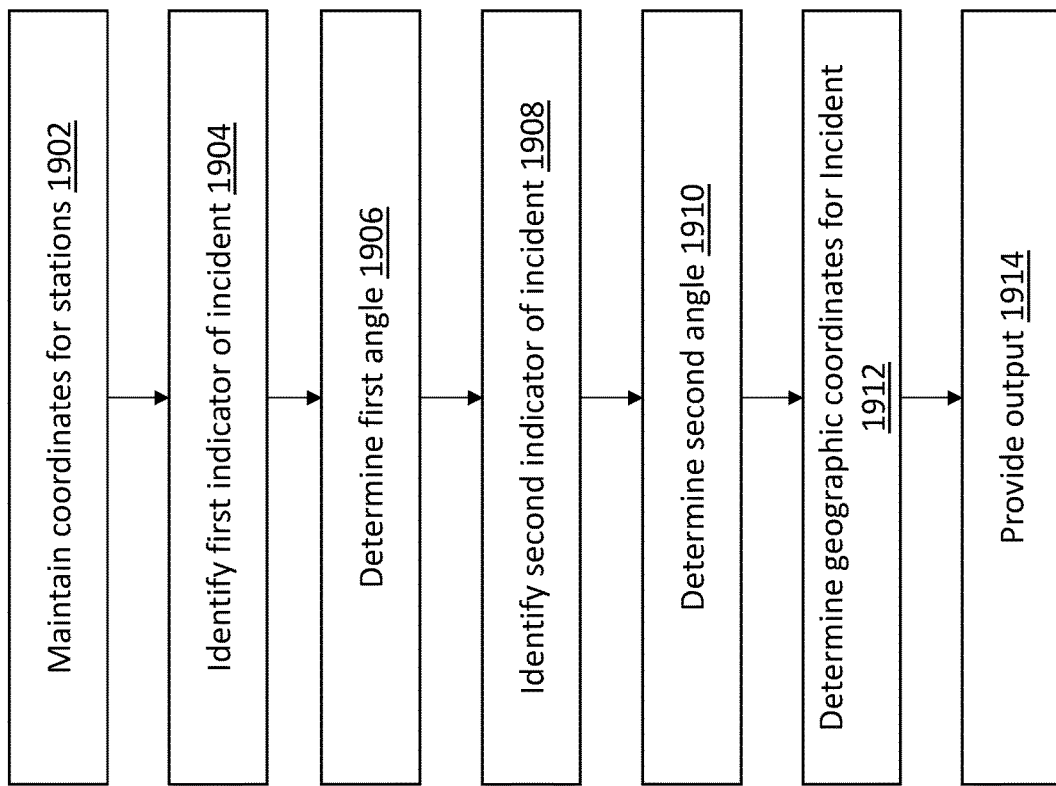
FIG. 19 is a flowchart showing a method of triangulating a location of an incident, according to an exemplary embodiment.

Referring now to FIG. 19, depicted is a flowchart showing a method 1900 of triangulating a location of an incident, according to an exemplary embodiment. The method 1900 may be performed by one or more of the components described above with reference to FIG. 1A-FIG. 31. As a brief overview, the method 1900 may include maintaining coordinates for stations (step 1902), identifying a first indicator of an incident (step 1904), determining a first angle (step 1906), identifying a second indicator of the incident (step 1908), determining a second angle (step 1910), determining geographic coordinates for the incident (step 1912), and providing an output (step 1914).

At step 1902, a server may maintain coordinates for stations. In some embodiments, one or more processors of the server(s) may maintain coordinates for the stations. More specifically, the server(s) may maintain geographic coordinates for each of a plurality of stations, where the coordinates indicate a location of the station at which one or more image capture systems of the station are configured to capture images. In some embodiments, the server(s) may maintain the coordinates in one or more databases, tables, or other data structures. As new image capture systems are deployed in the environment at new stations (and the image capture systems are calibrated as described above in Section A), the server(s) may update the data structures to include coordinates for the new image capture system(s) of the new stations. Similarly, as image capture systems are taken out of commission, the server(s) may update the data structures to remove coordinates for the stations corresponding to the decommissioned image capture systems.

At step 1904, the server may identify a first indicator of an incident. In some embodiments, the server may identify a first indicator of an incident at a geolocation of the first incident. The server may identify the first indicator in an image obtained from a first image capture system of a first station at a first set of geographic coordinates. The first indicator may correspond to first pixel coordinates within the first image. The first image may correspond to a first range of angles (e.g., relative to a first reference direction) about a first axis of rotation of the first image capture system. In some embodiments, the server may identify the first indicator by receiving a selection of the indicator from a user (e.g., controlling a computing device, such as computing device 304). For example, a user may drag and drop (e.g., on a user interface displaying the first image) an indicator at a location of an incident in (e.g., depicted in) the image. In some embodiments, the server may automatically detect the location of the incident within the image, and generate the indicator in the image. The server may detect the location of the incident and generate the indicator as described above in Section E. As described in greater detail below with reference to FIG. 20, the server may identify coordinates (e.g., pixel coordinates within the image) which correspond to the indicator.

At step 1906, the server may determine a first angle. In some embodiments, the server may determine a first angle of the first range of angles corresponding to the first pixel coordinates for the first indicator. The server may determine the first angle using a data structure maintaining associations between pixel coordinates of pixels within a given image and angles associated with respective pixels. The server may determine the first angle using the method 2000 described below with reference to FIG. 20.

In some embodiments, the server may receive a request to triangulate (e.g., the geographic coordinates of the incident) responsive to identifying the first indicator. For example, a user operating a computing device 304 may select a user interface element (e.g., to triangulate an incident) on which the first image is displayed and after the user selected the location of the first indicator. The server may receive the request responsive to the user selecting the user interface element. The server may select a second station from the plurality stations based on the second set of geographic coordinates for the second station satisfying a selection criteria. In some embodiments, the server may select the second station responsive to receiving the request to triangulate. The server may select the second station based on coordinates of the second station relative to coordinates of the first station (from which the first image was captured). The server may select the second station based on a proximity of the coordinates for the first station relative to the coordinates for the second station. The server may select the second station from the plurality of stations based on the proximity of the second station from the first station relative to other stations of the plurality of stations. For example, the selection criteria may be or include a closest proximity criteria, such that the server selects the second station responsive to the second station being closest (e.g., from other stations) to the first station.

In some embodiments, the selection criteria may include additional parameters, including a line-of-sight from the second station towards the incident. For example, the server(s) may maintain data corresponding to a line-of-sight (or obstructions/impediments along various angles) for each of the image capture systems at various stations. The server(s) may select the second station based on the proximity data and/or line-of-sight data, indicating that images captured from an image capture system at the second station would represent (e.g., with an unobstructed view) a geographic area of interest including the incident. The server(s) may use the second range of angles determined for the second station described below to cross-reference the range of angles with the line-of-sight data maintained by the server(s) to determine whether any obstructions reside along the angles such that the incident may not be viewable in images captured at the second station. Should the line-of-sight data for the second station indicate an obstruction, the server(s) may select the next nearest station.

The server(s) may determine a second range of angles about an axis of rotation of the second image capture system based on the first angle corresponding to the first indicator, the second set of geographic coordinates, and the first reference direction. The server(s) may determine the second range of angles based on the coordinates for the second station relative to the first station and the first angle. For example, since angles for the stations may be defined relative to common reference direction, the server(s) may determine the second range of angles based on the coordinates of both stations and the first angle. As a brief example, assuming the first station is due North from an incident and the second station is due West from the incident, the server(s) may determine the second range of angles (e.g., as 60°-120°, for example) using the first and second coordinates for the stations and the angle from the first station (e.g., 180° relative to North).

In some embodiments, the server(s) may generate a second indicator in the second image at a second angle of the second range of angles corresponding to the incident. The server(s) may generate the second indicator automatically (e.g., as described above with reference to Section E). In some embodiments, the server(s) may generate the second indicator in the second image responsive to a user selecting a user interface element to triangulate (e.g., as described above), responsive to a user manually dragging and dropping (or otherwise selecting a location) of the second indicator on the image, etc.

At step 1908, the server may identify a second indicator of the incident. In some embodiments, the server may identify the second indicator of the incident in a second image obtained from a second image capture system of a second station at a second set of geographic coordinates. The second indicator may be of the same incident corresponding to the first indicator (e.g., identified at step 1904). Similar to the first indicator, the second indicator may correspond to second pixel coordinates within the second image. The second image may correspond to a second range of angles (e.g., relative to a second reference direction) about a second axis of rotation of the second image capture system. Step 1908 may be similar to step 1904 described above. At step 1910, the server may determine a second angle. The server may determine the second angle of the second range of angles corresponding to the second pixel coordinates for the second indicator, using the data structure. The server may determine the second angle in a manner similar to determining the first angle described above with reference to step 1906. In other words, the server may repeat steps 1904-1906 for the second indicator in the second image (and for any other indicators of the incident identified in further images).

At step 1912, the server may determine geographic coordinates for the incident. In some embodiments, the server may determine a third set of geographic coordinates for the first geolocation associated with the incident based on the first set of geographic coordinates, the first angle, the second set of geographic coordinates, and the second angle. In some embodiments, such as where the server identifies indicators for multiple images (e.g., three or more), the server may determine whether coordinates for the incident from two images are within a predetermined threshold of coordinates for the incident determined from a third image (and forth image). Where the coordinates are not within a predetermined threshold, and in some embodiments, the server may discard, ignore, or otherwise disregard the coordinates determined from or using the third image. Additionally or alternatively, where the coordinates determined from the third image are different from the coordinates determined from the first and second image, the server may compute an average, mean, or other composite coordinates based on both sets of coordinates. Additionally or alternatively, where the coordinates determined from the third image are different from the coordinates from the first and second image, the server may compute a confidence score for the coordinates (e.g., based on or using a machine learning model trained to compute confidence scores using images, angles, and coordinates as an input). The server may select coordinates based on the confidence scores (e.g., coordinates for the incident which have the highest confidence score).

The server may determine the coordinates for the incident based on an intersection of a first line extending away from the first set of geographic coordinates along the first angle and a second line extending away from the second set of geographic coordinates along the second angle. The server may determine the coordinates for the incident based on coordinates of one of (or at least one of) the station and the relative location of the intersection. For example, the server may determine the coordinates for the incident by applying a latitudinal/longitudinal offset to coordinates of a respective station. The server may determine the latitudinal/longitudinal offset using, for example, the angle from the station and a straight-line distance of the intersection to the station. As another example, the server may determine the latitudinal/longitudinal offset by projecting the intersection in in the X-Y direction to the station (e.g., to be latitudinally/longitudinally aligned with the station), and determining the distance of the projection. The server may apply the offset to the coordinates of the station to determine coordinates of the intersection (and, correspondingly, coordinates for the incident).

At step 1914, the server may provide an output. In some embodiments, the server may provide an output which indicates the third set of geographic coordinates. The server may provide an output to the computing device (such as a computing device corresponding to a fire department, police department, etc.). The output may include a link to view images of the incident (or the output may include images of the incident), the coordinates of the incident, a status of the incident, etc.

Figure 20:
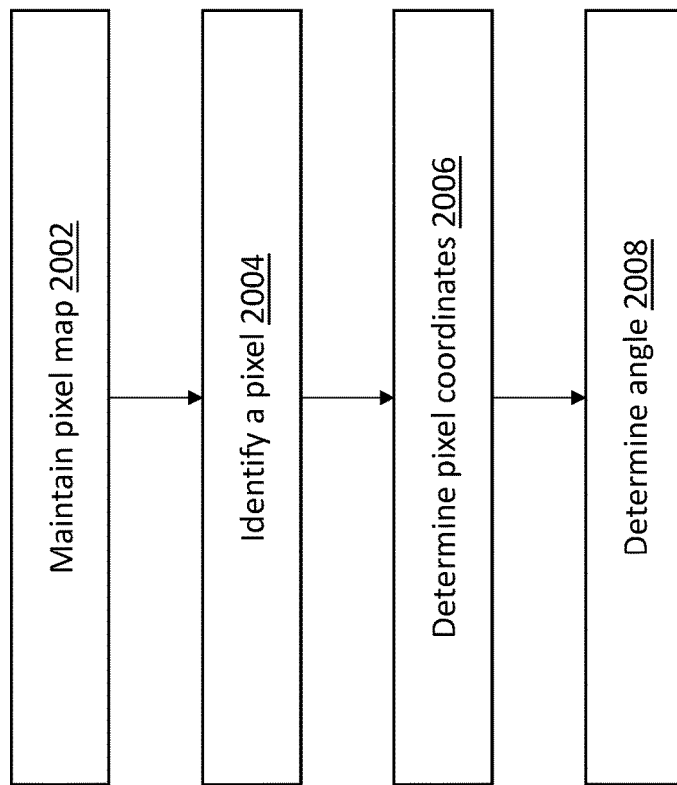
FIG. 20 is a flowchart showing a method of determining angles corresponding to pixel coordinates, according to an exemplary embodiment.

Referring now to FIG. 20, depicted is a flowchart showing a method 2000 of determining angles corresponding to pixel coordinates, according to an exemplary embodiment. In some embodiments, the method 2000 may include maintaining a pixel map in a data structure (step 2002), identifying a pixel corresponding to an indicator (step 2004), determining pixel coordinates (step 2006), and determining an angle using the pixel coordinates (step 2008).

At step 2002, the server may maintain a pixel map in a data structure. The pixel map may be similar to the pixel map shown in FIG. 16 described above. The server may maintain the pixel map for each image capture system. In some embodiments, the server may maintain a specific pixel map for a respective image capture system. In other words, the server may maintain a unique pixel map which is specific to a respective image capture system. In some embodiments, the server may maintain a generic pixel map for each respective image capture system. In other words, the pixel maps may be generic to all image capture systems. The pixel map may include data corresponding to pixel coordinates and associated angles. While referred to as a pixel map, it is noted that the pixel coordinates and angles may be associated in any structured data format (such as a look-up table).

At step 2004, the server may identify a pixel corresponding to an indicator. The pixel may be the pixel which is selected or otherwise identified by the indicator. For example, the pixel may be a pixel at which the indicator terminates (e.g., an end or point of the indicator). The server may identify the pixel responsive to receiving the selection of the indicator or otherwise generating the indicator.

At step 2006, the server may determine pixel coordinates. The server may determine the pixel coordinates which correspond to the pixel identified at step 2004. In some embodiments, the server may determine the pixel coordinates using metadata for the indicator (e.g., which indicates the pixel coordinates which correspond to the indicator). In some embodiments, the server may determine the pixel coordinates by determining an offset from a corner or defined pixel for the image relative to the pixel identified at step 2004.

At step 2008, the server may determine an angle using the pixel coordinates. The server may determine the first angle by cross-referencing the pixel coordinates for the indicator (e.g., identified at step 2006) with the pixel coordinates included in the data structure to identify the pixel coordinates from the data structure which match the pixel coordinates for the indicator. The server may determine the first angle by identifying the angle which is associated with matched pixel coordinates from the data structure.

E. Using Machine Learning Models for Generating Image Labels and Detecting Incidents As discussed herein, images captured by the various stations 102, and data associated with the images, may be provided to the server 200 for image processing. For example, the server 200 may include an image processing circuit 206 configured to receive the images, maintain a database of the images (e.g., the incident database 220), and provide one or more images and data associated with the image to the incident detection circuit 210 for incident detection. According to various embodiments, the incident detection circuit 210 includes one or more machine learning model trained to detect incidents within images.

Figure 21:
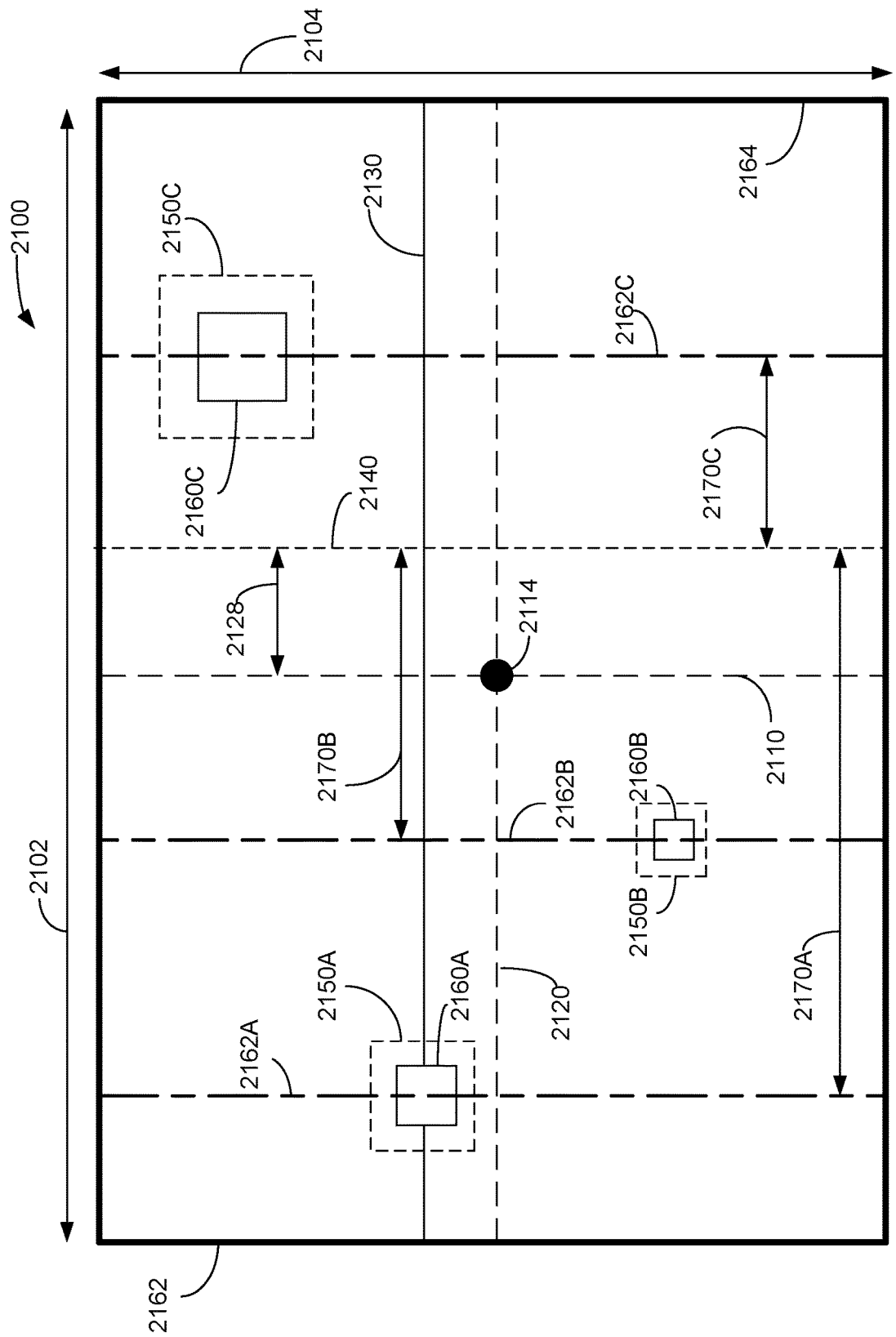
FIG. 21 is a schematic illustration of an image, according to an example embodiment.

Referring now to FIG. 21, a schematic illustration of an image 2100 is shown, according to an example embodiment. The image 2100 may be provided or otherwise retrieved by the incident detection circuit 210 such the incident detection circuit 210 may determine whether one or more incidents are present in the image 2100. For example, the image may be provided to a machine learning model trained to detect incidents within the image 2100 and/or within a series of images including the image 2100.

As shown, the image 2100 is defined by a width 2102 and height 2104. Collectively, the width 2102 and the height 2104 define the field of view of the image capture device 124 used to capture the image 2100 while the image capture device 124 is in a fixed orientation (e.g., the device angle is fixed). As shown, the width 2102 extends from a first edge 2162 to a second edge 2164. According to various embodiments, the first edge 2162 may be correspond with a first angle and the second edge 2164 may correspond with a second angle, such that the horizontal field of view spans from the first angle to the second angle.

According to various embodiments, the image 2100 is a digital image including a plurality of pixels. In this example embodiment, the width 2102 and the height 2104 may be represented using a number of pixels (e.g., the number of pixels spanning the image 2100 in the horizontal direction and the vertical direction, respectively). Thus, a horizontal center 2110 and a vertical center 2120 may be determined (e.g., via the station computing device 104) based on the number of pixel spanning the image 2100 horizontally and vertically. The horizontal center 2110 and the vertical center 2120 intersect at a center 2114 of the image 2100.

According to various embodiments, one or more models may receive the image 2100. According to various example embodiments, the one or more models are machine learning models that include a Faster Region Convolution Network (R-CNN). The one or more models may be configured to identify one or more regions of interest 2150 in the image 2100. Each area of interest 2150 identified may include an incident 2160 (e.g., an object of interest). For example, the incident 2160 may be smoke or an area that resembles smoke (e.g., steam, cloud, dust, snow, etc.).

According to various embodiments, the image capture device 124 that captured the image 2100 has been calibrated (e.g., via the method 500) such that a reference direction 2140 and the corresponding second angle 2128 are known. In this sense, the station 102 that generated the image 2100 may generate data the represents the reference direction 2140 and the corresponding second angle 2128 and associate that data with the image 2100 such that a bearing of the incident relative to reference direction may be determined as is discussed further herein. For example, the server 200 may leverage the determined position of the region of interest 2150 within the image 2100 along with the angular orientation of the image capture device 124 (e.g., the device angle) relative to a determined reference direction 2140 to determine a bearing (e.g., a direction of interest) of the incident 2160 relative to the respective image capture system 124.

According to various embodiments, the model or models trained to detect an incident may be a Faster Region Convolution Network (R-CNN). For example, the Faster R-CNN model may include a ResNet50 Backbone. Generally speaking, the Faster R-CNN model is a deep convolutional network used for incident detection. The R-CNN model appears to the user as a single, end-to-end, unified network. First, a Region Process Network, which is a fully convolutional network, generates proposals with various scales and aspect ratios. Second, for all region proposals in the image, a fixed length feature vector is extracted from the region using a Region of Interest (ROI) (e.g., the region of interest 2150) pooling layer. Third, extracted feature vectors are then classified for object labels (e.g., labels, attributes, categories, etc.) and regressed for box coordinates (e.g., shown as the region of interest 2150A in the image 2100).

According to various embodiments, once a region of interest 2150 is identified, a corresponding bearing 2170 may be determined for the region of interest 2150 and/or the incident within the region of interest 2150. For example, the bearing may be determined by counting the number of pixels between the reference direction 2140 and the region of interest 2150 and that number of pixels may be converted to an angle (e.g., the bearing 2170). According to various embodiments, the reference direction 2140 may not be visible in the image 2100. In this example embodiment, the bearing 2170 may be determined based on a device angle and the number of pixels between the region of interest 2150 and the vertical center 2110, as is discussed further herein.

According to various embodiments, one or more angles (e.g., the bearing 2170) may be determined by estimating a number of pixels rather than determining an exact number of pixels between various points in the image 400. For example, the number of pixels extending in a direction (e.g., the number of pixels corresponding with the width 402) may be determined or estimated based on the type of hardware being used to capture the image 400. For example, the image resolution may be determined or inferred from the data specification sheet associated with the image capture device 124. According to various embodiments, estimating a number of pixels, rather than determining the exact number of pixels, may accelerate one or more processes described herein and/or increase the efficiency by reducing the amount of data transferred/processed. For example, rather than downloading the entire image 400 to determine a number of pixels in the horizontal 402 direction, the total number of pixels may be estimated or determined based on the specification data sheet associated with the image capture device 124. This number may then be used to estimate the first angle 424, the expected bearing 426, and/or the second bearing 428. For example, a partial image may be downloaded to determine the number of pixels between the horizontal center 410 and the object of interest 444 to determine the first angle 424.

Figure 22:
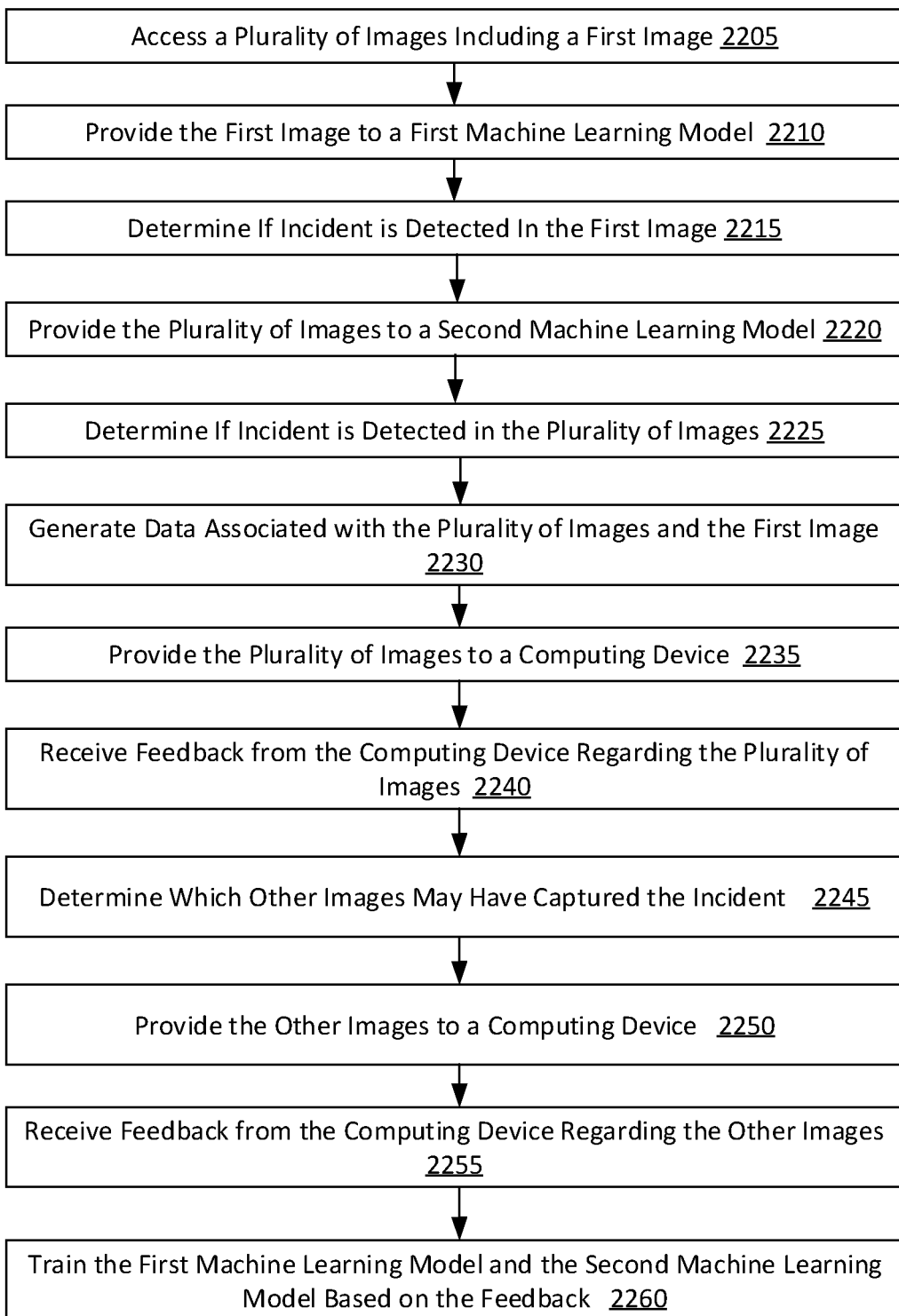
FIG. 22 is a flow chart of a method of detecting an incident in one or more images using one or more models, according to an example embodiment.

Referring now to FIG. 22, a flow chart of a method of detecting an incident in one or more images using one or more models 2200 is shown, according to an example embodiment. The method 2200 may be performed by one or more components of one or more of the systems described herein (e.g., the incident detection system 100). Additionally, various processes described herein may involve some or all of the method 2200. It should be appreciated that the method 2200 need not be performed in the order shown. Further, one or more of the shown steps/processes may be omitted. Furthermore, one or more steps/processes may be added to the method 2200.

At process 2205, a plurality of images, including a first image, are accessed. For example, the plurality of images may be accessed by the server 200 such that further processed and stored within the server 200. According to various embodiments, the plurality of images includes raw images and/or composite images. For example, the first image may be either a raw image or a composite image. Further, process 2205 may include accessing data associated with the plurality of images. For example, process 2205 may include accessing data indicative of the station the image where the image was captured, the time and date the image was captured, the angle of the image capture device at the time the image was captured, the conditions (e.g., weather, wind, sun direction, etc.) present at the time the image was captured, etc.

According to various embodiments, the plurality of images includes a sequence of images taken over a period of time. For example, the plurality of images may come from the same image capture device and each image may be captured sequentially at different times (e.g., separated by a time interval). According to various embodiments, the images time interval between each image is the same. For example, the plurality of images may be captured at predetermined intervals, such as 15 second intervals. However, according to other embodiments, the time interval between each image is different. According to various embodiments, the image capture device is orientated at the same device angle for each of the images in a sequence. However, according to other embodiments, the image capture device is orientated at a different device angle for two or more of the images in the sequence. According to various embodiments, the plurality of images are in chronological order when provided to the server 200 and/or when stored within the server 200. Alternatively, the server 200 may organize the plurality of images in chronological order based on one or more attributes associated with the plurality of images, as is discussed further herein.

At process 2210, the first image is provided to a first machine learning model. For example, the first image may be provided to a first machine learning model trained to detect incidents within images using a plurality of training images. According to various embodiments, the first machine learning model may be configured to detect an incident within the first image.

According to various embodiments, the first machine learning model is a Faster Region Convolution Network (R-CNN). For example, the Faster R-CNN model may include a ResNet50 Backbone. Generally speaking, the Faster R-CNN model is a deep convolutional network used for incident detection. The R-CNN model appears to the user as a single, end-to-end, unified network. First, a Region Process Network, which is a fully convolutional network, generates proposals with various scales and aspect ratios. Second, for all region proposals in the image, a fixed length feature vector is extracted from the region using a Region of Interest (ROI) (e.g., the region of interest 2150) pooling layer. Third, extracted feature vectors are then classified for object labels (e.g., labels, attributes, categories, etc.) and regressed for box coordinates (e.g., shown as the region of interest 2150A in the image 2100).

According to various embodiments, the first machine learning model detects an incident within the first image at least partially based on metadata associated with the first image. For example, one or more indicators may be added to the first image by various components of the image detection system 100 (e.g., the station computing device 10, the server 200, the computing device 304, etc.). For example, the first machine learning model may at least partially base the determination on the one or more indicators. According to various embodiments, the one or more indicators may include a station identification indicator that is unique to the image capture system 114 and/or the image capture device 124 used to capture the image. The one or more indicators may include a sequence indicator that is unique to a plurality of images (e.g., a sequence of images). For example, some or all of the images captured in a sequence may include the same sequence indicator. The one or more indicators may include a time stamp indicator that indicates the time at which an individual image was captured or the times at which a plurality (e.g., sequence) of images were captured. The one or more indicators may include an image indictor that is unique to that image. The one or more indicators may include a device indicator that identifies the type of image capture device (e.g., make, model, image resolution, number of pixels in the horizontal direction, number of pixels in the vertical direction, the field of view of the device, and/or any other attributes of the device) used to capture the image. The one or more indicators may include a geolocation indicator that indicates a geolocation (e.g., a latitude and/or a longitude) of the image capture device used to capture the image.

According to various embodiments, the first machine learning model is trained using a plurality of training images. According to various embodiments, each of the training images may include one or more attributes. The one or more attributes may be added (e.g., added as metadata) to each of the training images such that the first training model may utilize the one or more attributes as the model is trained.

According to various embodiments, the one or more attributes includes object attributes that are indicative of an incident being shown, or not shown, within the training image. For example, if the incident is a wildfire, the object attribute may indicate the no smoke is shown in the training image. In this example, the object attribute may further indicate another type of event being shown within the training image. For example, the object attribute mat indicate that any of the following are present within the training image: dust, geysers, steam such as industrial steam, snow (e.g., natural and/or man made by a snow machine) unknown, or any other type of event.

For example, attributes may include dust that may appear brown clouds that are very thin in density and there may be no "pillowing" effect to the cloud and tends to disperse quickly. Attributes may include geysers that may appear very similar to a controlled burn off in the distance, but will have a narrow column and base of water. However, geysers may occur in areas that contain springs and geysers (e.g., most known geyser possible incident locations include Cloverdale, Clearlake Oaks, St. Helena and Healdsburg). Attributes may include industrial steam that may appear white cloud/steam that will have a very thin column, will come from populated city areas that have industrial manufacturing. Attributes may include snow that may look like white fountains, and rise up and then clearly fall soon after, there is an arching effect at the top of the "plume." Attributes may include unknown, which may be the default if there's no information in the video description metadata.

According to another example, the object attribute may indicate that smoke is present in the image. In this example, the object attribute may further indicate an origin of the smoke (e.g., the image coordinate associated with a fire creating the smoke, a single original smoke having one base and one column, multiple origin smoke having two or more bases and columns that merge into a single cloud, etc.), a color of the smoke (e.g., black, white, grey, etc.), a density of the smoke (e.g., thin such that the background behind the smoke is visible, the smoke appears to just change the color of the landscape behind it, thick such that background behind the smoke is not visible, etc.), a fire type (e.g., vegetation [e.g., having a burn consisting of brush, trees and underbrush that burns with a grey smoke color, a smoke base, column and plume growing quickly and significantly, the base having the possibility to move laterally as the fire spreads, etc.], car fire [e.g., having smoke that is very dark, almost black in color, that will appear near a roadway, has the possibility to evolve into a vegetation fire if the fire reaches surrounding vegetation, typically put out quickly if contained to the roadway, possibility of transition from black to grey smoke, etc.], agricultural burn [e.g., having a wider base compared to a pile burn and can take place over several acres, will not move laterally or have the "exploding" rate of growth in the width of a the fire column that a vegetation fire has, formerly called prescribed burns, etc.], pile burn [e.g., smoke incident rising in a narrow column that never seems to widen or move laterally in the frame, a narrow base and column and small smoke plume.], structure fire [e.g., smoke that tends to be in very urban areas with a lot of homes and buildings, dark, black smoke rising from populated areas], unknown [e.g., smoke movement on the horizon where it's not clear which category an incident fits into], etc.), and/or a difficulty of detecting the smoke (e.g., easy, hard, extremely difficult, etc.).

According to various embodiments, the object attribute may indicate that smoke without any origin is shown. For example, smoke may be detected in the sky without an origin of the smoke being detected. For example, the view of the base of the smoke is obstructed and cannot be captured with the bounding box.

According to various embodiments, the object attribute may indicate that smoke may not be detected in a first image, but is detected in a subsequently captured image of the same area. For example, during the very stages of smoke development, smoke may not be detected in a first plurality of images while smoke is detected in a second image of the plurality. According to various embodiments, a period of time may pass (e.g., thirty seconds, one minute, ten minutes, one hour, etc.) between the first image and the second image. In this example, the first image may include an object attribute indicating that smoke is subsequently detected. According to various embodiments, the object attribute may be added to two or more preceding images. For example, the five images in a sequence before an image in which smoke is detected may include an object attribute that indicates that smoke is detected in a subsequently captured image of the same area. This object attribute may facilitate training of a machine learning model (e.g., the first machine learning model, the second machine learning model, etc.), especially for early stage incident detection.

According to various embodiments, the one or more attributes includes image quality attributes. The image quality attributes may indicate various factors that may impact the ability of a model to detect an incident in the image. For example, the image quality attribute may indicate a wiper being on the screen (e.g., a wiper that cleans the lens of an image capture device, which may be the result of a camera that malfunctioned such that the wiper is consistently in the a similar location for multiple frames or the wiper is activated during a photo and the blade appears on the image and will typically be running diagonally across the image in a way that obstructs the camera's view), a structure blocking a portion (e.g., greater than 50%) of an image (e.g., a building, trees, the support, etc), camera motion while the image was captured (e.g., frame-by-frame, the images appear to change orientation slowly or suddenly, which may be detected by focusing on one object in the distance and determining if that object moves to another location when advancing to the next frame), blurriness in the image, and/or normal capture conditions.

According to various embodiments, the one or more attributes includes weather attributes. The weather attributes may indicate the conditions present proximate the station at the time the image was captured. According to various embodiments, the weather attributes may be determined based on a sensor present at the station and/or based on third party data (e.g., whether data from the National Weather Service). The weather attributes may indicate fog (e.g., cloud/mist formation that that is low to the ground and below the horizon line), clouds (e.g., above the horizon line, there is cloud formation that takes up more than half of the sky), overcast, haze (e.g., at the horizon line, there is noticeable blurriness that obscures the transition between the sky and the earth), snowing (e.g., active snowfall in the view of the camera that prevents the viewer from seeing clearly in the closer areas and limited range), raining (e.g., active rainfall in the view of the camera that prevents the viewer from seeing clearly in the closer areas and limited range), sun glare (e.g., while sun is above the horizon or below the horizon), localized fog (e.g., a of fog that that collects in mountains after a wet thunderstorm, this will occur above heavily wooded areas (forests) in view and may look similar to other fog, but will have less significant blanketing effect over a large area), smoky image (e.g., smoke covers a majority of the image, and/or normal weather conditions).

According to various embodiments, the one or more attributes includes ground cover attributes. The ground cover attributes may indicate whether snow if present on the ground or not.

According to various embodiments, the one or more attributes include time attributes. The time attributes may indicate the time the image was captured (e.g., 2:00 PM) and/or the position of the sun (e.g., dawn, dusk, sunrise, sunset, day, night, etc.) while the image was captured.

At process 2215, the first machine learning model determines if an incident is detected in the first image. For example, each of the training images may include an incident indicator identifying a region of interest within the training image the displays a respective incident. Further, each training image may include metadata and/or one or more attributes that the first machine learning model is trained with. According to various embodiments, the first image, along with any metadata associated with the first images and/or the one or more attributes associated with the first image are provided to the first machine learning model, which detects incident(s) within the first image.

According to various embodiments, the first machine learning model generates a confidence score as a part of process 2215. The confidence score may indicate a likelihood that the region of interest within the first image includes an incident. For example, the confidence score may be a score between 0 and 1, wherein 1 indicates the strongest confidence that an incident is within the region of interest. According to various embodiments, the confidence score may be based on the image, the metadata, and/or the one or more attributes associated with the image. For example, if the image contains a relatively large area where smoke is shown, the confidence may be relatively high. Further, if the metadata indicates that a wildfire was reported nearby the image capture device that captured the image and the image appears to show smoke, the confidence score may be relatively high. In another example, if the one or more attributes indicate fog is present within the image, the confidence score may be relatively low.

At process 2220, the plurality of images, including the first image, are provided to a second machine learning model. For example, the plurality of images may be provided to a first machine learning model trained to detect incidents within images using a plurality of training images.

According to various embodiments, the second machine learning model may be configured to detect an incident within one or more of the plurality of images. For example, the second machine learning model may not detect an incident in a first image of a plurality of images and detect an incident in a second image of the plurality of images.

According to various embodiments, the second machine learning model is a Faster Region Convolution Network (R-CNN). For example, the Faster R-CNN model may include a ResNet50 Backbone. Generally speaking, the Faster R-CNN model is a deep convolutional network used for incident detection. The R-CNN model appears to the user as a single, end-to-end, unified network. First, a Region Process Network, which is a fully convolutional network, generates proposals with various scales and aspect ratios. Second, for all region proposals in the image, a fixed length feature vector is extracted from the region using a Region of Interest (ROI) (e.g., the region of interest 2150) pooling layer. Third, extracted feature vectors are then classified for object labels (e.g., labels, attributes, categories, etc.) and regressed for box coordinates (e.g., shown as the region of interest 2150A in the image 2100).

According to various embodiments, the second machine learning model detects an incident within the plurality of images at least partially based on metadata associated with the plurality of images. For example, one or more indicators may be added to one or more of the plurality of images by various components of the image detection system 100 (e.g., the station computing device 10, the server 200, the computing device 304, etc.). For example, the second machine learning model may at least partially base the determination on the one or more indicators. According to various embodiments, the one or more indicators may include a station identification indicator that is unique to the image capture system 114 and/or the image capture device 124 used to capture the image. The one or more indicators may include a sequence indicator that is unique to a plurality of images (e.g., a sequence of images). For example, some or all of the images captured in a sequence may include the same sequence indicator. The one or more indicators may include a time stamp indicator that indicates the time at which an individual image was captured or the times at which a plurality (e.g., sequence) of images were captured. The one or more indicators may include an image indictor that is unique to that image. The one or more indicators may include a device indicator that identifies the type of image capture device (e.g., make, model, image resolution, number of pixels in the horizontal direction, number of pixels in the vertical direction, the field of view of the device, and/or any other attributes of the device) used to capture the image. The one or more indicators may include a geolocation indicator that indicates a geolocation (e.g., a latitude and/or a longitude) of the image capture device used to capture the image.

According to various embodiments, the second machine learning model is trained using a plurality of training image plurality of training images and/or a plurality of sets of training images. According to various embodiments, each of the training images and/or sets of training images may include one or more attributes. The one or more attributes may be added (e.g., added as metadata) to each of the training images such that the first training model may utilize the one or more attributes as the model is trained.

According to various embodiments, the one or more attributes includes object attributes that are indicative of an incident being shown, or not shown, within the training image. For example, if the incident is a wildfire, the object attribute may indicate the no smoke is shown in the training image. In this example, the object attribute may further indicate another type of event being shown within the training image. For example, the object attribute mat indicate that any of the following are present within the training image: dust, geysers, steam such as industrial steam, snow (e.g., natural and/or man made by a snow machine), or any other type of event.

According to another example, the object attribute may indicate that smoke is present in the image. In this example, the object attribute may further indicate an origin of the smoke (e.g., the image coordinate associated with a fire creating the smoke), a color of the smoke (e.g., black, white, grey, etc.), a density of the smoke (e.g., thin, thick, etc.), a fire type (e.g., vegetation, car fire, agricultural burn, pile burn, structure fire, unknown, etc.), and/or a difficulty of detecting the smoke (e.g., easy, hard, extremely difficult, etc.).

According to various embodiments, the object attribute may indicate that smoke without any origin is shown. For example, smoke may be detected in the sky without an origin of the smoke being detected.

According to various embodiments, the object attribute may indicate that smoke may not be detected in a first image, but is detected in a subsequently captured image of the same area. For example, during the very stages of smoke development, smoke may not be detected in a first plurality image of a plurality of images while smoke is detected in a second image of the plurality. According to various embodiments, a period of time may pass (e.g., thirty seconds, one minute, ten minutes, one hour, etc.) between the first image and the second image. In this example, the first image may include an object attribute indicating that smoke is subsequently detected. According to various embodiments, the object attribute may be added to two or more preceding images. For example, the five images in a sequence before an image in which smoke is detected may include an object attribute that indicates that smoke is detected in a subsequently captured image of the same area. This object attribute may facilitate training of a machine learning model (e.g., the second machine learning model, the second machine learning model, etc.), especially for early stage incident detection.

According to various embodiments, the one or more attributes includes image quality attributes. The image quality attributes may indicate various factors that may impact the ability of a model to detect an incident in the image. For example, the image quality attribute may indicate a wiper being on the screen (e.g., a wiper that cleans the lens of an image capture device), a structure blocking a portion (e.g., greater than 50%) of an image, camera motion while the image was captured, blurriness in the image, and/or normal capture conditions.

According to various embodiments, the one or more attributes includes weather attributes. The weather attributes may indicate the conditions present proximate the station at the time the image was captured. According to various embodiments, the weather attributes may be determined based on a sensor present at the station and/or based on third party data (e.g., whether data from the National Weather Service). The weather attributes may indicate fog, clouds, overcast, haze, snowing, raining, sun glare (e.g., while sun is above the horizon or below the horizon), localized fog, smoky image (e.g., smoke covers a majority of the image, and/or normal weather conditions.

According to various embodiments, the one or more attributes includes ground cover attributes. The ground cover attributes may indicate whether snow if present on the ground or not.

According to various embodiments, the one or more attributes include time attributes. The time attributes may indicate the time the image was captured (e.g., 2:00 PM) and/or the position of the sun (e.g., dawn, dusk, sunrise, sunset, day, night, etc.) while the image was captured.

At process 2225, the second machine learning model determines if an incident is detected in the plurality of images. For example, each of the training images may include an incident indicator identifying a region of interest within the training image the displays a respective incident. Further, each training image may include metadata and/or one or more attributes that the machine learning is trained using. According to various embodiments, the first plurality of images, along with any metadata associated with the first plurality of images and/or the one or more attributes associated with the plurality of images, are provided to the second machine learning model, which detects incidents within the plurality of images.

According to various embodiments, the second machine learning model generates a confidence score as a part of process 2225. The confidence score may indicate a likelihood that the region of interest within the plurality of images includes an incident. For example, the confidence score may be a score between 0 and 1, wherein 1 indicates the strongest confidence that an incident is within the region of interest. According to various embodiments, the confidence score may be based on the image, the metadata, and/or the one or more attributes associated with the image.

At process 2230, data associated with the plurality of images, including the first image, is generated. For example, if the server 200 determines a discrepancy between the incident detection in the first machine learning model and the second machine learning model, discrepancy data may generated and associated with the plurality of images. According to various embodiments, the plurality of images are provided to a computing system 304 for review in response the discrepancy being detected.

According to various embodiments, the server 200 may leverage the first model and the second model to reduce the amount of data sent and/or received while monitoring geographical areas for incidents. For example, if the incident is only detectable in the series of images and not in an individual image, the entire series may be provided to the computing device as a part of an alert. However, if a smoke event is detected by both the first model and the second model, just one individual image may be provided as a part of an alert to a computing device operated by a user of the system, thereby reducing the amount of data transmitted.

At process 2235, the plurality of images are provided to a computing device 304. For example, an alert, the plurality of images, and/or the first image may be provided to the computing device 304 in response to an incident being detected by the first machine learning model and/or the second machine learning model. Alternatively or additionally, the plurality of images and/or the first image may be provided to the computing device 304 in response to a discrepancy being detected between the first machine learning model and the second machine learning model.

At process 2240, feedback is received from the computing device regarding the plurality of images and/or the first image. According to various embodiments, the computing device 304 may be used to confirm an incident is present within the plurality of images and/or the first image. According to various embodiments, the confirmation of an incident may be added to the image as an attribute (e.g., an object attribute) and the plurality of images and/or first image may be stored subsequently as training data. According to various embodiments, the feedback may further include other attributes added to the image(s) and/or metadata added to the image(s).

At process 2245, the incident detection system determines if any other images may have captured the incident. For example, the server 200 may determine if a second image capture devices 124 (e.g., other than the first image capture device 124 that captured the plurality of images) captured an image containing the incident captured in the first plurality of images. For example, the server 200 may make the determination based on the geolocation of the first image capture device 124, the geolocation of the second image capture device 124, the horizontal camera angle of the image capture devices 124, the metadata associated with the images, and/or the attributes associated with the images. For example, the server 200 may determine which image capture devices 124 captured images at a similar time as the plurality of images while orientated in a direction of the incident detected.

At process 2250, any other images that may have captured the incident are provided to a computing device 304. For example, an alert and the other images may be provided to the computing device 304 in response to an incident being detected by the first machine learning model and/or the second machine learning model. The computing device 304 may be used to confirm or deny that the image captured the incident. It should be appreciated that the computing device 304 may be the same or different as the computing device 304 of process 2235.

At process 2255, feedback is received from the computing device 304 regarding the other images (e.g., the other images that may have captured the incident captured by the first plurality of images). According to various embodiments, the computing device 304 may be used to confirm an incident is present within the other images. According to various embodiments, the confirmation of an incident may be added to the image as an attribute (e.g., an object attribute) and the other images stored subsequently as training data. According to various embodiments, the feedback may further include other attributes added to the image(s) and/or metadata added to the image(s).

At process 2260, the first machine learning model and the second machine learning model are trained based on the feedback received at process 2240 and/or process 2255.

F. Image Capture System and Angle Selection Based on Location Data Included in Notifications Referring back to FIG. 14, depicted is another example system 1400 for incident detection, according to an example embodiment. The system 1400 is shown to include the server(s) 200, station(s) 102, and computing device(s) 304 described above with reference to FIG. 1. In this regard, the system 1400 may include elements or features similar to those described above with reference to FIG. 1. As described in greater detail below, the server(s) 200 may be configured to detect, determine, identify, or otherwise receive one or more alerts of an incident from an alert source 1402. The server(s) 200 may be configured to identify, select, or otherwise determine a station 102 in which the incident may be observed (e.g., in images captured at the station 102). The server(s) 200 may be configured to generate another alert or notification which identifies the incident, station 102, and/or images captured at the station 102.

The alert source 1402 may be or include an application, resource, website, a particular account of an application/resource/website, or other source on which alerts relating to incidents may be provided. In some embodiments, the alert source 1402 may be an application which is used by users for reporting detected/observed incidents. In some embodiments, the alert source 1402 may be an account or feed of an application on which incidents may be reported. For example, the alert source 1402 may be an account (e.g., a social media account, such as a TWITTER account, FACEBOOK account, etc.) where users may publish, send, transmit, or otherwise post incidents in which the users observed.

In some embodiments, the alert source 1402 may be or include sensors. Sensors may be, for example, a seismic sensor, a temperature sensor, rain or waterflow sensor, theft sensors, traffic sensors, etc. The server(s) 200 may maintain geolocations corresponding to a deployment location of the sensors (e.g., in a data structure or table) and register with a publication service for the sensor(s) to receive data from the sensors. The server(s) may receive an alert responsive to the sensor(s) providing data which exceeds or otherwise satisfies a threshold or condition (e.g., seismic activity which exceeds a threshold, a temperature which exceeds a threshold, waterflow or water levels exceeding a threshold, theft sensors indicating detection of a theft condition, traffic sensors indicating an accident, to name a few examples).

In some embodiments, the alert source 1402 may include a hotline or messaging service. For example, the alert source 1402 may be a dedicated phone number or messaging service in which users report incidents. The server(s) 200 may receive notifications/alerts from the alert source 1402 responsive to a user (for example) sending a text message or phone call to the hotline or messaging service reporting the incident.

In some embodiments, the server(s) 200 may be registered, associated with, or otherwise linked to an alert source 1402. The server(s) 200 may be linked to an alert source 1402 such that the server(s) 200 subscribe to a feed of the alert source 1402. In some embodiments, the server(s) 200 may be linked to the alert source 1402 by an administrator using an administrator computing device. For example, an administrator may link the server(s) 200 to the alert source 1402 by accessing a page of the alert source 1402 and adding or registering an IP address (or other address associated with the server(s) 200 to a push notification service of the alert source 1402. As another example, an administrator may link the server(s) 200 to the alert source 1402 by deploying a plug-in, webhook, API, etc. on the server(s) 200 to pull alerts published on the alert source 1402. As yet another example, the server(s) 200 may receive alerts published to a really simple syndication (RSS) feed of the alert source 1402. It is noted that, while these examples of subscribing a server 200 to an alert source 1402 are described, other methods for subscribing a server 200 to an alert source 1402 may be used, to cause the server 200 to receive messages/alerts/notifications from the alert source 1402.

Figure 23A:
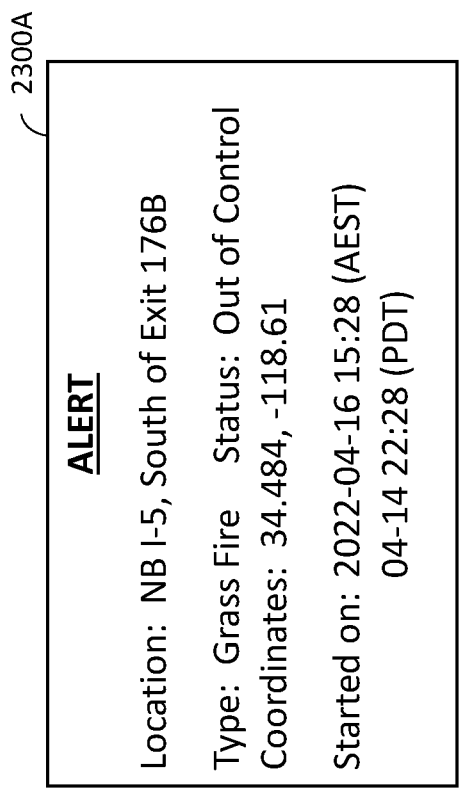
FIG. 23A and FIG. 23B show various examples of alerts, according to an exemplary embodiment.
Figure 23B:
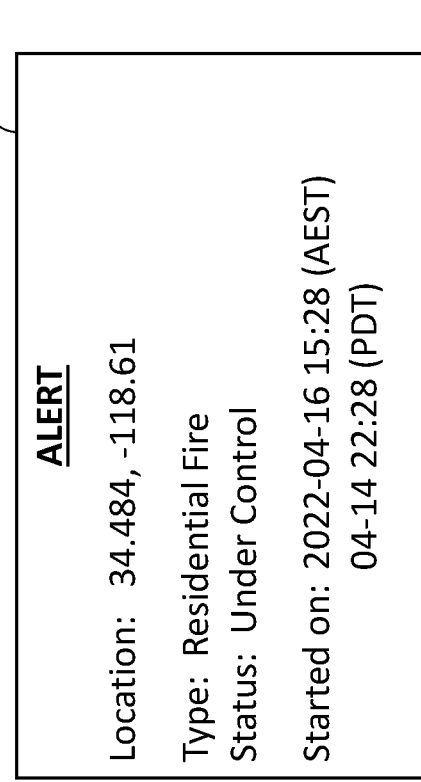

Referring now to FIG. 14 and FIG. 23A-FIG. 23B, in some embodiments, the server 200 may include an alert detection circuit 222. The alert detection circuit 222 may be configured to receive alerts published to a feed of the alert source 1402. Specifically, FIG. 23A and FIG. 23B show various examples of alerts 2302A, 2302B (generally referred to as alerts 2302) which may be published by the alert source(s) 1402 and/or received by the alert detection circuit 222. The alerts 2302 may include a description of a location corresponding to an incident.

In some embodiments, and as shown in FIG. 23A, the description may be or include street or road descriptions (e.g., highway and exit, such as northbound interstate-5, exit 176B as shown in FIG. 23A), an address (e.g., 123 Main Street, San Jose, CA), or some other road/route-based description. The alert 2300 may also include addition information relating to the incident, such as incident type (e.g., grass fire as shown in FIG. 23A, residential fire as shown in FIG. 23B), incident status (out of control as shown in FIG.

23A, under control as shown in FIG. 23B, fire department in route, fire department at site, etc.), a timestamp or other indication of timing (e.g., start time, incident reporting time, etc.). The alert 2300 may include coordinates. As shown in FIG. 23B, and in some embodiments, the description may be or include geographic coordinates corresponding to the incident (e.g., coordinates of the device which was used to generate the incident, estimated coordinates of the incident determined using a pin dropped on a user interface of a map showing the area of the incident, etc.). In some embodiments, the geographic coordinates may be determined from the description of the location of the incident (e.g., as shown in FIG. 23A). For example, the coordinates may be determined from the street or road description. In this example, the server(s) 200 and/or the alert source 1402 may be configured to determine the coordinates by providing the street/road description to an address-to-coordinates conversion application or resource which generates coordinates for a region of interest corresponding to the street/road description. The region of interest may be a geographic region or area which corresponds to, surrounds, contains, includes, or is otherwise associated with the street or road description. The coordinates for the geographic region of interest may be located at the center of the region (e.g., geographic center). In some embodiments, the alert source 1402 may be configured to generate the alert 2300 to include the coordinates for the geographic region of interest.

The alert detection circuit 222 may be configured to receive alerts 2300 published to a feed of the alert source 1402. In some embodiments, the alert detection circuit 222 may be configured to receive the alerts 2300 in real-time or substantially in real-time. The alert detection circuit 222 may be configured to determine a first set of (geographic) coordinates corresponding to the alert. In some embodiments, the alert detection circuit 222 may be configured to determine the first set of coordinates by parsing the alert to identify a value for one or more predetermined/defined fields which include the coordinates. The coordinates may be the description coordinates included in the alert (as shown in FIG. 23B. Additionally or alternatively, the coordinates may be determined from the description of the location of the incident, and may correspond to the geographic area of interest as shown in FIG. 23A.

Figure 24:
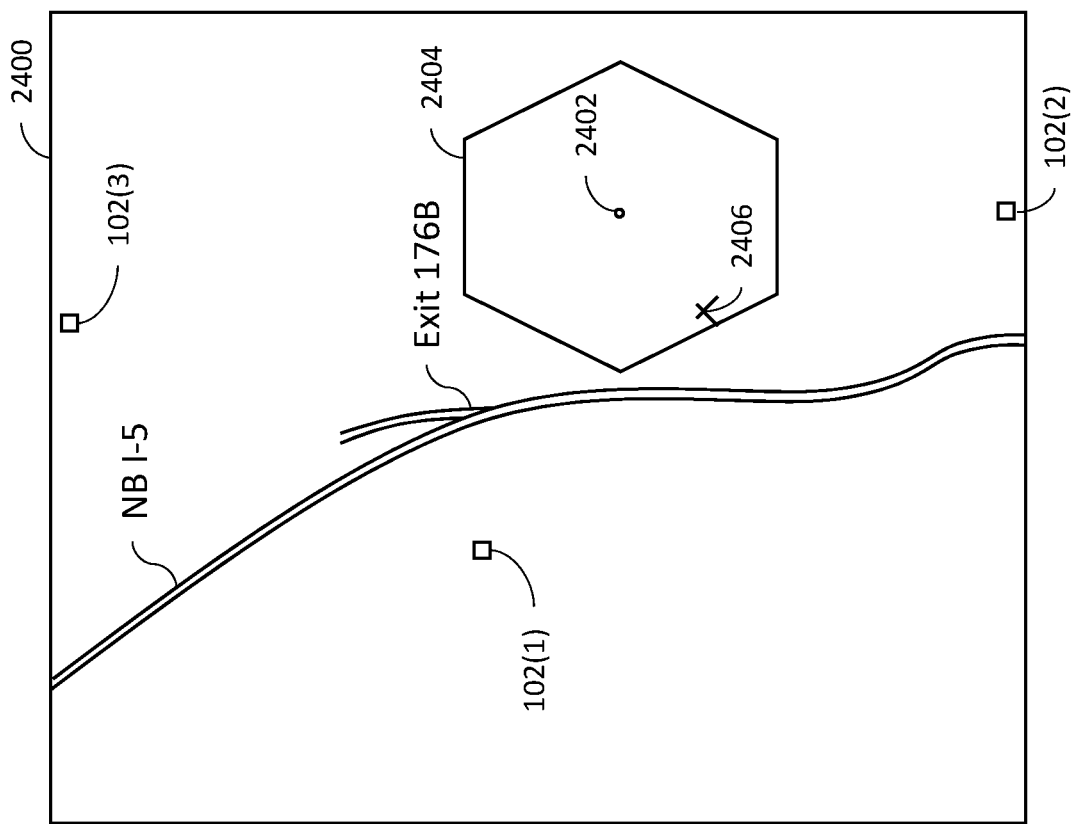
FIG. 24 shows an example map including coordinates for a geographic area of interest corresponding to an incident, and locations of stations which are geographically located near the area of interest, according to an exemplary embodiment.

Referring now to FIG. 14 and FIG. 24, the server(s) 200 may include a station selection circuit 224. Specifically, FIG. 24 shows an example map 2400 including coordinates 2402 for the geographic area of interest 2404 corresponding to the incident 2406, and locations of stations 102 which are geographically located near the area of interest 2404. The station selection circuit 224 may be configured to receive the coordinates 2402 corresponding to the alert from the alert detection circuit 222. The station selection circuit 224 may be configured to select one or more stations 102 based on the coordinates 2402 corresponding to the alert.

Referring back to FIG. 14, the server(s) 200 may include, maintain, or otherwise access a data structure 226 which stores coordinates (e.g., geographic coordinates) indicating locations of stations 102 of the system 1400. In some embodiments, the server(s) 200 may maintain the data structure 226 to include new geographic coordinates for stations 102 as those stations 102 are deployed in the system 1400. In some embodiments, the data structure(s) 226 may include coordinates determined for the stations 102 as described above with reference to Section A. The geographic coordinates for the stations 102 may indicate respective locations of the station 102 at which one or more image capture systems of the station 102 are configured to capture images.

Referring again to FIG. 14 and FIG. 24, the station selection circuit 224 may be configured to select one or more stations 102 based on the coordinates 2402 corresponding to the alert and coordinates for the stations 102 included in the data structure(s) 226. In some embodiments, the station selection circuit 224 may be configured to compute a distance between the coordinates 2402 and respective coordinates for the stations 102. In some embodiments, the distance may be a straight-line distance between the coordinates 2402 and coordinates from the data structure 226. The station selection circuit 224 may be configured to identify the station 102 which is nearest to (closest in proximity to, geographically closest to, etc.) the coordinates 2402 corresponding to the alert.

Referring now to FIG. 25A and FIG. 25B, depicted is a view of a map 2500 including the geographic area of interest 2404 of FIG. 24 and a view of an image 2502 captured from an image capture system of the station 102(1), respectively. As shown in FIG. 25A, the station selection circuit 224 may be configured to select the station 102(1) as opposed to station 102(2) based on the proximity of (e.g., distance between) the geographic coordinates for the station 102(1) relative to the coordinates 2402 corresponding to the geographic area of interest for the incident 2406. The station selection circuit 224 may be configured to select the station 102(1) based on the distance between the station 102(1) and coordinates 2402 being less than the distance between the station 102(2) and coordinates 2402.

The station selection circuit 224 may be configured to determine a bearing, direction, or an angle for viewing the geographic area of interest from the coordinates for the station 102(1). In some embodiments, the station selection circuit 224 may be configured to determine the angle based on the coordinates for the station 102(1) relative to the coordinates 2402. The station selection circuit 224 may be configured to determine the angle relative to a reference direction (such as true North, or some other reference direction). For example, where the coordinates 2402 were located due East from the coordinates for the station 102(1), the angle may be 90° with respect to true North. The station selection circuit 224 may be configured to determine the angle by determining which quadrant the station 102(1) is located in relative to the coordinates 2402 (e.g., assuming that the coordinates 2402 are located at the origin). The station selection circuit 224 may be configured to determine which quadrant the station 102(1) is located in based on a positive or negative offset value of the longitudinal and latitudinal offsets between the coordinates (e.g., positive long. and positive lat. assigned to the North-East quadrant, positive long. and negative lat. assigned to the South-East quadrant, negative long. and positive lat. assigned to the North-West quadrant, and negative long. and negative lat. assigned to the South-West quadrant). The station selection circuit 224 may be configured to apply a trigonometric function (such as inverse-tangent function) to an absolute value of the longitudinal offset divided by the latitudinal offset to compute a local angle within the respective quadrant. The station selection circuit 224 may be configured to determine the angle relative to the reference direction by applying a quadrant-based offset value to the angle (e.g., a 0° offset applied to angles in the North-East quadrant, 90° offset applied to angles in the South-East quadrant, 180° offset applied to angles in the South-West quadrant, and a 270° offset applied to angles in the North-West quadrant).

The station selection circuit 224 may be configured to determine a viewing range of angles 2504 which includes the angle. The viewing range of angles 2504 may be or include a span of angles for viewing portions of the geographic area of interest around the coordinates. For example, where the range of angles 2504 is 60°, the station selection circuit 224 may determine a 30° portion of the viewing range of angles 2504 from the angle on one side of the angle, and 30° portion on the other side of the angle.

Referring to FIG. 14 and FIG. 25B, the server(s) 200 may include a message circuit 228. The message circuit may be configured to provide, determine, derive, or otherwise generate a message which identifies or indicates the station 102(1) for viewing the incident and the angle for viewing the geographic area of interest from the coordinates of the station 102(1). In some embodiments, the message may be similar to the alerts 2300 described above with reference to FIG. 23A and FIG. 23B. The alerts 2300 may include a link for viewing images captured from the image capture system (e.g., at the angle or with the viewing range of angles 2504) of the station 102(1). Upon detecting an interaction with the link (e.g., on a computing device 304), a browser or application may be directed to a page for viewing the image(s). As another example, the alert(s) 2300 may include a series of frames or portions of the images which include the angle (as described in greater detail below in Section G).

As stated above in Section A, the server(s) 200 may be configured to receive images captured from a plurality of image capture systems 114 across different stations 102 at various times/time intervals. The server(s) 200 may be configured to store the images in a database or data structure with a timestamp, station identifier, and/or image capture system identifier. The server(s) 200 may be configured to select images from the data structure using the timestamp of the notification/alert, In some embodiments, the message circuit 228 may be configured to select images captured from the station for viewing within the alert (or for viewing on a link accessible via the alert). In some embodiments, the message circuit 228 may be configured to select the images based on a timestamp of the images, the timestamp for the alert 2300, and the determined angle for viewing the geographic area of interest 2404. For instance, the images may be images captured at a time which corresponds to a timestamp included in the alerts 2300 (e.g., within a predetermined duration prior to the timestamp, a progression of images spanning a time window which includes the timestamp, etc.). The message circuit 228 may be configured to select the images for viewing based on the respective timestamps for the images and timestamp for the alert 2300. The message circuit 228 may be configured to transmit, send, or otherwise provide the alerts to one or more computing device(s) 304 via the network 10. In this regard, the message circuit 228 may be configured to cause display of the images such that images which are displayed (such as the image shown in FIG. 25B) has the range of angles 2502 which includes the angle for viewing the geographic area of interest 2404 (and therefore viewing the incident 2406 within the geographic area of interest 2404).

In some embodiments, the server(s) 200 may be configured to perform image analysis on the image(s) to generate an indicator on the image(s) corresponding to the incident in the geographic area of interest. For example, and as described in greater detail above with reference to Section E, the server(s) 200 may include a . . . The . . . may be configured to detect the incident at a location depicted in the image, and generate an indicator corresponding to the location of the incident in the images.

In some embodiments, the server(s) 200 may be configured to determine geographic coordinates for the incident 2406 based on the indicators assigned to images captured from two or more image capture systems. As described in greater detail below in Section D, the server(s) 200 may be configured to triangulate a location of the incident 2406 based on indicators corresponding to the location of the incident included images captured from image capture systems located at separate stations 102. The message circuit 228 may be configured to generate the alert to include coordinates for the location of the incident 2406 which, as shown in FIG. 25A, may be different from the coordinates 2402 for the geographic area of interest 2404.

Figure 26:
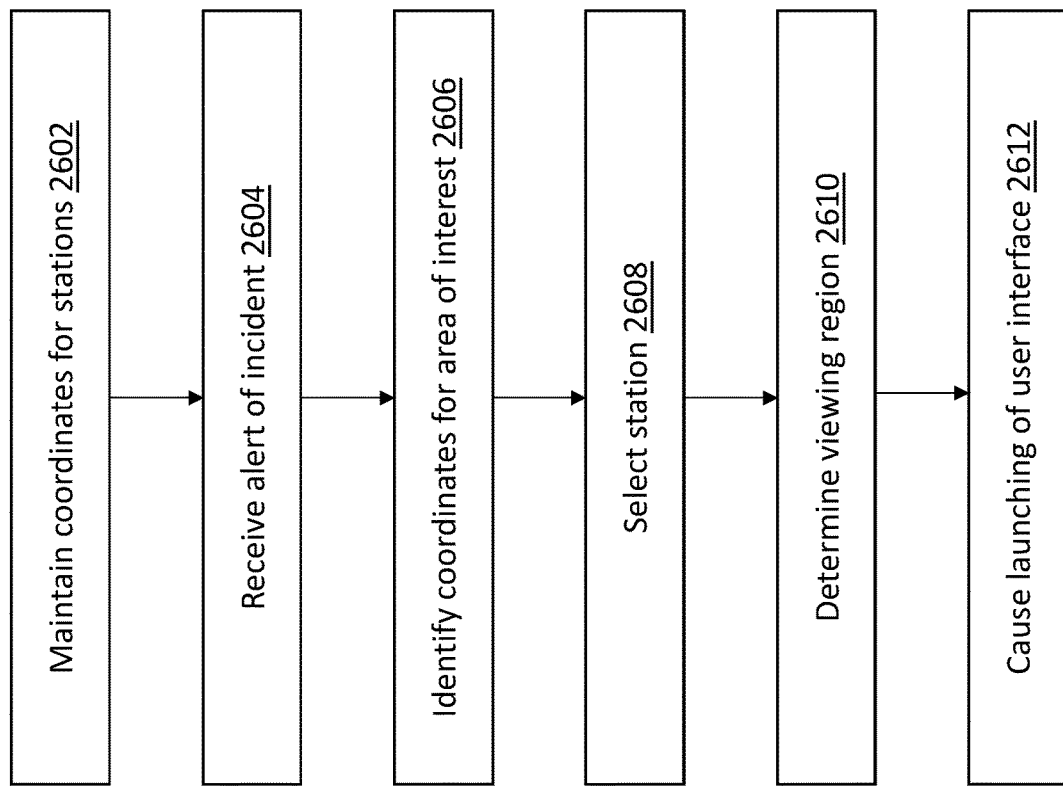
FIG. 26 is a flowchart showing a method of incident detection, according to an exemplary embodiment.

Referring now to FIG. 26, depicted is a flowchart showing a method 2600 of incident detection, according to an example embodiment. The method 2600 may be performed by the systems/devices described above with reference to FIG. 1A-FIG. 18. As a brief overview, the method 2600 may include maintaining coordinates for stations (step 2602), receiving an alert of an incident (step 2604), identifying coordinates for an area of interest (step 2606), selecting a station (step 2608), determining a viewing region (step 2610), and present a user interface (step 2612).

At step 2602, the server(s) may maintain coordinates for the stations. In some embodiments, one or more processors of the server(s) may maintain coordinates for the stations. More specifically, the server(s) may maintain geographic coordinates for each of a plurality of stations, where the coordinates indicate a location of the station at which one or more image capture systems of the station are configured to capture images. In some embodiments, the server(s) may maintain the coordinates in one or more databases, tables, or other data structures, as described above with reference to Section A. As new image capture systems are deployed in the environment at new stations (and the image capture systems are calibrated as described above in Section A), the server(s) may update the data structures to include coordinates for the new image capture system(s) of the new stations. Similarly, as image capture systems are taken out of commission, the server(s) may update the data structures to remove coordinates for the stations corresponding to the decommissioned image capture systems.

At step 2604, the server(s) may receive an alert of an incident. In some embodiments, the server(s) may receive an alert of an incident included in a notification. The notification may be from a building notification source (e.g., from a carbon monoxide or smoke detector sensor, from a proximity sensor or theft deterrent sensor), from an environment sensor (seismic sensor, waterflow sensor, etc.). The notification may be from a feed, such as a social media feed, a dedicated reporting feed, etc. In some embodiments, the server(s) may subscribe to the notification source (e.g., the building notification source, the feed, the sensor(s), etc.), and receive the notification from the notification source responsive to subscribing to the notification source. In some embodiments, the server(s) may receive the notification via an API for the notification source (e.g., by initiating an API call to an API for the notification source at various intervals to pull new notifications), via a webhook or plug-in for the notification source, via a really simple syndication (RSS) feed for the notification, and so forth.

In some instances, the server may receive notifications from multiple sources. Some of the sources may use formats which are different from other sources. In some embodiments, such as where the server receives notifications from multiple sources, the server may process such alerts to generate a standardized alert. For example, the server may reformat notification source-specific alerts into a standard format for use by the server. The server may particular fields of the notification source-specific alert to identify corresponding values from the notification source-specific alert. The server may maintain a standard formatted alert template, and populate identified values from the notification source-specific alert to the standard formatted alert template to generated a generic alert.

At step 2606, the server(s) may identify coordinates for an area of interest (e.g., corresponding to the alert received at step 2604). In some embodiments, the server(s) may determine a second set of geographic coordinates for an incident, based on information corresponding to a geographic area of interest of the incident included in the notification of the incident. The geographic area of interest may be or include a region in which the incident is likely located. For example, and in some embodiments, the information corresponding to the geographic area of interest may include a description of a location of the incident. The description may be geographic coordinates corresponding to the notification (e.g., a location of a device which generated the notification), estimated coordinates included in the notification (e.g., by a user manually dropping a pin at an estimated location of the incident). The description may be a road map-based description (e.g., a description of intersections between roads, an address, a landmark, mile road, or exit along a particular road or highway, and so forth). The server(s) may determine the second set of geographic coordinates based on the description of the location of the incident. For example, where the description is geographic coordinates corresponding to the notification, the server(s) may determine the second set of geographic coordinates as the coordinates corresponding to the notification. As another example, where the description is a road map-based description, the server(s) may access, include, or otherwise use a road map-based description-to-coordinate conversion application or resource to determine the second set of geographic coordinates.

At step 2608, the server(s) may select a station. In some embodiments, the server(s) may select the station from the plurality of stations based on a distance between the respective first set of geographic coordinates for the first station and the second set of geographic coordinates for the incident. For example, the server(s) may maintain (e.g., in one or more data structures as described above in Section A) geographic coordinates for each of the stations. The server(s) may use coordinates for the stations and the coordinates identified at step 2606 to select the station. In some implementations, the server(s) may compute a distance between the coordinates identified at step 2606 and coordinates for one or more stations in the data structure. The server(s) may select the station from the plurality of stations based on which distance is shortest. As another example, the server(s) may select the station based on which coordinates from the data structure are closest to (e.g., having the least latitudinal and/or longitudinal offset from) the coordinates identified at step 2606. In this example, rather than computing a distance, the server(s) are comparing the coordinates from step 2606 to coordinates from the data structure for the stations to identify which station has coordinates that are least "offset" from the coordinates at step 2606.

At step 2610, the server(s) may determine a viewing region. In some embodiments, the server(s) may determine a viewing region for viewing the geographic area of interest in images captured from an image capture system located at the station selected at step 2608. The server(s) may determine the viewing region based on an angle from the geographic coordinates of the station (e.g., used to select the station at step 2608) relative to the geographic coordinates identified at step 2606.

The server(s) may determine an angle from the coordinates of the station to (or towards, in the direction of, etc.) the coordinates for the geographic area of interest. The server(s) may determine the angle by determining which quadrant the coordinates for the geographic area of interest are located relative to the coordinates for the station (e.g., assuming that the station selected is located at the origin). The server(s) may determine which quadrant the geographic area of interest is located in based on a positive or negative offset value of the longitudinal and latitudinal offsets between the coordinates (e.g., positive long. and positive lat. assigned to the North-East quadrant, positive long. and negative lat. assigned to the South-East quadrant, negative long. and positive lat. assigned to the North-West quadrant, and negative long. and negative lat. assigned to the South-West quadrant). The server(s) may apply a trigonometric function (such as inverse-tangent function) to an absolute value of the longitudinal offset divided by the latitudinal offset to compute a local angle within the respective quadrant. The server(s) may determine the angle relative to the reference direction by applying a quadrant-based offset value to the angle (e.g., a 0° offset applied to angles in the North-East quadrant, 90° offset applied to angles in the South-East quadrant, 180° offset applied to angles in the South-West quadrant, and a 270° offset applied to angles in the North-West quadrant).

The server(s) may determine the viewing region to span a viewing range of angles which includes the angle (e.g., determined as described above). The viewing range of angles may be or include a span of angles for viewing portions of the geographic area of interest around the coordinates. For example, where the range of angles is 60°, the server(s) may determine a 30° portion of the viewing range of angles from the angle on one side of the angle, and 30° portion on the other side of the angle.

At step 2612, the server(s) may present a user interface. In some embodiments, the server(s) may present a user interface on a computing device showing images captured from the one or more image capture systems of the first station, with the images having a viewport instantiated on the user interface according to the defined viewing region. For example, and in some embodiments, the server(s) may present the user interface by transmitting a notification or link to the computing device. The notification and/or link may cause rendering of the user interface on the computing device. The user interface may include images which are pre-loaded or pre-configured to have the viewing region determined at step 2610. As noted above in Section A-Section C, the images may be or include panoramic images. As such, a total viewing region may span the entirety of the panoramic image. The viewing region (e.g., determined at step 2610) may be a subset of the total viewing region of the panoramic image. Accordingly, by pre-loading/pre-configuring the images to have the viewing region determined at step 2610, when the user interface is launched on the computing device, the user interface may show the relevant portions of the image which depict (or most likely depict) the incident.

In some embodiments, the server(s) may select one or more images captured by the one or more image capture systems of the first station (e.g., to include in the user interface), based on a timestamp of the alert and the angle. For example, the server(s) may receive a plurality of images from the image capture systems at various intervals as described above in Section A. The server(s) may store the images in a data structure in association with an identifier for the station and/or image capture system at the station, and a timestamp in which the image was captured. The server(s) may identify a timestamp of the alert (e.g., or a timestamp of a notification which triggered identification or receipt of the alert). The server(s) may select the image(s) by identifying (e.g., from all the images stored in the data structure) a subset of images captured by the image capture system by performing a look-up or filtering using an identifier for the station selected at step 2608/image capture system at the station. The server(s) may select the images from the subset using the timestamp of the alert and the timestamps of the subset of images. For instance, the server(s) may select images having a timestamp which are within a predetermined duration of the timestamp of the alert (e.g., +/−10 minutes, for example).

In some embodiments, the server(s) may detect the incident at a location depicted in the one or more images. The server may generate an indicator corresponding to the location of the incident on the one or more images. The server(s) may detect the incident as described above in Section E. In some embodiments, the server(s) may determine coordinates (e.g., geographic coordinates) for the incident. In some embodiments, the server(s) may determine coordinates for the incident by triangulating the incident based on images obtained from image capture systems of two or more different stations. The server(s) may determine the coordinates for the geolocation associated with the incident in a manner similar to determination of coordinates described above in Section D. In some embodiments, the server(s) may perform image analysis on the one or more images to generate the indicator on at least one image of the one or more images corresponding to the geographic area of interest of the incident. The server(s) may perform image analysis as described above in Section E to determine the location of the incident. In some embodiments, the server(s) may transmit a second notification to a device. The second notification may include geographic coordinates of the incident (e.g., the determined coordinates following triangulating the incident as described above in Section D).

G. Prioritizing Partial Images for Transmission

Referring back to FIG. 8, and as described above in Section C, a composite image 810 may be generated (e.g., by the composite image manager 808) from constituent images 804 captured by an image capture system 114 located at a station 104. The image partitioner 814 may be configured to separate, split, bifurcate, divide, or otherwise partition the composite image 810 into image parts 842 (also referred to hereinafter as partial images) for transmitting to a computing device 304 over the network 10. In various embodiments of the present solution, the server(s) 200 may be configured to identify an indicator indicating an incident within a composite image 810. The server(s) 200 may be configured to select a first subset of partial images of the composite image 810 to send to a computing device 304 (e.g., prior to sending a second subset of partial images), based on the indicator.

As noted above, the image partitioner 814 can include computer code, instructions or functions stored in memory (e.g., 218) to implement its functionality via processors 208. Image partitioner 814 can include the functionality to separate a composite image 810 into any number of parts, such as for example into up to 2, 3, 4, 5, 6, 7, 8, 9, 10, 11, 12, 14, 16, 18, 20, 22, 24, 26, 28, 30 or more parts. The parts partitioned can be equal in size or different in size, can be equal in shape or be differently shaped. Image partitioner 814 can include the functionality to separate a composite image 810 into parts or partial images, such that each part corresponds to an individual constituent image 804. Each part can also include the constituent image data 806 for each corresponding part corresponding to a constituent image 804. Image partitioner 814 can include the functionality to separate images along the height, along the width, or along any combination of height and width.

Image parts 842 (or partial images) can include any one or more parts of a composite image 810 partitioned by an image partitioner 814. Image parts 842 can include composite image 810 split into any number of parts, such as up to 4, 6, 8, 10, 12, 16, 18, 20, 24, 30 or more parts. Image parts 842 can correspond to the constituent images 804 used to generate the composite image 810. Image parts 842 can for example include 10 parts for a composite image 810 that is generated based on ten constituent images 804 stitched together. Image parts 842 can include likewise any other number of parts. For example, and in various embodiments, the image partitioner 814 may separate a composite image 810 into more (or fewer) image parts 842 than the number of constituent images 804 which were stitched together to generate the composite image 810. Image parts 842 can include information included in the composite image data 812 which can be sent to the computing devices 304 in order to recombine the image parts 842 into the composite image 810.

Figure 27:
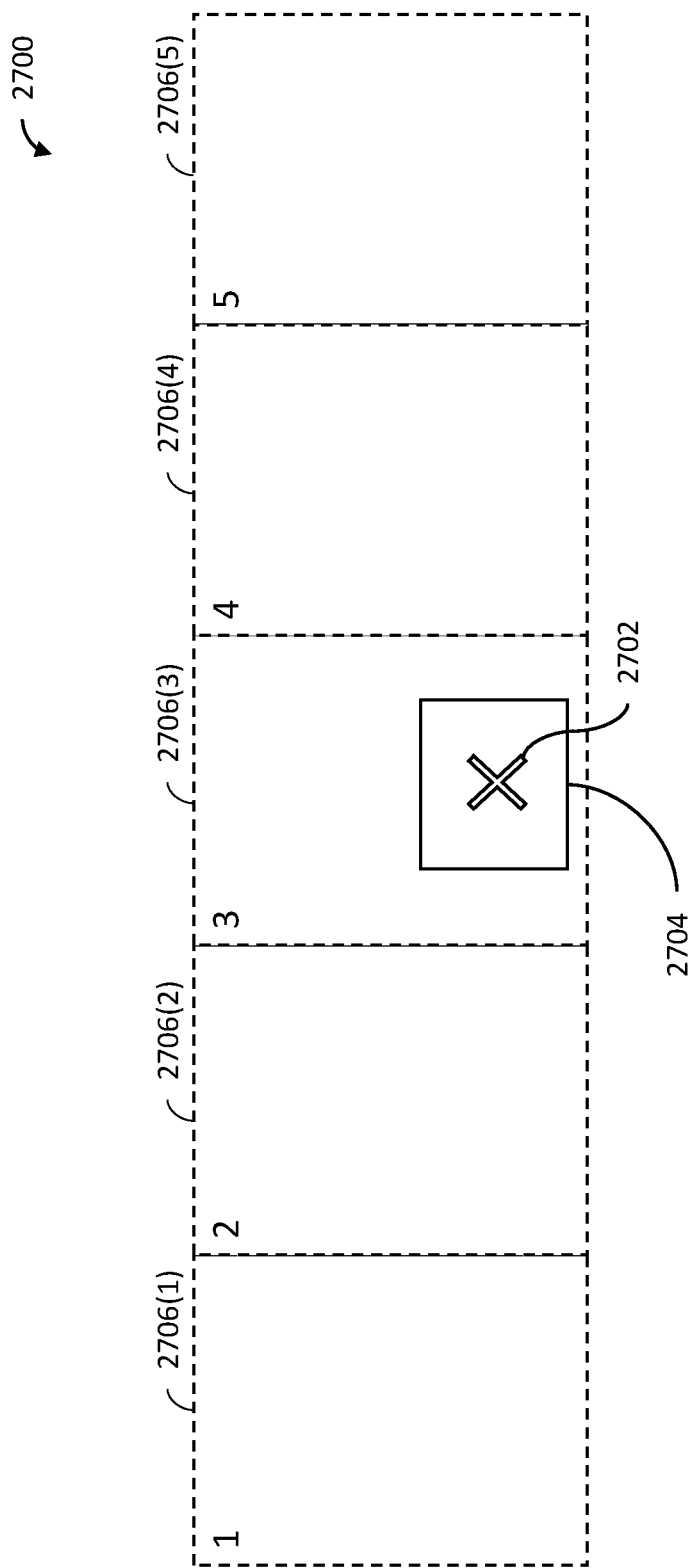
FIG. 27 shows an example composite image including an indicator within the composite image, according to an exemplary embodiment.

Referring now to FIG. 27 in connection with FIG. 1 and FIG. 8, and as described above in Section B and Section E, the incident detection circuit 210 may be configured to detect an incident within the composite image 810. Specifically, FIG. 27 shows an example composite image 2700 including an indicator 2702 within the composite image 2700, according to an exemplary embodiment. As described above with reference to Section B and Section E, the incident detection circuit 210 may include one or more machine learning models trained to detect an incident (e.g., smoke) within an image 810. The incident detection circuit 210 may be configured to generate an indicator of the incident within or at a region of interest 2704 within the composite image 810. In some embodiments, the incident detection circuit 210 may be configured to detect an incident responsive to a user selecting or otherwise providing an indicator of the incident within the image 810 (e.g., on a user interface).

The display output circuit 216 may be configured to identify or determine a region of interest 2704 corresponding to the indicator of the incident in the image 810. The region of interest 2704 may be or include an area, portion, or region of the composite image 810 which includes (or likely includes) a representation or depiction of the incident. For example, the region of interest 2704 may be or include a predetermined number of pixels which surround a pixel that corresponds to the indicator 2702. Continuing this example, assuming a pixel at an end, termination point, or other point corresponding to the indicator 2702 (which the user selected to denote or identify the incident or where the incident detection circuit 210 established the indicator for the incident) is located at a center of the region of interest 2704, the display output circuit 216 may be configured to identify a plurality of adjacent pixels in that frame, encompass, surround, or are otherwise located proximate to the pixel of the indicator 2702. The region of interest 2704 may take any form or shape, including, a square (as shown in FIG. 2704), a circle, etc., and may be composed of adjacent pixels and the pixel which corresponds to the indicator 2702.

As noted above with reference to Section C, the image partitioner 815 may be configured to partition the composite image 2700 into a plurality of partial images 2706 (or image parts). In some embodiments, the image partitioner 815 may be configured to partition the image 2700 based on the region of interest 2704. For example, the image partitioner 815 may be configured to determine a perimeter of the region of interest 2704 (e.g., the outermost pixels of the region of interest 2704). The image partitioner 815 may be configured to partition the image 2700 into partial images 2706 with each partial image 2706 sized at least as large (e.g., containing at least the same number of pixels) as the region of interest 2704. The image partitioner 815 may be configured to first partition the image at the region of interest 2704, then partition the remaining portions of the image 2700 to generate additional partial images 2706. In this regard, one partial image 2706 may include or contain (at least) the region of interest 2704. In some embodiments, the image partitioner 815 may be configured to partition the image 2700 into partial images 2706 agnostic to the region of interest 2704. In this regard, the image partitioner 815 may be configured to partition the image 2700 into standard (or predefined, predetermined, defined, and so forth) sized partial images 2706.

Figure 28:
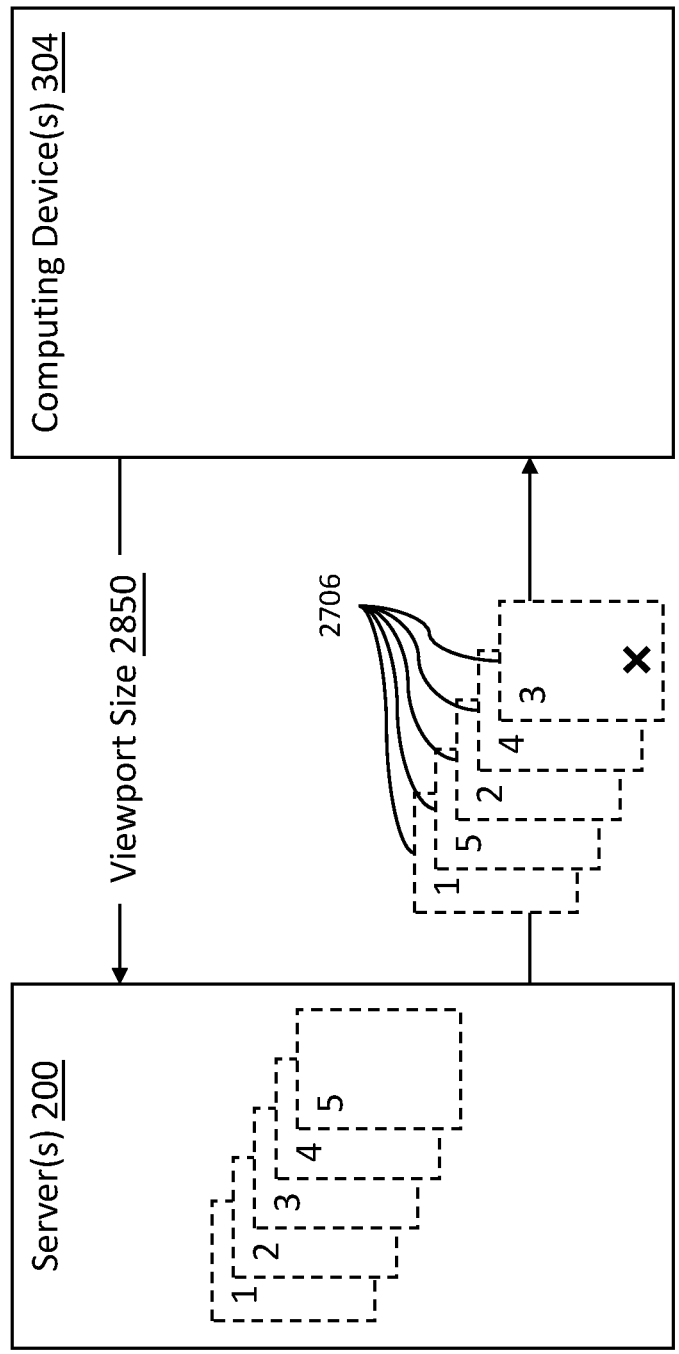
FIG. 28 shows an example data transmission of partial images of the composite image shown in FIG. 27, according to an exemplary embodiment.

Referring now to FIG. 8 and FIG. 28, and in some embodiments, the image partitioner 815 may be configured to determine a number of partial images 2706 to generate for a composite image 2700 based on information corresponding to a viewport of the computing device 304. Specifically, FIG. 28 shows an example data transmission of partial images 2706 of the composite image shown in FIG. 27, according to an exemplary embodiment. As shown in FIG. 28, the server(s) 200 may be configured to receive, retrieve, or otherwise obtain information from the computing device 304 corresponding to a viewport size 2850 for the computing device 304. In some embodiments, the information may include a screen resolution size, a number of pixels, etc. In some embodiments, the server(s) 200 may obtain the information from the computing device 304 by transmitting a ping or query to the computing device 304 to request the information. The computing device 304 may be configured to generate a response to the request including the information. As another example, and in some embodiments, the server(s) 200 may obtain the information from the computing device 304 responsive to the computing device 304 requesting viewing the composite image 2700 from the server 200. For instance, the computing device 304 may send, transmit, communicate, or otherwise provide a request to the server 200 to obtain the composite image 2700 for rendering. The request may include the information. The server 304 may receive the request and determine the information corresponding to the viewport size 2850.

The image partitioner 815 may be configured to determine the size of the viewport of the computing device 304 based on the information obtained from the computing device 304. The image partitioner 815 may be configured to determine a number of partial images 2706 based on the size of the viewport of the computing device 304. For example, the image partitioner 815 may be configured to compute the number of partial images based on the size of the viewport and the size of the composite image 2700. The image partitioner 815 may be configured to determine the number of partial images to be proportional to the size of the viewport (e.g., equal to the size of the viewport, double the size of the viewport, half the size of the viewport, a quarter the size of the viewport, etc.).

As stated above with reference to Section C, the image partitioner 815 may be configured to establish, define, assign, or otherwise associate a sequence, order, or position of the partial images 2706 within the composite image 2700. The image partitioner 815 may be configured to assign a position of the partial images 2706 within the composite image 2700 based on viewing angles of the partial images 2706 relative to the composite image 2700. As noted above with reference to FIG. 8, the composite image 2700 may include bearing information indicating angles (e.g., viewing angles) relative to a reference direction (such as true North). The image partitioner 815 may assign a position of the partial images 2706 in a sequence, according to the arrangement of the viewing angles for the partial images 2706. In the example shown in FIG. 27, assuming the first partial image 2706(1) begins (e.g., the top-left most pixel) at 0° or true North and each partial image 2706 spans respective viewing angles of 36° (e.g., first partial image 2706(1) spanning from 0° to 36°, the second partial image 2706(2) spanning from 36° to 72°, the third partial image 2706(3) spanning from 72° to 108°, the fourth partial image 2706(4) spanning from 108° to 144°, the fifth partial image 2706(5) spanning from 144° to 180°), the partial images 2706 may be ordered or positioned in the sequence of first partial image 2706(1), second partial image 2706(2), third partial image 2706(3), fourth partial image 2706(4), and fifth partial image 2706(5).

The display output circuit 216 may be configured to identify the indicator 2704 in one of the partial images 2706. As noted above, the display output circuit 216 may be configured to identify the indicator responsive to a user selecting a location of the indicator (e.g., on a user interface) and/or responsive to the incident detection circuit 210 detecting the incident and providing the indicator. By maintaining the sequence of partial images 2706 and identifying the indicator 2702 and corresponding region of interest 2704 in the composite image 2700, the display output circuit 216 may be configured to identify the indicator 2702 in the partial image(s) 2706 based on the pixels from the region of interest 2704 (e.g., in the composite image 2700) matching the pixels in the partial image(s) 2706.

Referring now to FIG. 8 and FIG. 28, the display output circuit 216 may be configured to select subset(s) of partial images 2706 to send to the computing device 304 in a particular order (e.g., data transmission order). The display output circuit 216 may be configured to select subset(s) of partial images 2706 to send according to or based on a position of partial images 2706 within the sequence. In some embodiments, the display output circuit 216 may be configured to select subset(s) of partial images 2706 based on a priority assigned to the partial images 2706. The display output circuit 216 may be configured to determine, compute, identify, or otherwise assign a priority to the partial images 2706 based on which of the partial images 2706 include the region of interest 2704 and a position of the other partial images 2706 relative to the partial image 2706 including the region of interest 2704. For example, the display output circuit 216 may assign higher priority to partial images 2706 that are closer to (or include) the region of interest 2704. The display output circuit 216 may be configured to select different subsets of partial images 2706 for transmitting (e.g., in a transmission order) based on the priority assigned to the partial images 2706.

In some embodiments, the display output circuit 216 may be configured to determine, select, or otherwise identify a number of partial images to include in the subsets (e.g., to send to the computing device 304) based on the size of the viewport. The display output circuit 216 may be configured to select the number of partial images to include to at least fill the size of the viewport on the computing device 304. For example, assuming the size of the partial images is half the size of the viewport, the display output circuit 216 may be configured to select at least two partial images for transmitting to the computing device 304 at a time.

In some embodiments, the display output circuit 216 may be configured to determine a transmission order to send the partial images 216 to the computing device 304. The display output circuit 216 may be configured to determine the transmission order based on the priority assigned to the partial images 2706. In some embodiments, the display output circuit 216 may be configured to determine the transmission order, to first send the partial image(s) which include the region of interest 2704, followed (e.g., in order) by the next nearest partial image(s). For example, and continuing the example shown in FIG. 27, where the third partial image 2706(3) includes the region of interest 2704 and indicator 2702, the display output circuit 216 may be configured to first send the third partial image 2706(3) to the computing device 304, followed (e.g., in order) by the fourth partial image 2706(4), the second partial image 2702(2), the fifth partial image 2706(5), and finally the first partial image 2706(1). While described as being sent separately, it is noted that the partial images 2706(1) may be sent in various sets (e.g., a first set including the third, fourth, and second partial images 2706, and a second set including the fifth and first partial images 2706). However, in various embodiments, the partial image 2706(3) which includes the region of interest 2704 may be sent to the computing device 304 prior to the first and fifth partial images 2706(1), 2706(5).

Figure 29A:
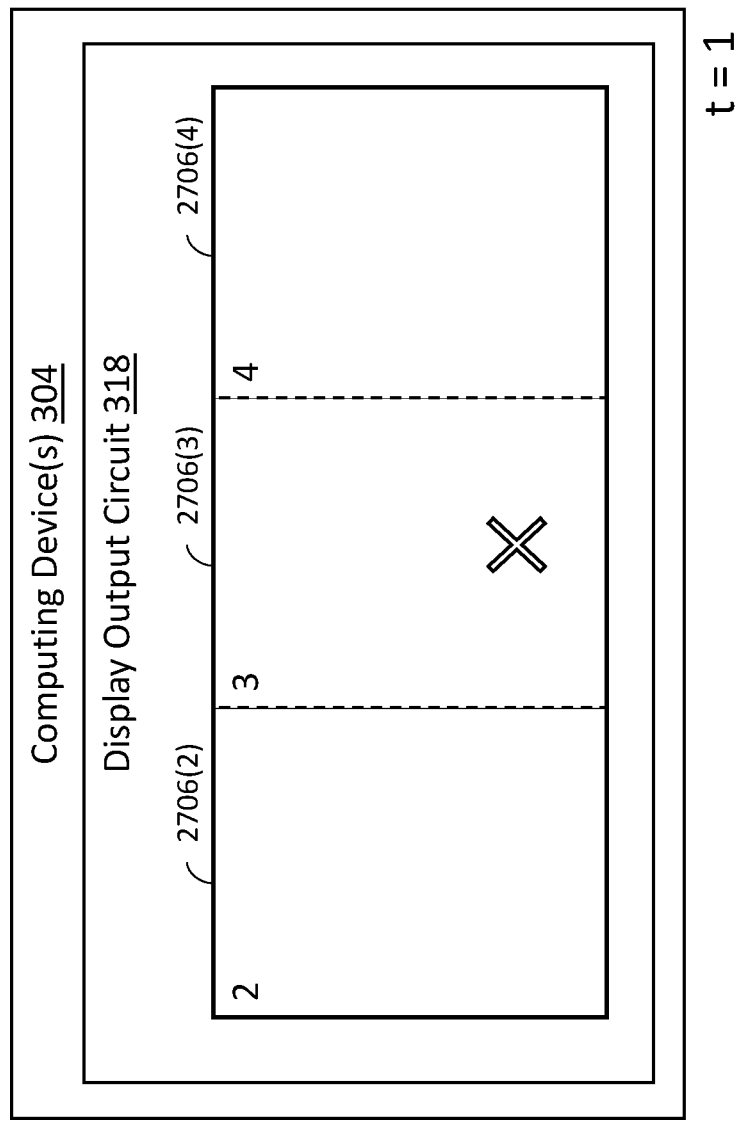

Referring now to FIG. 29A-FIG. 29D, the computing device 304 may be configured to receive the partial images 2706 from the server(s) 200. Specifically, FIG. 29A-FIG. 29D show a series of views of the computing device 304 as the computing device 304 receives partial images 2706 from the server 200, according to an exemplary embodiment. The computing device 304 may be configured to receive the partial images 2706 as described above with reference to Section C. The computing device 304 may be configured to receive the partial images 2706(2)-2706(4) at the first time instance (t=1) shown in FIG. 29A prior to receiving the partial images 2706(1), 2706(5) at the third time instance (t=3) shown in FIG. 29C. However, the display output circuit 318 (e.g., the video player 830 of the display output circuit 318) may be configured to stitch and render the partial images 2706(2)-2706(4) as a partial composite image as shown in FIG. 29A and FIG. 29B. The display output circuit 318 may be configured to position the partial images 2706 such that the indicator 2704 is located such that a center of an angle corresponding to the indicator is located at a center of the viewport of the display. In the example shown in FIG. 29A, the display output circuit 318 may position the partial images such that the partial image 2706(3) is located at a position such that the angle corresponding to the indicator 2704 is located at a center of the viewport. Following positioning the partial image 2706(3) such that the indicator 2704 is located at the center of the viewport, the display output circuit 318 may be configured to stitch the remaining partial images received at the first time instance (t=1) to the partial image 2706(3). A user viewing the partial images 2706(2)-2706(4) may perform various functions (e.g., using video player functions 832 described above), such as zooming as shown in FIG. 29B, on the partial composite image.

Figure 29C:
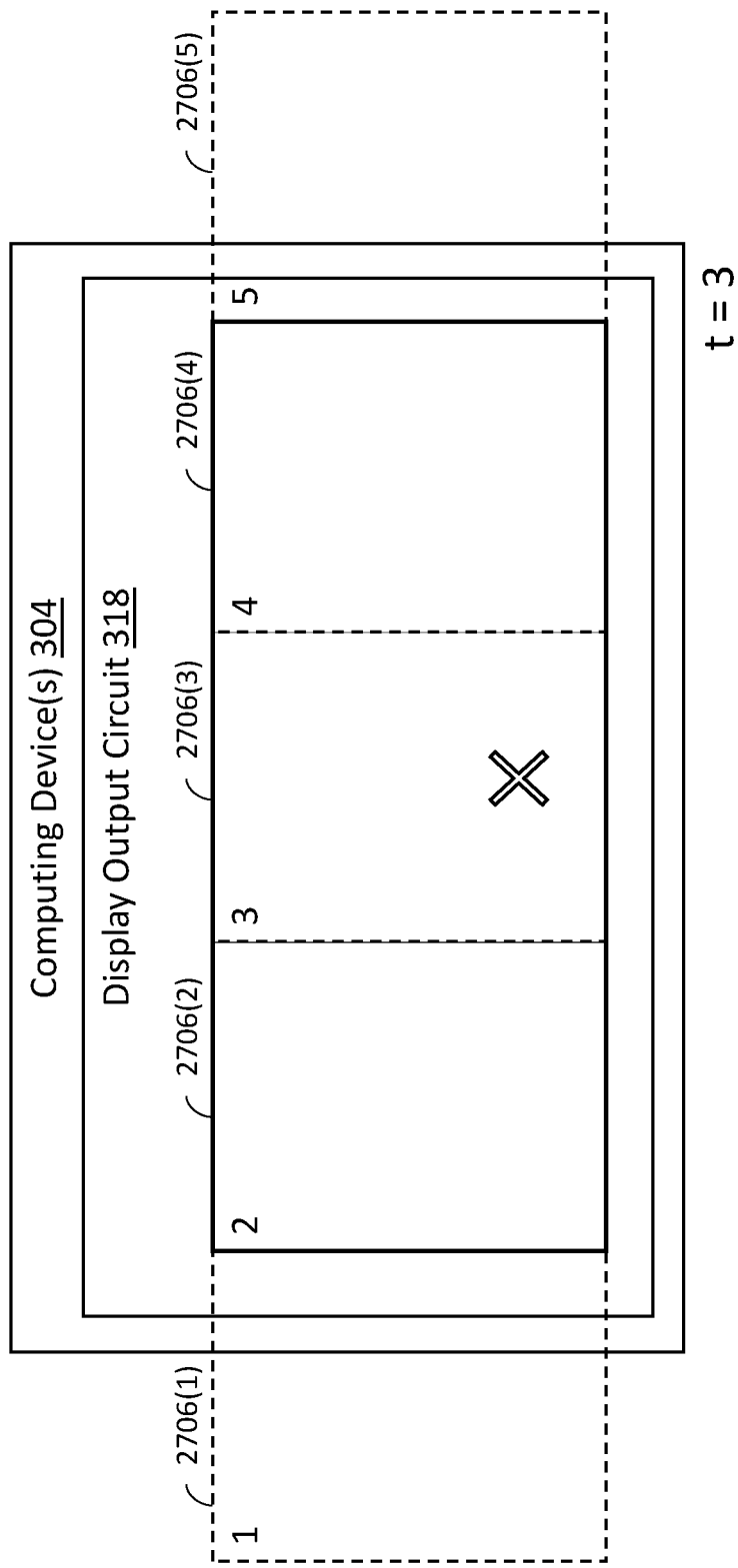
Figure 29D:
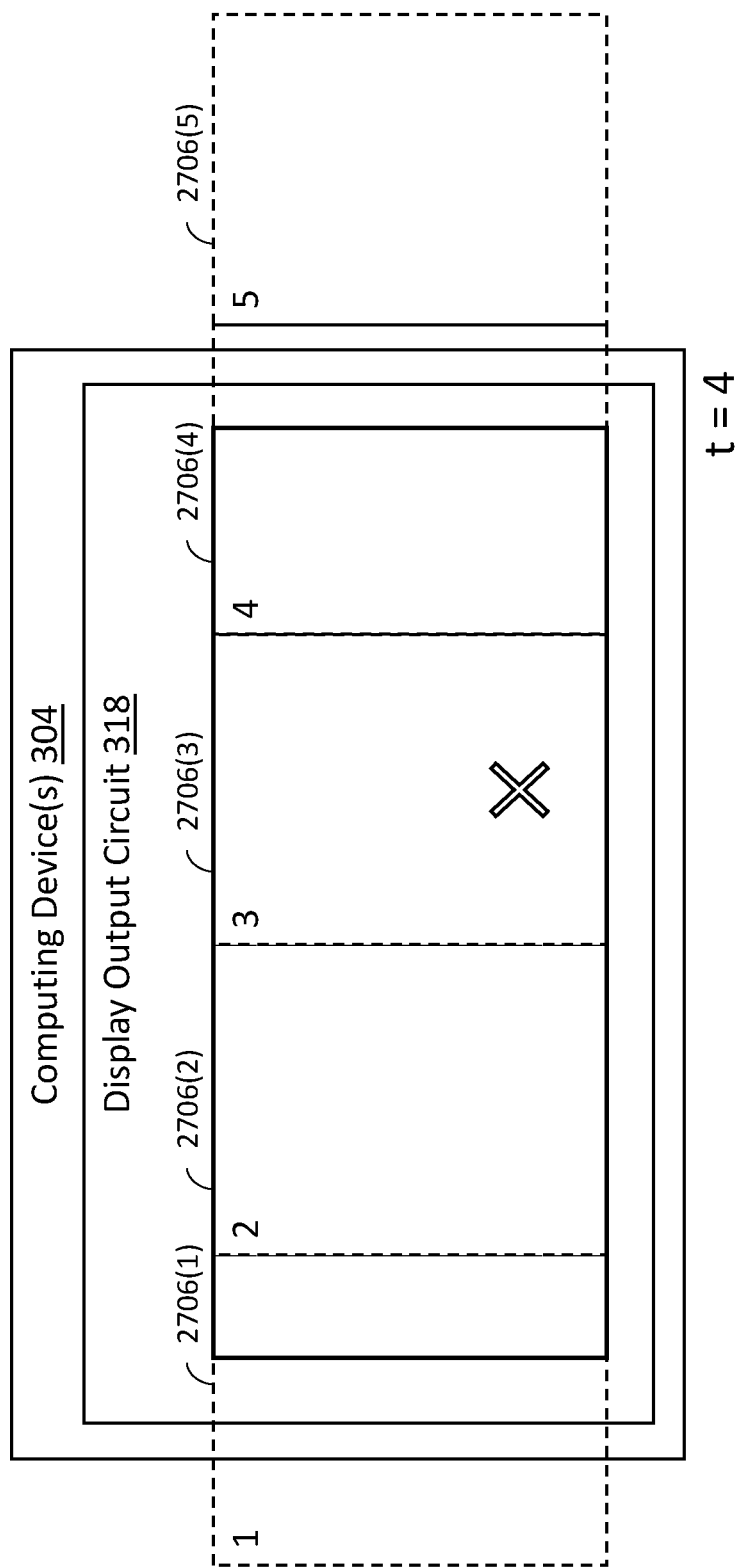

The computing device 304 may be configured to receive the first and fifth partial images 2706(1), 2706(5) at the third time instance (t=3) shown in FIG. 29C. The computing device 304 may be configured to stitch the first and fifth partial images 2706(1), 2706(5) with the partial composite image from FIG. 29B, to generate the composite image 2700. A user may provide inputs to the player functions 832 to perform further functions (e.g., such as panning as shown in the progression between FIG. 29C and FIG. 29D). According to the systems and methods described herein, by sending the partial image 2706(3) first (though typically out of order in terms of packet sequence), the computing device 304 may receive (and correspondingly render) the earlier-received partial images 2706(3) (e.g., as a partial-composite image), thereby expediting the delivery of relevant content to the computing device 304. Further, the systems and methods may provide better overall user experience by rendering partial composite images, rather than waiting for each of the partial images 2706 to be received to render the complete (or full) composite image.

Figure 30:
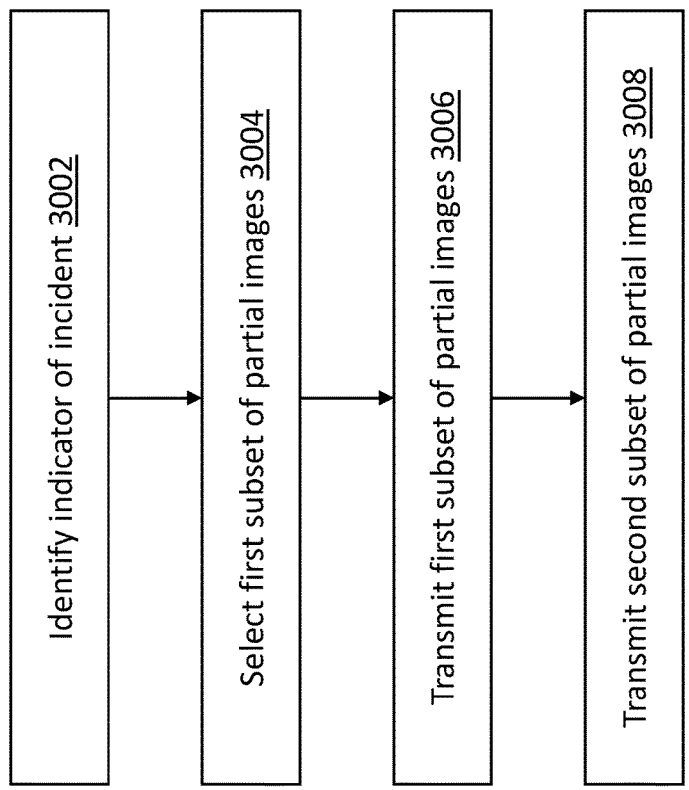
FIG. 30 is a flowchart showing a method of transmitting partial images to a computing device, according to an exemplary embodiment.

Referring now to FIG. 30, depicted is a flowchart showing a method 3000 of transmitting partial images to a computing device, according to an exemplary embodiment. The method 3000 may be performed by the components described above with reference to FIG. 1-FIG. 30. As a brief overview, at step 3002, one or more processor(s) may identify an indicator of an incident. At step 3004, the processor(s) may select a first subset of partial images. At step 3006, the processor(s) may transmit the first subset of partial images. At step 3008, the processor(s) may transmit a second subset of partial images.

In further detail, at step 3002, one or more processor(s) may identify an indicator of an incident. In some embodiments, the processor(s) may identify an indicator indicating an incident at a region of interest within a composite image. The region of interest may correspond to an angle relative to a reference direction (such as true North or some other reference direction). The angle may be or include an angle which extends from an image capture system which captured images corresponding to the composite image towards the incident. The composite image may include a plurality of partial images arranged in a sequence in accordance with a respective position assigned to each partial image. The plurality of partial images may include a first partial image associated with the indicator.

In some embodiments, the processor(s) may identify the region of interest corresponding to the interest responsive to providing the composite image to a machine learning model. The processor(s) may identify the region of interest similar to the identification of the region of interest as described above in Section E. The processor(s) may provide the indicator at the region of interest corresponding to the incident. In this regard, the processor(s) may provide the indicator automatically (e.g., responsive to processing the image and applying the image to a machine learning model). In some embodiments, the processor(s) may identify the region of interest responsive to a user selecting an indicator on a user interface displaying the composite image. The processor(s) may receive the selection of the indicator, and identify the region of interest responsive to receiving the selection.

In some embodiments, the processor(s) may partition, split, splice, separate, or otherwise divide the composite image into a plurality of partial images. For example, the processor(s) may divide the composite image into predetermined or defined sized partial images. As another example, the processor(s) may divide the composite image into partial images having a size based on a number of pixels in the region of interest. For instance, the processor(s) may divide the composite image into sized partial images to have a number of pixels which is proportionate to the number of pixels in the region of interest, such as at least equal to the number of pixels in the partial image as the number of pixels in the region of interest.

In some embodiments, and as described above with reference to Section C, the processor(s) may identify a first plurality of constituent images captured by an image capture system of a station that rotates about an axis over a first time period. The respective constituent images may correspond to angle(s) about the axis and a respective time within the first time period. The processor(s) may generate the composite image based on the first plurality of constituent images. The processor(s) may generate the composite image by arranging the constituent images in order (or in sequence) according to the respective angles of each of the constituent images. The processor(s) may stitch together the constituent images and morph portions of the images to generate the composite image (as described above in reference to Section C. The processor(s) may partition the composite image into the plurality of partial images following generating the composite image from the constituent images. The processor(s) may generate each partial image to be associated with a respective angle relative to a reference direction. As such, each of the partial images may span a subset of range of angles relative to a total range of angles corresponding to the composite image. The partial images may be ordered in a sequence according to the subset of range of angles within the total range of angles of the composite image.

In some embodiments, the processor(s) may assign a respective priority to each of the plurality of partial images based on the position of the partial image relative to the position of the partial image which includes the indicator. For example, assuming that the partial images are arranged in sequence according to their respective range of angles (e.g., subset of angles) relative to the total range of angles of the composite images, the processors may assign a priority based on a proximity of the remaining partial images to the partial image which includes the indicator. In some instances, the processor(s) may assign higher priorities to partial images which are closer to the partial image which includes the indicator. The processor(s) may wherein the first subset of partial images is selected based on the priority assigned to the partial images of the first subset.

At step 3004, the processor(s) may select a first subset of partial images. In some embodiments, the processor(s) may select a first subset of partial images to send to a computing device from the plurality of partial images. The processor(s) may select the first subset from the plurality of partial images based on a position of partial images of the first subset relative to a position of the first partial image (e.g., which includes the indicator). In some embodiments, the processor(s) may select partial images to include in the first subset based on the priority assigned to each of the partial images. As noted above, the processor(s) may assign higher priorities to partial images which include or are closer to the indicator. The processor(s) may select a number of partial images for including in the first subset based on which partial images are closest to and/or include the indicator.

In some embodiments, the processor(s) may select a number of partial images to include in the first subset from the partial images based on a size of a viewport of the computing device. For example, the processor(s) may identify information relating to the viewport size from the computing device (e.g., responsive to sending a message from the processor(s) to the computing device, responsive to receiving a request by the processor(s) form the computing device for the image). The processor(s) may select the number of partial images to include in the first subset, such that the viewport may be filled with the partial images sent to the computing device responsive to the computing device rendering the partial images within the viewport. The processor(s) may select partial images to include in the first subset and remaining partial images to include in a second (and/or third) subset following selecting the partial images to include in the first subset.

At step 3006, the processor(s) may transmit the first subset of partial images. In some embodiments, the processor(s) may transmit the first subset of partial images to the computing device prior to transmitting a second subset of partial images of the plurality of partial images. The processor(s) may transmit the first subset via a network to the computing device. The processor(s) may transmit the first subset for rendering on the computing device prior to, while, or during the processor(s) transmitting the second subset of partial images. As such, the first subset may be sent by the processor(s) to the computing device to preload or load in parallel with the transmission of the second subset of partial images. At step 3008, the processor(s) may transmit a second subset of partial images. The processor(s) may transmit the second subset of partial images following transmission of the first subset of partial images at step 3006.

The computing device may receive the first subset of images (and subsequently receive the second subset of images) from the processor(s) via the network. The computing device may a player executing on the computing device. The player may reconstruct a portion of the composite image using the first subset of images (e.g., the partial images received at step 3006). The player may reconstruct the portion of the composite image such that a partial composite image is rendered via the player to a user. The player may display the reconstructed portion of the partial composite image including the region of interest corresponding to the angle at a central portion of the viewport (e.g., as shown in FIG. 29A). The computing device may receive the second subset of partial images, and the player may stitch, reconstruct, or otherwise combine the second subset of partial images to the reconstructed portion of the composite image to generate the (e.g., complete) composite image. The computing device may combine the second subset of partial images to the reconstructed portion of the composite images based on or in accordance with positions assigned to the second subset of partial images.

H. Computer Architecture

Figure 31:
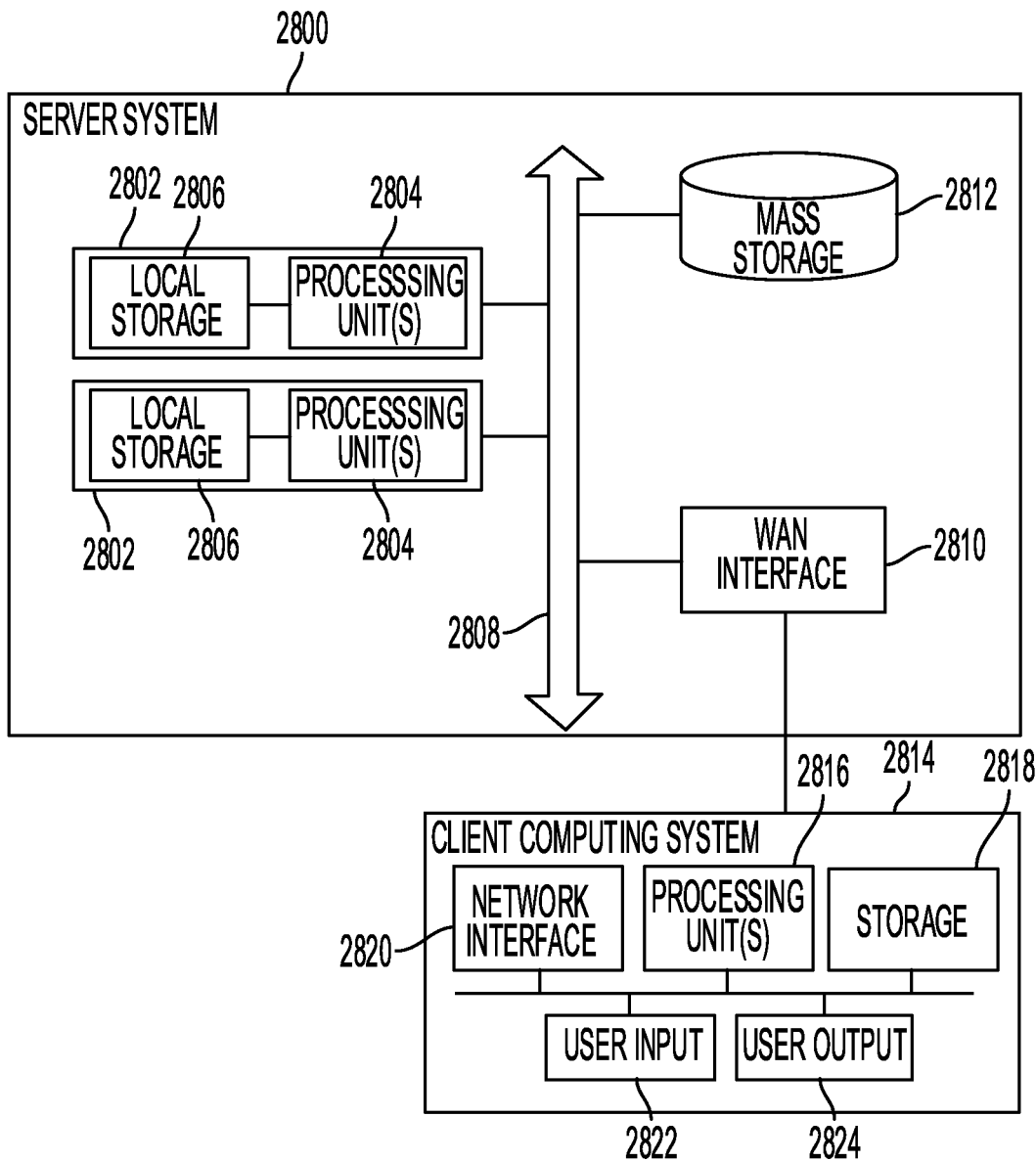
FIG. 31 is a simplified block diagram of a representative server system and client computer system according to embodiments of the present disclosure.

Various operations described herein can be implemented on computer systems, which can be of generally conventional design. FIG. 31 shows a simplified block diagram of a representative server system 2800 and client computer system 2814 usable to implement certain embodiments of the present disclosure. In various embodiments, server system 2800 or similar systems can implement services or servers described herein or portions thereof. For example, the server system 2800 may share one or more features as the sever(s) 200 described herein. Client computing system 2814 or similar systems can implement clients described herein. For example, the client computing system 2814 may share one or more features as the computing device(s) 304 described herein. The system 100 and others described herein can be similar to the server system 2800.

Server system 2800 can have a modular design that incorporates a number of modules 2802 (e.g., blades in a blade server embodiment); while two modules 2802 are shown, any number can be provided. Each module 2802 can include processing unit(s) 2804 and local storage 2806.

Processing unit(s) 2804 can include a single processor, which can have one or more cores, or multiple processors. In some embodiments, processing unit(s) 2804 can include a general-purpose primary processor as well as one or more special-purpose co-processors such as graphics processors, digital signal processors, or the like. In some embodiments, some or all processing units 2804 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 2804 can execute instructions stored in local storage 2806. Any type of processors in any combination can be included in processing unit(s) 2804.

Local storage 2806 can include volatile storage media (e.g., conventional DRAM, SRAM, SDRAM, or the like) and/or non-volatile storage media (e.g., magnetic or optical disk, flash memory, or the like). Storage media incorporated in local storage 2806 can be fixed, removable or upgradeable as desired. Local storage 2806 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 2804 need at runtime. The ROM can store static data and instructions that are needed by processing unit(s) 2804. The permanent storage device can be a non-volatile read-and-write memory device that can store instructions and data even when module 2802 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some embodiments, local storage 2806 can store one or more software programs to be executed by processing unit(s) 2804, such as an operating system and/or programs implementing various server functions such as functions of the server 200 of FIG. 1A, or any other system described herein.

"Software" refers generally to sequences of instructions that, when executed by processing unit(s) 2804 cause server system 2800 (or portions thereof) to perform various operations, thus defining one or more specific machine embodiments that execute and perform the operations of the software programs. The instructions can be stored as firmware residing in read-only memory and/or program code stored in non-volatile storage media that can be read into volatile working memory for execution by processing unit(s) 2804. Software can be implemented as a single program or a collection of separate programs or program modules that interact as desired. From local storage 2806 (or non-local storage described below), processing unit(s) 2804 can retrieve program instructions to execute and data to process in order to execute various operations described above.

In some server systems 2800, multiple modules 2802 can be interconnected via a bus or other interconnect 2808, forming a local area network that supports communication between modules 2802 and other components of server system 2800. Interconnect 2808 can be implemented using various technologies including server racks, hubs, routers, etc.

A wide area network (WAN) interface 2810 can provide data communication capability between the local area network (interconnect 2808) and a larger network (e.g., the network 10), such as the Internet. Conventional or other activities technologies can be used, including wired (e.g., Ethernet, IEEE 802.3 standards) and/or wireless technologies (e.g., Wi-Fi, IEEE 802.11 standards).

In some embodiments, local storage 2806 is intended to provide working memory for processing unit(s) 2804, providing fast access to programs and/or data to be processed while reducing traffic on interconnect 2808. Storage for larger quantities of data can be provided on the local area network by one or more mass storage subsystems 2812 that can be connected to interconnect 2808. Mass storage subsystem 2812 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 2812. In some embodiments, additional data storage resources may be accessible via WAN interface 2810 (potentially with increased latency).

Server system 2800 can operate in response to requests received via WAN interface 2810. For example, one of modules 2802 can implement a supervisory function and assign discrete tasks to other modules 2802 in response to received requests. Conventional work allocation techniques can be used. As requests are processed, results can be returned to the requester via WAN interface 2810. Such operation can generally be automated. Further, in some embodiments, WAN interface 2810 can connect multiple server systems 2800 to each other, providing scalable systems capable of managing high volumes of activity. Conventional or other techniques for managing server systems and server farms (collections of server systems that cooperate) can be used, including dynamic resource allocation and reallocation.

Server system 2800 can interact with various user-owned or user-operated devices via a wide-area network such as the Internet. An example of a user-operated device is shown in FIG. 28 as client computing system 2814. Client computing system 2814 can be implemented, for example, as an edge computer (e.g., the station computing device(s) 104) and/or a consumer device (e.g., the computing device(s) 304) such as a smartphone, other mobile phone, tablet computer, wearable computing device (e.g., smart watch, eyeglasses), desktop computer, laptop computer, and so on.

For example, client computing system 2814 can communicate via WAN interface 2810. Client computing system 2814 can include conventional computer components such as processing unit(s) 2816, storage device 2818, network interface 2820, user input device 2822, and user output device 2824. Client computing system 2814 can be a computing device implemented in a variety of form factors, such as a desktop computer, laptop computer, tablet computer, smartphone, other mobile computing device, wearable computing device, or the like.

Processor 2816 and storage device 2818 can be similar to processing unit(s) 2804 and local storage 2806 described above. Suitable devices can be selected based on the demands to be placed on client computing system 2814; for example, client computing system 2814 can be implemented as a "thin" client with limited processing capability or as a high-powered computing device. Client computing system 2814 can be provisioned with program code executable by processing unit(s) 2816 to enable various interactions with server system 2800 of a message management service such as accessing messages, performing actions on messages, and other interactions described above. Some client computing systems 2814 can also interact with a messaging service independently of the message management service.

Network interface 2820 can provide a connection to a wide area network (e.g., the Internet) to which WAN interface 2810 of server system 2800 is also connected. In various embodiments, network interface 2820 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 2822 can include any device (or devices) via which a user can provide signals to client computing system 2814; client computing system 2814 can interpret the signals as indicative of particular user requests or information. In various embodiments, user input device 2822 can include any or all of a keyboard, touch pad, touch screen, mouse or other pointing device, scroll wheel, click wheel, dial, button, switch, keypad, microphone, and so on.

User output device 2824 can include any device via which client computing system 2814 can provide information to a user. For example, user output device 2824 can include a display to display images generated by or delivered to client computing system 2814. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 2824 can be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 2804 and 2816 can provide various functionality for server system 2800 and client computing system 2814, including any of the functionality described herein as being performed by a server or client, or other functionality associated with message management services.

It will be appreciated that server system 2800 and client computing system 2814 are illustrative and that variations and modifications are possible. Computer systems used in connection with embodiments of the present disclosure can have other capabilities not specifically described here. Further, while server system 2800 and client computing system 2814 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

While the disclosure has been described with respect to specific embodiments, one skilled in the art will recognize that numerous modifications are possible. For instance, although specific examples of rules (including triggering conditions and/or resulting actions) and processes for generating suggested rules are described, other rules and processes can be implemented. Embodiments of the disclosure can be realized using a variety of computer systems and communication technologies including but not limited to specific examples described herein.

Embodiments of the present disclosure can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the disclosure has been described with respect to specific embodiments, it will be appreciated that the disclosure is intended to cover all modifications and equivalents within the scope of the following claims.

The machine learning model may be periodically and/or continuously trained. For instance, as the recommendations (or other predictions and derived information) are presented to the end-user, the system may monitor the end-user's behavior (e.g., whether a recommendation was accepted/rejected or whether a predicted attribute was revised). The monitored data may be fed back into the machine learning model to improve its accuracy. The machine learning model can re-calibrate itself accordingly, such that the results are customized for the end-user.

It should be understood that the disclosed embodiments are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. Thus, it is to be understood that other embodiments can be utilized and functional, logical, operational, organizational, structural and/or topological modifications may be made without departing from the scope of the disclosure. As such, all examples and/or embodiments are deemed to be non-limiting throughout this disclosure.

Some embodiments described herein relate to methods. It should be understood that such methods can be computer implemented methods (e.g., instructions stored in memory and executed on processors). Where methods described above indicate certain events occurring in a certain order, the ordering of certain events can be modified. Additionally, certain of the events can be performed repeatedly, concurrently in a parallel process when possible, as well as performed sequentially as described above. Furthermore, certain embodiments can omit one or more described events.

All definitions, as defined and used herein, should be understood to control over dictionary definitions, definitions in documents incorporated by reference, and/or ordinary meanings of the defined terms.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field-programmable gate array (FPGA), and/or an application-specific integrated circuit (ASIC). Software modules (executed on hardware) can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and software development tools. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

We claim:

1. A system comprising:
a plurality of image capture systems of respective stations located at separate geographic locations; and
one or more processors communicably coupled to the plurality of image capture systems, the one or more processors configured to:
maintain, in one or more data structures, for each station of a plurality of stations, a respective set of geographic coordinates indicating a location of the station at which one or more image capture systems of the station are configured to capture images;
identify a first plurality of constituent images captured by a first image capture system of a first station at a first set of geographic coordinates rotating about a first axis over a first time period, each constituent image of the first plurality of constituent images corresponding to a respective angle about the axis and a respective time within the first time period;
select, from the first plurality of constituent images, a first group of constituent images, each constituent image of the first group selected based on the respective angle about the first axis corresponding to the constituent image;
generate a first composite image based on the first group of constituent images arranged according to the respective angles of each of the first group of constituent images;
identify, in the first composite image, a first indicator of an incident at a first geolocation, the first indicator corresponding to first pixel coordinates within the first composite image, the first composite image corresponding to a first range of angles about a first axis of rotation of the first image capture system, the first range of angles relative to a first reference direction;
determine a first angle of the first range of angles corresponding to the first pixel coordinates for the first indicator, using the one or more data structures maintaining associations between pixel coordinates of pixels within a given image and angles associated with respective pixels;
identify, in a second image corresponding to a second image capture system of a second station at a second set of geographic coordinates, a second indicator of the incident at the first geolocation, the second indicator corresponding to second pixel coordinates within the second image, the second image corresponding to a second range of angles about a second axis of rotation of the second image capture system, the second range of angles relative to a second reference direction;
determine a second angle of the second range of angles corresponding to the second pixel coordinates for the second indicator, using the one or more data structures;
determine a third set of geographic coordinates for the first geolocation associated with the incident based on the first set of geographic coordinates, the first angle, the second set of geographic coordinates, and the second angle; and
provide an output indicating the third set of geographic coordinates.

2. The system of claim 1, wherein determining the third set of geographic coordinates is based on an intersection of a first line extending away from the first set of geographic coordinates along the first angle and a second line extending away from the second set of geographic coordinates along the second angle.

3. The system of claim 1, wherein the first reference direction is different from the second reference direction.

4. The system of claim 1, wherein the first reference direction is North and the second reference direction is North.

5. A system comprising:
a plurality of image capture systems of respective stations located at separate geographic locations; and
one or more processors communicably coupled to the plurality of image capture systems, the one or more processors configured to:
maintain, in one or more data structures, for each station of a plurality of stations, a respective set of geographic coordinates indicating a location of the station at which one or more image capture systems of the station are configured to capture images;

identify, in a first image obtained from a first image capture system of a first station at a first set of geographic coordinates, a first indicator of an incident at a first geolocation, the first indicator corresponding to first pixel coordinates within the first image, the first image corresponding to a first range of angles about a first axis of rotation of the first image capture system, the first range of angles relative to a first reference direction;

determine a first angle of the first range of angles corresponding to the first pixel coordinates for the first indicator, using the one or more data structures maintaining associations between pixel coordinates of pixels within a given image and angles associated with respective pixels;

receive a request to triangulate responsive to identifying the first indicator;

select, from the plurality of stations, a second station based on a second set of geographic coordinates for the second station satisfying a selection criteria;

determine a second range of angles about a second axis of rotation of a second image capture system based on the first angle corresponding to the first indicator, the second set of geographic coordinates, and the first reference direction, the second range of angles relative to a second reference direction;

generate, in a second image obtained from the second image capture system of the second station, a second indicator of the incident at the first geolocation, the second indicator corresponding to second pixel coordinates within the second image, the second image corresponding to the second range of angles about the second axis of rotation of the second image capture system;

determine a second angle of the second range of angles corresponding to the second pixel coordinates for the second indicator;

determine a third set of geographic coordinates for the first geolocation associated with the incident based on the first set of geographic coordinates, the first angle, the second set of geographic coordinates, and the second angle; and provide an output indicating the third set of geographic coordinates.

6. The system of claim 1, wherein the one or more processors are configured to cause a device to display, on a user interface of the device, a time-lapse series of composite images with a viewing region which includes a portion of the first composite image or the second image including the first indicator or the second indicator.

7. The system of claim 6, wherein the user interface includes one or more interface elements to selectively display images of the incident obtained from the first image capture system or the second image capture system.

8. The system of claim 1, wherein the one or more processors are further configured to cause a device to display a map including an incident marker at an intersection between a first angular path along the first angle extending from the first set of geographic coordinates and a second angular path along the second angle extending from the second set of geographic coordinates.

9. The system of claim 8, wherein the map further displays representations of first angular path, the second angular path, the first image capture system, and the second image capture system.

10. The system of claim 1, wherein providing the output further comprises transmitting an alert including data corresponding to the third set of geographic coordinates to one or more remote computing devices.

11. A method comprising:

maintaining, by one or more processors, in one or more data structures, for each station of a plurality of stations, a respective set of geographic coordinates indicating a location of the station at which one or more image capture systems of the station are configured to capture images;

identifying, by the one or more processors, a first plurality of constituent images captured by a first image capture system of a first station at a first set of geographic coordinates rotating about a first axis over a first time period, each constituent image of the first plurality of constituent images corresponding to a respective angle about the axis and a respective time within the first time period;

selecting, by the one or more processors, from the first plurality of constituent images, a first group of constituent images, each constituent image of the first group selected based on the respective angle about the first axis corresponding to the constituent image;

generating, by the one or more processors, a first composite image based on the first group of constituent images arranged according to the respective angles of each of the first group of constituent images;

identifying, by the one or more processors, in the first composite image, a first indicator of an incident at a first geolocation, the first indicator corresponding to first pixel coordinates within the first composite image, the first composite image corresponding to a first range of angles about a first axis of rotation of the first image capture system, the first range of angles relative to a first reference direction;

determining, by the one or more processors, a first angle of the first range of angles corresponding to the first pixel coordinates for the first indicator, using the one or more data structures maintaining associations between pixel coordinates of pixels within a given image and angles associated with respective pixels;

identifying, by the one or more processors, in a second image corresponding to a second image capture system of a second station at a second set of geographic coordinates, a second indicator of the incident at the first geolocation, the second indicator corresponding to second pixel coordinates within the second image, the second image corresponding to a second range of angles about a second axis of rotation of the second image capture system, the second range of angles relative to a second reference direction;

determining, by the one or more processors, a second angle of the second range of angles corresponding to the second pixel coordinates for the second indicator, using the one or more data structures;

determining, by the one or more processors, a third set of geographic coordinates for the first geolocation associated with the incident based on the first set of geographic coordinates, the first angle, the second set of geographic coordinates, and the second angle;

providing, by the one or more processors, an output indicating the third set of geographic coordinates.

12. The method of claim 11, further comprising determining the third set of geographic coordinates is based on an intersection of a first line extending away from the first set of geographic coordinates along the first angle and a second line extending away from the second set of geographic coordinates along the second angle.

13. A method comprising:
maintaining, by the one or more processors, in one or more data structures, for each station of a plurality of stations, a respective set of geographic coordinates indicating a location of the station at which one or more image capture systems of the station are configured to capture images;
identifying, by the one or more processors, in a first image obtained from a first image capture system of a first station at a first set of geographic coordinates, a first indicator of an incident at a first geolocation, the first indicator corresponding to first pixel coordinates within the first image, the first image corresponding to a first range of angles about a first axis of rotation of the first image capture system, the first range of angles relative to a first reference direction;
determining, by the one or more processors, a first angle of the first range of angles corresponding to the first pixel coordinates for the first indicator, using the one or more data structures maintaining associations between pixel coordinates of pixels within a given image and angles associated with respective pixels;
receiving, by the one or more processors, a request to triangulate responsive to identifying the first indicator;
selecting, by the one or more processors, from the plurality of stations, a second station based on a second set of geographic coordinates for the second station satisfying a selection criteria;
determining, by the one or more processors, a second range of angles about a second axis of rotation of a second image capture system based on the first angle corresponding to the first indicator, the second set of geographic coordinates, and the first reference direction, the second range of angles relative to a second reference direction;
generating, by the one or more processors, in a second image obtained from the second image capture system of the second station, a second indicator of the incident at the first geolocation, the second indicator corresponding to second pixel coordinates within the second image, the second image corresponding to the second range of angles about the second axis of rotation of the second image capture system;
determining, by the one or more processors, a second angle of the second range of angles corresponding to the second pixel coordinates for the second indicator;
determining, by the one or more processors, a third set of geographic coordinates for the first geolocation associated with the incident based on the first set of geographic coordinates, the first angle, the second set of geographic coordinates, and the second angle; and
providing, by the one or more processors, an output indicating the third set of geographic coordinates.

14. The method of claim 11, further comprising causing, by the one or more processors, a time-lapse series of composite images to be displayed on a user interface of a device, with a viewing region which includes a portion of the first composite image or the second image including the first indicator or the second indicator.

15. The method of claim 11, further comprising causing, by the one or more processors, displaying of a map including an incident marker at an intersection between a first angular path along the first angle extending from the first set of geographic coordinates and a second angular path along the second angle extending from the second set of geographic coordinates.

16. The method of claim 15, wherein the map further displays representations of first angular path, the second angular path, the first image capture system, and the second image capture system.

17. The method of claim 11, wherein providing the output further comprises transmitting an alert including data corresponding to the third set of geographic coordinates to one or more remote computing devices.

18. A non-transitory computer readable medium storing instructions that, when executed by one or more processors, cause the one or more processors to:
maintain, in one or more data structures, for each station of a plurality of stations, a respective set of geographic coordinates indicating a location of the station at which one or more image capture systems of the station are configured to capture images;
identify a first plurality of constituent images captured by a first image capture system of a first station at a first set of geographic coordinates rotating about a first axis over a first time period, each constituent image of the first plurality of constituent images corresponding to a respective angle about the axis and a respective time within the first time period;
select, from the first plurality of constituent images, a first group of constituent images, each constituent image of the first group selected based on the respective angle about the first axis corresponding to the constituent image;
generate a first composite image based on the first group of constituent images arranged according to the respective angles of each of the first group of constituent images;
identify, in the first composite image, a first indicator of an incident at a first geolocation, the first indicator corresponding to first pixel coordinates within the first composite image, the first composite image corresponding to a first range of angles about a first axis of rotation of the first image capture system, the first range of angles relative to a first reference direction;
determine a first angle of the first range of angles corresponding to the first pixel coordinates for the first indicator, using the one or more data structures maintaining associations between pixel coordinates of pixels within a given image and angles associated with respective pixels;
identify, in a second image corresponding to a second image capture system of a second station at a second set of geographic coordinates, a second indicator of the incident at the first geolocation, the second indicator corresponding to second pixel coordinates within the second image, the second image corresponding to a second range of angles about a second axis of rotation of the second image capture system, the second range of angles relative to a second reference direction;
determine a second angle of the second range of angles corresponding to the second pixel coordinates for the second indicator, using the one or more data structures;

determine a third set of geographic coordinates for the first geolocation associated with the incident based on the first set of geographic coordinates, the first angle, the second set of geographic coordinates, and the second angle; and provide an output indicating the third set of geographic coordinates.

\* \* \* \* \*